(12) United States Patent
Ochi et al.

(10) Patent No.: US 11,566,117 B2
(45) Date of Patent: Jan. 31, 2023

(54) PRODUCTION METHOD FOR PREPREG, PREPREG TAPE, AND FIBER REINFORCED COMPOSITE MATERIAL, AND COATING DEVICE

(71) Applicant: Toray Industries, Inc., Tokyo (JP)

(72) Inventors: Takashi Ochi, Ehime (JP); So Nishino, Otsu (JP); Junichi Aoki, Ehime (JP); Yoshikazu Kono, Ehime (JP); Tamotsu Suzuki, Otsu (JP); Takashi Ikushima, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 21 days.

(21) Appl. No.: 17/266,396

(22) PCT Filed: Aug. 20, 2019

(86) PCT No.: PCT/JP2019/032492
§ 371 (c)(1),
(2) Date: Feb. 5, 2021

(87) PCT Pub. No.: WO2020/040150
PCT Pub. Date: Feb. 27, 2020

(65) Prior Publication Data
US 2021/0292496 A1 Sep. 23, 2021

(30) Foreign Application Priority Data

Aug. 22, 2018 (JP) .............................. JP2018-155072
Sep. 12, 2018 (JP) .............................. JP2018-170400

(51) Int. Cl.
*B29B 15/12* (2006.01)
*C08J 5/24* (2006.01)
(Continued)

(52) U.S. Cl.
CPC ............... *C08J 5/24* (2013.01); *B29B 15/125* (2013.01); *B29C 70/20* (2013.01); *B29C 70/50* (2013.01); *C08J 7/06* (2013.01)

(58) Field of Classification Search
CPC .... C08J 7/06; C08J 5/24; B29C 70/50; B29C 70/20; B29B 15/125
See application file for complete search history.

(56) References Cited

U.S. PATENT DOCUMENTS 3,378,884 A * 4/1968 Meteer .................. B29C 70/521
156/551
5,198,281 A 3/1993 Muzzy et al.
(Continued)

FOREIGN PATENT DOCUMENTS

JP 5871123 A 4/1983
JP 01016612 A 1/1989
(Continued)

OTHER PUBLICATIONS

Machine translation of JPS5871123A; Publication date: Apr. 27, 1983.*
(Continued)

*Primary Examiner* — Vishal I Patel
(74) *Attorney, Agent, or Firm* — RatnerPrestia

(57) ABSTRACT

A method of producing a prepreg is described, in which a matrix resin is applied to a reinforcing fiber sheet in which the sheet can continuously run without clogging due to generated fuzz even at a high running speed and where the reinforcing fiber sheet can be efficiently impregnated with the matrix resin. A method of producing a prepreg includes allowing a reinforcing fiber sheet to pass substantially vertically downward through the inside of a coating section storing a matrix resin to apply the matrix resin to the reinforcing fiber sheet; and then applying a resin film to a (Continued)

primary impregnate prepreg withdrawn from the coating section.

13 Claims, 16 Drawing Sheets

(51) Int. Cl.
  *B29C 70/20* (2006.01)
  *B29C 70/50* (2006.01)
  *C08J 7/06* (2006.01)

(56) References Cited

U.S. PATENT DOCUMENTS

| | | | |
|---|---|---|---|
| 5,529,652 | A | 6/1996 | Asai et al. |
| 9,238,336 | B2 | 1/2016 | Ishibashi et al. |
| 9,434,811 | B2 | 9/2016 | Arai et al. |
| 10,239,970 | B2 | 3/2019 | Asano et al. |
| 2014/0065911 | A1 | 3/2014 | Schmidt et al. |
| 2015/0344649 | A1 | 12/2015 | Sequeira |
| 2016/0159998 | A1* | 6/2016 | Spencer ............... C08J 5/24 427/195 |
| 2016/0303777 | A1 | 10/2016 | Miyauchi et al. |
| 2019/0100635 | A1* | 4/2019 | Hosoda ............ B32B 37/0038 |
| 2020/0039114 | A1 | 2/2020 | Ochi et al. |

FOREIGN PATENT DOCUMENTS

| | | | |
|---|---|---|---|
| JP | 01104624 | A | 4/1989 |
| JP | 01178411 | A | 7/1989 |
| JP | 01178412 | A | 7/1989 |
| JP | 0671646 | A | 3/1994 |
| JP | 10337516 | A | 12/1998 |
| JP | 3252278 | B2 | 2/2002 |
| JP | 2008050587 | A | 3/2008 |
| JP | 2011132389 | A | 7/2011 |
| JP | 2011144213 | A | 7/2011 |
| JP | 2011162619 | A | 8/2011 |
| JP | 2013022868 | A | 2/2013 |
| JP | 2015022799 | A | 2/2015 |
| JP | 5814964 | B2 | 11/2015 |
| JP | 5815501 | B2 | 11/2015 |
| JP | 5878017 | B2 | 3/2016 |
| JP | 2016510077 | A | 4/2016 |
| JP | 2016147925 | A | 8/2016 |
| JP | 2016203397 | A | 12/2016 |
| JP | 2017154330 | A | 9/2017 |
| WO | 0128951 | A2 | 4/2001 |
| WO | 2005002819 | A2 | 1/2005 |
| WO | 2007062516 | A1 | 6/2007 |
| WO | WO-2007062516 | A1 * | 6/2007 ........... B29B 15/122 |
| WO | 2009142231 | A1 | 11/2009 |
| WO | 2010150022 | A1 | 12/2010 |
| WO | 2011118106 | A1 | 9/2011 |
| WO | 2012002417 | A1 | 1/2012 |
| WO | 2013107829 | A1 | 7/2013 |
| WO | 2015007862 | A1 | 1/2015 |
| WO | 2015060299 | A1 | 4/2015 |
| WO | 2017068159 | A1 | 4/2017 |
| WO | WO-2017222027 | A1 * | 12/2017 ............. B32B 15/08 |
| WO | 2018173617 | A1 | 9/2018 |

OTHER PUBLICATIONS

Kawabe, K., "New Spreading Technology for Carbon Fiber Tow and Its Application to Composite Materials", Sen'i Gakkaishi, vol. 64, No. 8, 2008, pp. 262-267.
Extended European Search Report for European Application No. 19852574.3, dated Apr. 7, 2022, 7 pages.
International Search Report and Written Opinion for International Application No. PCT/JP2019/032492, dated Nov. 12, 2019, 7 pages.

\* cited by examiner

PRODUCTION METHOD FOR PREPREG, PREPREG TAPE, AND FIBER REINFORCED COMPOSITE MATERIAL, AND COATING DEVICE

CROSS REFERENCE TO RELATED APPLICATIONS

This is the U.S. National Phase application of PCT/JP2019/032492, filed Aug. 20, 2019, which claims priority to Japanese Patent Application No. 2018-155072, filed Aug. 22, 2018, and Japanese Patent Application No. 2018-170400, filed Sep. 12, 2018, the disclosures of each of these applications being incorporated herein by reference in their entireties for all purposes.

FIELD OF THE INVENTION

The present invention relates to a method of producing a prepreg, and particularly relates to a method of impregnating a reinforcing fiber sheet with a matrix resin uniformly.

BACKGROUND OF THE INVENTION

Fiber reinforced composite materials (FRP) in which a matrix resin containing a thermoplastic resin or a thermosetting resin is reinforced with a reinforcing fiber are used in various fields such as aerospace materials, automobile materials, industrial materials, pressure vessels, construction materials, housings, medical applications, and sports applications. Carbon fiber reinforced materials (CFRP) are widely and suitably used particularly in cases where a high mechanical property and lightness are required. On the other hand, in some of the cases where cost has priority over a mechanical property and lightness, glass fiber reinforced composite materials (GFRP) are used. FRP is obtained by impregnating a reinforcing fiber bundle with a matrix resin to obtain an intermediate base material, which is laminated and formed, and further thermally cured if a thermosetting resin is used, members composed of FRP are then produced. In the above-mentioned applications, planar objects or objects formed by folding planar objects are often used, and two-dimensional sheet-like objects are more widely used as intermediate base materials of FRP than one-dimensional strands and roving-like objects, from the viewpoint of lamination efficiency and moldability achieved in producing such members.

In addition, an attempt to enhance production efficiency for members composed of FRP has recently promoted the mechanization and automation of lamination of sheet-like intermediate base materials, and here, narrow tape-like intermediate base materials are suitably used. Narrow tape-like intermediate base materials can be obtained by slicing broad sheet-like intermediate base materials into tapes having a desired width or impregnating a narrow reinforcing fiber sheet directly with matrix resins.

A two-dimensional sheet-like intermediate base material that is commonly used is prepreg. Prepreg is produced by providing and/or impregnating a reinforcing fiber with a matrix resin. Examples of reinforcing fiber sheets include: a unidirectional material (UD base material) in which a plurality of reinforcing fibers are unidirectionally arranged in planar form; and a reinforcing fiber fabric formed by arranging reinforcing fibers multiaxially or randomly into a sheet.

A hot-melt process that is one of the methods of producing prepregs is a method in which a matrix resin is melted and then applied onto release paper sheets, a laminated structure is produced in which a reinforcing fiber sheet is sandwiched between the matrix resin sheets at the upper side and lower side of the reinforcing fiber sheet, and then, the inside of the reinforcing fiber sheet is impregnated with the matrix resin by heat and pressure. There is a problem in that this method has many steps, cannot increase the production speed, and is costly.

For more efficient impregnation, for example, Patent Literature 1 has made a proposition. This is a method in which glass fiber is melted and spun, and the resulting spinning bundled in strand form or roving form is allowed to pass through a liquid pool filled with a thermoplastic resin and having a conical flow path.

As another example, Patent Literature 2 describes a method in which a coating film is formed on both faces of a sheet-like object simultaneously, but this is a method in which a sheet-like object is allowed to pass through a web-guide and coated using a pipe type doctor blade in order to prevent fluctuation of the sheet-like object in the formation of the coating film.

As a method of producing strip-like prepreg using a thermoplastic resin, a horizontal type pultrusion method is known in which a strip-like reinforcing fiber bundle is conveyed in the horizontal direction (cross direction) and is allowed to pass through a die, where the strip-like reinforcing fiber bundle is provided and impregnated with a thermoplastic resin (Patent Literature 3). Patent Literature 3 explains that a plurality of strip-like reinforcing fiber bundles are separately introduced into a die filled with molten thermoplastic resin, opened, impregnated, and laminated using a fixed guide (for example, a squeeze bar), and finally withdrawn from the die as one sheet of prepreg.

Patent Literature 4 describes a device that causes ultrasonic vibration at the outlet of a manifold in a pultrusion method in which the manifold is filled with a thermoplastic resin, from which a reinforcing fiber bundle is pultruded longitudinally.

In another known approach, a prepreg or a CFRP obtained by curing a prepreg is provided with a particle-containing matrix resin so as to arrange particles in the surface of the prepreg in order to enhance the functional property and mechanical property of the material. For example, in a known approach (Patent Literature 5), a prepreg produced using polymer particles enhances the impact resistance of a CFRP, wherein the polymer particles are arranged in the surface layer of the prepreg.

PATENT LITERATURE

Patent Literature 1: WO2001/028951A1
Patent Literature 2: JP H10-337516A
Patent Literature 3: WO2012/002417
Patent Literature 4: JP H01-178412A
Patent Literature 5: JP H01-104624A

SUMMARY OF THE INVENTION

However, the method in Patent Literature 1 enables only a strand-like or roving-like object to be produced, and is not applicable to producing a sheet-like prepreg at which the present invention is directed. In addition, Patent Literature 1 explains that, in order to enhance impregnation efficiency, a thermoplastic resin fluid is allowed to strike against a side of the strand-like or roving-like reinforcing fiber bundle to actively generate turbulence in a conical flow path. This is considered to be intended to disturb part of the arrangement of the reinforcing fiber bundle so that the matrix resin can flow in, but applying this idea to a reinforcing fiber sheet conceivably causes the reinforcing fiber sheet to be deformed, resulting in not only degrading the quality of the prepreg but also decreasing the mechanical property of FRP.

In addition, if the technology of Patent Literature 2 is applied, abrasion at the web-guide generates fuzz, conceivably making it difficult for the reinforcing fiber sheet to run. In addition, the technology of Patent Literature 2 is intended for coating with resin, not for impregnation.

In addition, the method of Patent Literature 3 makes it more likely that fuzz is retained in a liquid pool during continuous production and that the fuzz clogs a pultrusion portion. There is a problem in that, in particular, running a strip-like reinforcing fiber bundle continuously at a high speed causes the frequency of clogging with fuzz to be very high, and accordingly, enables production to be carried out only at a very low speed and fails to increase productivity. In addition, a horizontal type pultrusion method makes it necessary to seal the die hermetically to prevent liquid leakage and makes it insufficient to collect fuzz during continuous production. Furthermore in the horizontal type pultrusion method, impregnating the inside of a reinforcing fiber sheet with a matrix resin causes bubbles remaining in the strip-like reinforcing fiber bundle to be discharged, by ascending force, in a direction perpendicular to the orientation direction of the reinforcing fiber bundle (in the thickness direction of the strip-like reinforcing fiber bundle), and accordingly, the discharge of the bubbles progresses in such a manner that the bubbles push away the matrix resin in-coming for impregnation. Because of this, there is a problem in that not only the movement of the bubbles is inhibited by the liquid, but also the impregnation with the matrix resin is inhibited by the bubbles, resulting in low impregnation efficiency. Furthermore, the Patent Literature also proposes exhausting bubbles through a vent, but the exhaustion takes place only near the outlet of a die, and the effect of the exhaustion is considered to be limitative.

In a method described in Patent Literature 4, a nozzle portion filled with no resin is disposed in the portion above a manifold. The nozzle can be optimized with a strand or a roving-form object but does not easily cope with a planar shape such as of a reinforcing fiber sheet. While passing through this nozzle, a reinforcing fiber sheet generates fuzz, which is conceivably more likely to clog a die when brought into the manifold.

Furthermore, the Examples section in Patent Literature 5 describes a method of producing a prepreg using a conventional hot-melt process, but the method causes the number of steps to be large, and does not enable the production speed to be increased.

As above-mentioned, such a method of producing a prepreg as can efficiently provide and/or impregnate a reinforcing fiber sheet with a matrix resin has not been established yet.

An object of the present invention relates to a method of producing a prepreg, and is to provide a production method and a coating device for a prepreg, wherein generation of fuzz is suppressed, continuous production is possible without clogging with fuzz, a reinforcing fiber sheet is efficiently impregnated with a matrix resin, and the production speed can be made higher. Another object is to provide an efficient production method and coating device of a prepreg, which are intended to functionalize a prepreg and the surface of a CFRP.

The above-mentioned problem is solved by a method of producing a prepreg according to the present invention, including: allowing a reinforcing fiber sheet to pass substantially vertically downward through the inside of a coating section storing a matrix resin to apply the matrix resin to the reinforcing fiber sheet; and then applying a resin film to a primary impregnate prepreg withdrawn from the coating section; wherein the coating section includes a liquid pool and a narrowed section which are in communication with each other; wherein the liquid pool has a portion whose cross-sectional area decreases continuously along a running direction of the reinforcing fiber sheet, and wherein the narrowed section has a slit-like cross-section and has a smaller cross-sectional area than the top side of the liquid pool.

In addition, the present invention provides a method of producing a prepreg, including: allowing a reinforcing fiber sheet to pass substantially vertically downward through the inside of a coating section storing a matrix resin; applying the matrix resin to the reinforcing fiber sheet to obtain a primary impregnate prepreg; and providing the surface thereof with particles having an average particle size of 0.1 µm or more and 500 µm or less by at least one method selected from the group consisting of the following [1] to [4]: [1] a method of causing the particles to fall onto a running base material by their own weight, [2] a method of causing a base material to pass through a space in which the particles are diffused, [3] a method using electrostatic coating, and [4] a method using a gas stream mixed with particles; wherein the coating section includes a liquid pool and a narrowed section which are in communication with each other, wherein the liquid pool has a portion whose cross-sectional area decreases continuously along a running direction of the reinforcing fiber sheet, and wherein the narrowed section has a slit-like cross-section and has a smaller cross-sectional area than the top side of the liquid pool.

In addition, the present invention provides a method of producing a prepreg tape obtained by slitting the prepreg.

Furthermore, the present invention provides a fiber reinforced composite material obtained by molding the prepreg and/or the prepreg tape.

The method of producing a prepreg according to the present invention makes it possible to significantly suppress and prevent clogging with fuzz. Furthermore, the method enables the reinforcing fiber sheet to be run continuously at a high speed, and enhances the productivity of the prepreg.

Furthermore, the present invention makes it possible to obtain a prepreg uniformly provided and/or impregnated with a matrix resin even if the matrix resin contains particles.

BRIEF DESCRIPTION OF DRAWINGS

FIG. 1b is a schematic diagram depicting a production method and coating device of a prepreg according to the present invention in an embodiment other than in FIG. 1a.

FIG. 4b is a schematic cross-sectional view explaining the circular stream of the matrix resin 2 in the clearance gap 26 in FIG. 4a.

DETAILED DESCRIPTION OF EMBODIMENTS OF THE INVENTION

Preferred embodiments of the present invention will be described with reference to the drawings. In this regard, the following description illustrates embodiments of the present invention, the present invention is not to be construed to be limited to the embodiments, and various modifications can be made to the invention to the extent that they do not depart from the object and effect of the present invention.

<Outline of Method of Producing Prepreg>

Figure 1A:
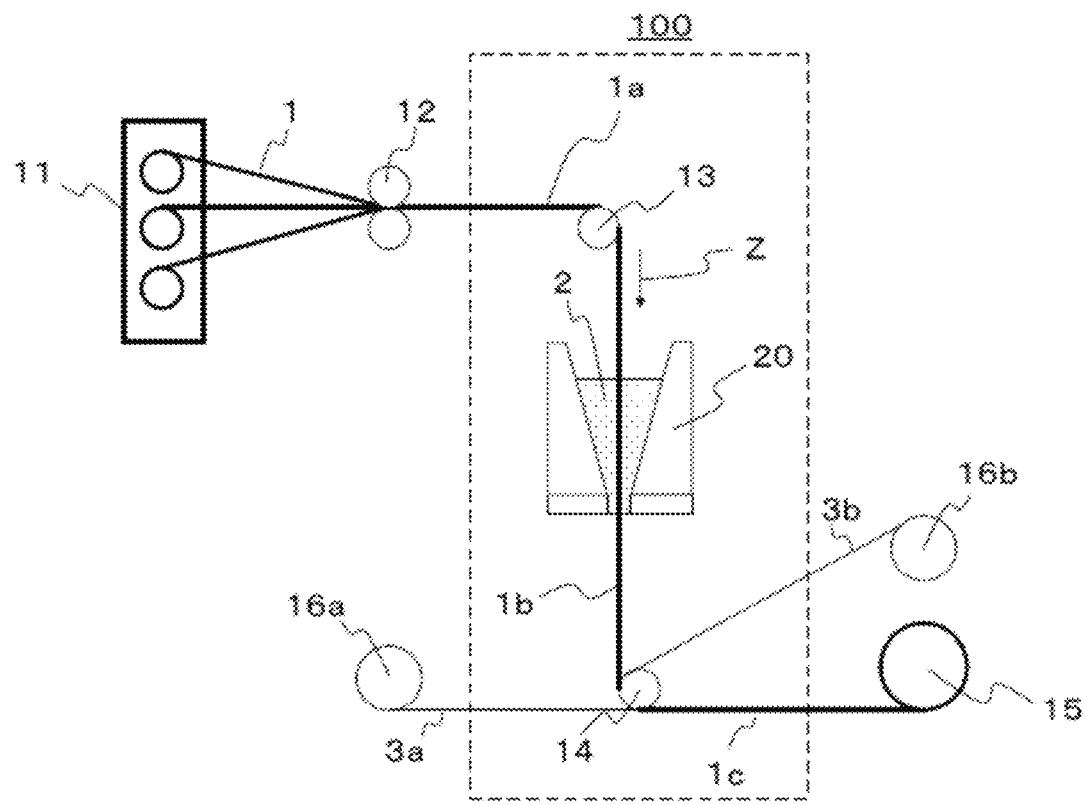
FIG. 1a is a schematic diagram depicting a production method and coating device of a prepreg according to one embodiment of the present invention.

First, the outline of a method of producing a prepreg according to the present invention will be described with reference to FIG. 1a. FIG. 1 is a schematic diagram depicting a production method and device of a prepreg according to one embodiment of the present invention. A coating device 100 includes: conveyance rolls 13 and 14 as a running mechanism for running a reinforcing fiber sheet 1a in the substantially vertically downward direction Z; and a coating section 20 that is disposed between the conveyance rolls 13 and 14 and stores a matrix resin 2. Also before and after the coating device 100, it is possible to provide a plurality of creels 11 for unwinding reinforcing fibers 1, an arrangement device 12 for obtaining a reinforcing fiber sheet 1a in which the unwound reinforcing fibers 1 are arranged unidirectionally (arranged in the depth direction of the page in FIG. 1a), and a wind-up device 15 for a prepreg 1c, and in addition, the coating device 100 is equipped with a supply device for a matrix resin, though the supply device is not shown in the drawing. The coating device 100 further includes supply devices 16a and 16b for supplying resin films 3a and 3b.

Figure 1B:
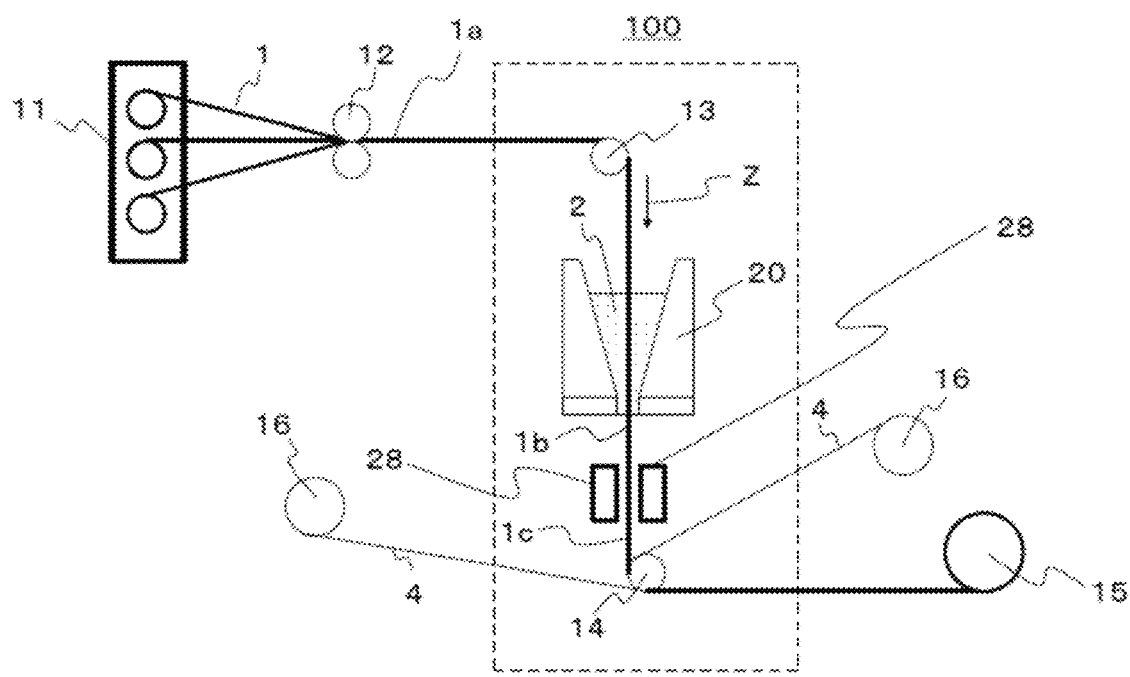

Next, the outline of another method of producing a prepreg according to the present invention will be described with reference to FIG. 1b. FIG. 1b is a schematic diagram depicting a method of producing a prepreg, wherein a UD base material is used as a reinforcing fiber sheet according to one embodiment of the present invention. A coating device 100 includes: conveyance rolls 13 and 14 as a running mechanism for running a reinforcing fiber sheet 1a in the substantially vertically downward direction Z; and a coating section 20 as a coating mechanism that is disposed between the conveyance rolls and stores a matrix resin 2. The coating device includes a particle-providing device 28 downstream of the coating section 20 in the process, wherein, in the particle-providing device, a primary impregnate prepreg 1b resulting from passing through the coating section 20 is provided with particles. Also before and after the coating device 100, it is possible to provide a plurality of creels 11 for unwinding reinforcing fibers 1, an arrangement device 12 for obtaining a reinforcing fiber sheet 1a as a UD base material in which the unwound reinforcing fibers 1 are arranged unidirectionally (arranged in the depth direction of the page in FIG. 1b), and a wind-up device 15 for a prepreg 1c, and in addition, the coating device 100 is equipped with a supply device for a matrix resin, though the supply device is not shown in the drawing. Furthermore, if necessary, the coating device 100 can be equipped with a supply device 16 for supplying a release sheet 4.

Next, a production method according to the present invention will be described more specifically. FIG. 1b shows an example in which a plurality of reinforcing fibers 1 unwound from creels 11 are arranged by an arrangement device 12 to obtain a reinforcing fiber sheet 1a, the running direction of which is diverted from the horizontal direction to the vertically downward direction by a conveyance roll 13 and which is passed through a coating section 20 to obtain a primary impregnate prepreg 1b, followed by providing at least one face of the primary impregnate prepreg 1b with particles in a particle-providing device 28 to obtain a prepreg 1c. Although omitted in FIG. 1b, a reinforcing fiber sheet widening device, smoothing device, and/or reinforcing fiber preheating device can suitably be used between the creels, from which the reinforcing fibers are unwound, and the coating section. In addition, the order in which the arrangement device, reinforcing fiber sheet widening device, smoothing device, and reinforcing fiber preheating device are used can be suitably changed. After the prepreg 1c is obtained, the prepreg 1c is wound up by a wind-up device 15. In addition, at least one side of the prepreg 1c may be provided with a release sheet 4, and the prepreg 1c and the release sheet 4 may be simultaneously wound up using the wind-up device 15. In particular, in cases where part of the matrix resin 2 contained in the prepreg 1c is still present on the surface of the prepreg 1c and has high fluidity and adhesiveness when the matrix resin 2 reaches the conveyance roll 14, the release sheet 4 can prevent the part of the matrix resin 2 on the surface of the prepreg 1c from being adhered or transferred to the conveyance roll 14. Furthermore, the method can prevent adhesion between parts of the prepreg 1c and affords easy handling in the post-process. The release sheet is not limited to a particular one as long as the release sheet achieves the above-mentioned effect, and examples thereof include not only a release paper sheet but also an organic polymer film whose surface is coated with a release agent, and the like.

Providing particles after applying a matrix resin can make the viscosity of the matrix resin lower than applying a matrix resin containing particles, and can stabilize the running of the reinforcing fiber sheet in the coating section. In particular, in cases where particles to be provided are toughness-enhancing particles, the particles are preferably arranged in the surface layer of the prepreg. Providing the particles after coating in the coating section is more likely to cause the particles to remain in the surface layer of the prepreg, and thus, is preferable.

In addition, a reinforcing fiber fabric can be used as a reinforcing fiber sheet. In this case, a prepreg for which a reinforcing fiber fabric is used can be produced, for example, by replacing the creels 11 with an unwinding device for unwinding a reinforcing fiber fabric, or by replacing the arrangement device 12 with a nip roll for withdrawing a reinforcing fiber fabric, in FIG. 1b.

<Reinforcing Fiber Sheet>

Here, examples of the reinforcing fiber 1 include carbon fibers, glass fibers, metal fibers, metal oxide fibers, metal nitride fibers, organic fibers (aramide fibers, polybenzoxazole fibers, polyvinyl alcohol fibers, polyethylene fibers, polyamide fibers, polyester fibers, and the like), and the like, and carbon fibers are preferably used, from the viewpoint of the mechanical property and lightness of FRP.

A reinforcing fiber sheet is a sheet formed by arranging or randomly arranging reinforcing fibers, and examples of reinforcing fiber sheets include: a unidirectional material (UD base material) in which a plurality of reinforcing fibers are unidirectionally arranged in planar form; a reinforcing fiber fabric formed by arranging reinforcing fibers multiaxially; and a reinforcing fiber fabric formed into a sheet by randomly arranging reinforcing fibers.

The method used to form a UD base material may be a known method and is not limited to any particular one, and it is preferable from the viewpoints of process efficiency and arrangement uniformity to preliminarily arrange single fibers to form a reinforcing fiber bundle, followed by further arranging the reinforcing fiber bundle to form a reinforcing fiber sheet. For example, in the case of carbon fiber, a "tow" that is a tape-like reinforcing fiber bundle is wound on a bobbin, and a reinforcing fiber sheet can be obtained by arranging the tape-like reinforcing fiber bundle withdrawn from the bobbin. In addition, it is preferable to have a reinforcing fiber arrangement mechanism for orderly arranging reinforcing fiber bundles withdrawn from the bobbins fit onto the creels so that there can be no undesirable overlapping nor folding in the reinforcing fiber bundles in the reinforcing fiber sheet and no split between the reinforcing fiber bundles. As a reinforcing fiber arrangement mechanism, a known roller, a comb type of arrangement device, or the like can be used. In addition, layering a plurality of preliminarily arranged reinforcing fiber sheets is useful from the viewpoint of decreasing split between the reinforcing fibers. In this regard, the creels are preferably provided with a tension control mechanism operated when the reinforcing fibers are withdrawn. As a tension control mechanism, a known one can be used, and examples thereof include a braking mechanism. In addition, tension can also be controlled, for example, by adjusting a yarn guide.

On the other hand, specific examples of reinforcing fiber fabrics include not only woven fabrics, knitted fabrics, and the like but also two-dimensionally and multiaxially arranged reinforcing fibers and randomly oriented reinforcing fibers such as non-woven fabrics, mats, and paper. In this case, the reinforcing fiber can be formed into a sheet by utilizing a method such as binder-providing, confounding, welding, or fusing. Examples of woven fabrics that can be used include not only basic fabric structures such as plain weaves, twill, satin, and non-crimp fabrics but also bias structures, leno weaves, multiaxially woven fabrics, multi-woven fabrics, and the like. In a woven fabric formed by combining a bias structure and a UD base material, not only the UD structure inhibits the woven fabric from being deformed by a tension in a coating/impregnating process, but also the bias structure also causes quasi-isotropy, and thus, is a preferable aspect. In addition, a multi-woven fabric is advantageous in that the upper face and/or lower face of the woven fabric and the structure and properties of the inside of the woven fabric can be designed separately. A preferable knitted fabric is warp knitting taking into consideration the shape stability in the coating/impregnating process, and it is also possible to use braid which is circular knitting.

Among these, a UD base material is preferably used in cases where the mechanical property of FRP is prioritized, and a UD base material can be produced by a known method of arranging reinforcing fibers unidirectionally in sheet form.

<Smoothing of Reinforcing Fiber Sheet>

In the present invention, increasing the surface smoothness of the reinforcing fiber sheet can enhance the uniformity of the coating amount in the coating section. For this reason, the reinforcing fiber sheet is preferably introduced into the liquid pool after it is smoothed. The smoothing treatment method is not limited to a particular one, and examples thereof include a method in which physical pressure is applied using opposing rolls or the like and a method in which reinforcing fibers are moved using air flow. A method in which physical pressure is applied is easy and convenient, less likely to disturb the arrangement of the reinforcing fibers, and accordingly preferable. More specifically, calendering or the like can be used. The method in which air flow is used not only is less likely to cause abrasion but also has the effect of widening a reinforcing fiber sheet, and accordingly, is preferable.

<Widening of Reinforcing Fiber Sheet>

In the present invention, it is also preferable from the viewpoint of enabling a thin prepreg to be produced efficiently that the reinforcing fiber sheet is introduced into the liquid pool after it is treated for widening of the fiber bundle. The treatment method of widening of the fiber bundle is not limited to a particular one, and examples thereof include a method in which vibration is applied mechanically, a method in which the reinforcing fiber bundle is expanded using air flow, and the like. Examples of methods in which vibration is applied mechanically include a method in which a reinforcing fiber sheet is brought in contact with vibrating rolls, as described, for example, in JP 2015-22799 A. As to the vibration direction, vibration is preferably applied in the Y-axis direction (horizontal direction) or the Z-axis direction (vertical direction), assuming that the running direction of the reinforcing fiber sheet is the X-axis. It is also preferable to use a combination of the horizontally vibrating rolls and the vertically vibrating rolls. In addition, providing a plurality of projections on the surface of the vibration roll makes it possible to suppress abrasion of the reinforcing fiber on the roll, and accordingly is preferable. As a method in which air flow is used, for example, a method described in SEN-I GAKKAISHI, vol. 64, P-262-267 (2008) can be used.

<Preheating of Reinforcing Fiber Sheet>

In the present invention, introducing the reinforcing fiber sheet into the liquid pool after heating the sheet suppresses a decrease in the temperature of the matrix resin and enhances the viscosity uniformity of the matrix resin, and accordingly, is preferable. The reinforcing fiber sheet is preferably heated up to or to the vicinity of the temperature of the matrix resin, and examples of various heating means that can be used for this purpose include air heating, infrared heating, far-infrared heating, laser heating, contact heating, heat medium heating (steam), and the like. Among others, an infrared heating device is easy and convenient and can directly heat the reinforcing fiber sheet, and accordingly, can achieve efficient heating up to a desired temperature even at a high running speed, and is preferable.

<Matrix Resin>

A matrix resin used in the present invention can be used as a resin composition containing any of the below-mentioned various resins, particles, hardeners, and further containing any of various kinds of additives. A prepreg obtained according to the present invention is in a state in which a reinforcing fiber sheet is impregnated with a matrix resin, and the reinforcing fiber sheet can be directly laminated and molded as a sheet-like prepreg to afford members composed of FRP. The degree of impregnation can be controlled in accordance with the design of the coating section and through an additional-impregnation process carried out after coating. A matrix resin can suitably be selected in accordance with the application, and a thermoplastic resin or thermosetting resin is generally used. The matrix resin may be a molten resin melted by heating or a resin fluid at room temperature. In addition, the matrix resin may be formed into a solution or varnish using a solvent.

Examples of matrix resins that can be used include matrix resins generally used for FRP, such as thermoplastic resins, thermosetting resins, and photo-curable resins. If these are liquids at room temperature, they may be directly used. If they are solids or viscous liquids at room temperature, they may be heated to decrease the viscosity, may be melted to be used as a melt, or may be dissolved in a solvent to be used as a solution or varnish.

Examples of thermoplastic resins that can be used include polymers having, in the principal chain, a bond selected from a carbon-carbon bond, an amide bond, an imide bond, an ester bond, an ether bond, a carbonate bond, a urethane bond, a urea bond, a thioether bond, a sulfone bond, an imidazole bond, and a carbonyl bond. Specific examples include polyacrylate, polyolefin, polyamide (PA), aramid, polyester, polycarbonate (PC), polyphenylenesulfide (PPS), polybenzimidazole (PBI), polyimide (PI), polyetherimide (PEI), polysulfone (PSU), polyethersulfone (PES), polyetherketone (PEK), polyetheretherketone (PEEK), polyetherketoneketone (PEKK), polyaryletherketone (PAEK), polyamideimide (PAI), and the like. In fields requiring heat resistance, such as aircraft applications, PPS, PES, PI, PEI, PSU, PEEK, PEKK, PEAK, and the like are suitable. On the other hand, in industrial and automobile applications, PA, polyester, PPS, a polyolefin such as polypropylene (PP), and the like are suitable in order to increase molding efficiency. These may be polymers, or oligomers or monomers may be used, because of the low viscosity and low temperature coating. Needless to say, these may be copolymerized depending on the purpose, or various kinds of them can be mixed to be used as polymer blends or a polymer alloys.

Examples of thermosetting resins include epoxy resins, maleimide resins, polyimide resins, resins having an acetylene terminal, resins having a vinyl terminal, resins having an allyl terminal, resins having a nadic acid terminal, and resins having a cyanate ester terminal. These can be used generally in combination with a hardener or a curing catalyst. In addition, these thermosetting resins can suitably be used in mixture.

As thermosetting resins suitable for the present invention, epoxy resins are suitably used in that epoxy resins have excellent heat resistance, chemical resistance, and mechanical property. In particular, amines, phenols, and epoxy resins whose precursor is a compound having a carbon-carbon double bond are preferable. Specific examples include, but are not limited to: epoxy resins whose precursors are amines, such as various isomers of tetraglycidyl diaminodiphenylmethane, triglycidyl-p-aminophenol, triglycidyl-m-aminophenol, and triglycidylaminocresol; epoxy resins whose precursors are phenols, such as bisphenol A epoxy resins, bisphenol F epoxy resins, bisphenol S epoxy resins, phenol novolac epoxy resins, and cresol novolac epoxy resins; epoxy resins whose precursors are compounds having a carbon-carbon double bond, such as alicyclic epoxy resins; and the like. Bromated epoxy resins resulting from bromating these epoxy resins are also used. Epoxy resins whose precursors are aromatic amines and which are typified by tetraglycidyl diaminodiphenylmethane are most suitable for the present invention because the epoxy resins have good heat resistance and good adhesiveness to reinforcing fibers.

Thermosetting resins are preferably used in combination with hardeners. For example, for epoxy resins, a hardener can be used if the hardener is a compound having an active group capable of reacting with an epoxy group. Preferably, compounds having an amino group, an acid anhydride group, or an azido group are suitable. Specifically, various isomers of dicyandiamide and diaminodiphenyl sulfone are, and amino benzoic acid ester types are, suitable. According to specific description, dicyandiamide provides excellent storage stability of prepreg, and accordingly, is used by preference. In addition, various isomers of diaminodiphenyl sulfone afford cured objects having good heat resistance, and accordingly, are most suitable for the present invention. As amino benzoic acid ester types, trimethyleneglycol di-p-aminobenzoate and neopentylglycol di-p-aminobenzoate are used by preference and have lower heat resistance but have excellent tensile strength, compared with diaminodiphenyl sulfone, and accordingly, are used selectively in accordance with the application. Needless to say, a curing catalyst can also be used, if necessary. In addition, a hardener or a curing catalyst and a complexing agent capable of forming a complex can be used together, from the viewpoint of enhancing the pot life of a matrix resin.

In the present invention, a mixture of a thermosetting resin and a thermoplastic resin is also suitably used. A mixture of a thermosetting resin and a thermoplastic resin affords better results than a thermosetting resin used singly. This is because a thermosetting resin and a thermoplastic resin have antinomic characteristics: that is, a thermosetting resin is generally disadvantageouly brittle but can be molded at low pressure in an autoclave, and contrarily, a thermoplastic resin is generally advantageously tough but difficult to mold at low pressure in an autoclave, and accordingly, using these in mixture can effect a balance between properties and moldability. Such a mixture to be used preferably contains more than 50 mass % thermosetting resin, from the viewpoint of the mechanical property of FRP obtained by curing prepreg.

<Particles Contained in Matrix Resin or Resin Film>

In the present invention, it is also possible to allow the matrix resin or the resin film to contain inorganic particles or organic particles. Such inorganic particles are not limited to any particular ones, and from the viewpoint of affording electrical conductivity, heat transfer properties, thixotropy, and/or the like, examples of inorganic particles that can be suitably used include carbon-based particles, boron nitride particles, titanium dioxide particles, silicon dioxide particles, and the like. Such organic particles are also not limited to any particular ones. In particular, use of polymer particles can enhance the toughness, impact resistance, and damping performance of the resulting FRP, and thus, is preferable. In this case, the glass transition temperature (Tg) or melting temperature (Tm) of polymer particles which is 20° C. or more higher than the temperature of a matrix resin makes it easier to retain the form of the polymer particle in the matrix resin, and accordingly is preferable. The Tg of polymer particles can be measured under the following conditions using a temperature-modulated DSC. As a temperature-modulated DSC device, Q1000 manufactured by TA Instruments, Inc. is suitable, and this can be used on the basis of calibration carried out using high-purity indium under a nitrogen atmosphere. The measurement conditions can be based on a temperature ramp rate of 2° C./min., and the temperature-modulation condition can be based on a cycle of 60 seconds and an amplitude of 1° C. The reversible components are separated from the total heat flow obtained under these conditions, and the temperature at the midpoint of the step signal can be regarded as Tg.

In addition, Tm can be measured using a common DSC at a temperature ramp rate of 10° C./min., and the temperature at the peak top of the peak-shaped signal corresponding to melting is regarded as Tm.

In addition, the polymer particles are preferably insoluble in a matrix resin, and as such polymer particles, suitable ones described in, for example, WO2009/142231 as a reference can be used. More specifically, polyamides and polyimides can be preferably used, and polyamides that have excellent toughness and accordingly can significantly enhance the impact resistance are most preferable. Examples of polyamides that can be suitably used include polyamide 12, polyamide 11, polyamide 6, polyamide 66, polyamide 6/12 copolymers, and a polyamide modified to have a semi IPN (macromolecular interpenetrating network structure) with an epoxy compound (semi IPN polyamide) described in Example 1 of JP H01-104624A. As to the shape of this thermoplastic resin particle, the particle may be a spherical particle, a nonspherical particle, or a porous particle, and the spherical shape is particularly preferable in the production method according to the present invention in order not to decrease the resin flow property. In addition, the spherical shape is a preferable aspect in that the spherical shape has no starting point for stress concentration and affords high impact resistance.

Examples of commercially available polyamide particles that can be used include SP-500, SP-10, TR-1, TR-2, 842P-48, 842P-80 (which are all manufactured by Toray Industries, Inc.), "Orgasol®" 1002D, 2001UD, 2001EXD, 2002D, 3202D, 3501D, 3502D (which are all manufactured by Arkema K.K.), "Grilamid®" TR90 (manufactured by Emser Werke, Inc.), "TROGAMID®" CX7323, CX9701, CX9704 (manufactured by Degussa AG), and the like. These polyamide particles may be used singly or in combination of two or more kinds thereof.

In addition, polymer particles are preferably retained in the interlayer resin layer in the reinforcing fiber of FRP in order to impart high toughness to the interlayer resin layer in the reinforcing fiber. For this, the number average particle size of the polymer particles is preferably in the range from 5 to 50 μm, more preferably in the range from 7 to 40 μm, still more preferably in the range from 10 to 30 μm. Having a number average particle size of 5 μm or more makes it possible that the particles do not intrude into the reinforcing fiber bundle, but are retained in the interlayer resin layer in the reinforcing fiber of the obtained fiber reinforced composite material. Having a number average particle size of 50 μm or less makes it possible that the thickness of the matrix resin layer on the surface of the prepreg is made suitable, and eventually that the fiber mass content in the obtained FRP is made suitable.

In addition, laminating a primary impregnate prepreg in which a resin film containing particles is added makes it possible to arrange particles in the surface of the prepreg in a position-regulated manner.

<Viscosity of Matrix Resin>

A matrix resin used in the present invention preferably has an optimal viscosity selected from the viewpoint of processability and stability. Specifically, it is preferable to have a viscosity in the range from 1 to 60 Pa·s because such a viscosity makes it possible that drip of the liquid at the outlet of the narrowed section is suppressed and that the high-speed running properties and stable running properties of the reinforcing fiber sheet are enhanced. As used herein, a viscosity refers to one measured at a strain rate of $3.14\ \text{s}^{-1}$ at a matrix resin temperature in the liquid pool. As a measurement device, a viscoelasticity measurement device such as of a parallel disc type or a conical type can be used. The viscosity of the matrix resin is more preferably 10 to 30 Pa·s.

<Coating Step>

Taking a UD base material for example, a coating step of a matrix resin will be described with reference to FIG. 1. The method of providing the reinforcing fiber sheet 1a with the matrix resin 2 in the coating device 100 is a method in which a plurality of the reinforcing fibers 1 unwound from the creels 11 are arranged unidirectionally (in the depth direction of the page) through the arrangement device 12 to obtain the reinforcing fiber sheet 1a, and then, the reinforcing fiber sheet 1a is allowed to pass through the coating section 20 in the substantially vertically downward direction Z to provide both faces of the reinforcing fiber sheet 1a with the matrix resin 2. Thus, a primary impregnate prepreg 1b can be obtained.

Figure 2:
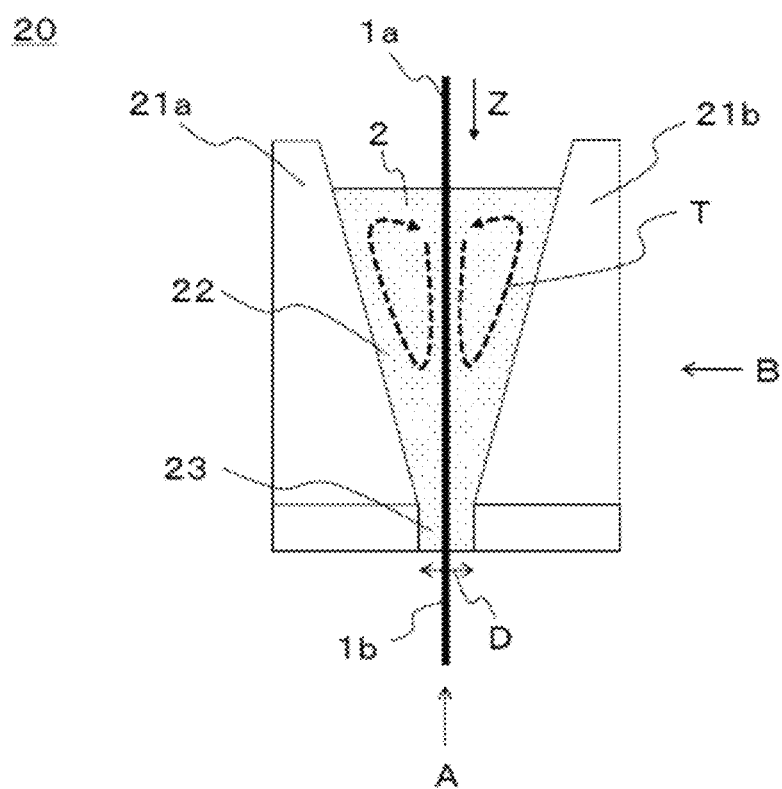
FIG. 2 is an enlarged detail cross-sectional view of the coating section 20 portion in FIG. 1.

Next, with reference to FIGS. 2 to 4, a step of providing the reinforcing fiber sheet 1a with the matrix resin 2 will be described in detail. FIG. 2 is an enlarged detail cross-sectional view of the coating section 20 in FIG. 1. The coating section 20 has wall constituent members 21a and 21b that are opposed to each other with a given gap D in between, and between the wall constituent members 21a and 21b, a liquid pool 22 whose cross-sectional area decreases continuously in the vertically downward direction Z (that is, in the running direction of the reinforcing fiber sheet) and a slit-like narrowed section 23 positioned below the liquid pool 22 (on the discharge side of the reinforcing fiber sheet 1a) and having a cross-sectional area smaller than the cross-sectional area of the top side of the liquid pool 22 (the introduction side of the reinforcing fiber sheet 1a) are formed. In FIG. 2, the reinforcing fiber sheet 1a is arranged in the depth direction of the page.

In the coating section 20, the reinforcing fiber sheet 1a introduced into the liquid pool 22 runs in the vertically downward direction Z, and, at the same time, is accompanied by the matrix resin 2 surrounding the reinforcing fiber sheet. During this, the accompanying matrix resin 2 is gradually compressed, and the pressure of the matrix resin 2 increases toward the lower portion of the liquid pool 22, because the cross-sectional area of the liquid pool 22 decreases in the vertical downward direction Z (in the running direction of the reinforcing fiber sheet 1a). When the pressure in the lower portion of the liquid pool 22 increases, it is more difficult for the accompanying liquid flow to flow toward the lower portion any further, and the accompanying liquid flows in the direction of the wall constituent members 21a and 21b, and then impeded by the wall constituent members 21a and 21b, resulting in flowing upward. As a result, a circular stream T is formed along the plane of the reinforcing fiber sheet 1a and the wall surfaces of the wall constituent members 21a and 21b in the liquid pool 22. Thus, even if the sheet-like reinforcing fiber 1a brings fuzz in the liquid pool 22, the fuzz moves along the circular stream T, and cannot approach the lower portion of the liquid pool 22, where the liquid pressure is larger, or the narrowed section 23. Further as below-mentioned, bubbles stick to the fuzz, and accordingly, the fuzz moves upward along the circular stream T, and passes near the liquid surface at the top of the liquid pool 22. This also makes it possible not only that the fuzz is prevented from clogging the lower portion of the liquid pool 22 and the narrowed section 23, but also that the retained fuzz is easily collected through the liquid surface at the top of the liquid pool 22. Furthermore, when the reinforcing fiber sheet 1a is run at a high speed, the liquid pressure further increases, and accordingly, the fuzz elimination effect becomes higher. As a result, this makes it possible to provide the reinforcing fiber sheet 1a with the matrix resin 2 at a higher speed, and enhances productivity significantly.

In addition, the increased liquid pressure has the effect of making it easier for the reinforcing fiber sheet 1a to be impregnated with the matrix resin 2. This is based on the property (Darcy's law) according to which the degree at which a porous object such as a reinforcing fiber bundle is impregnated with a matrix resin is increased by the pressure of the matrix resin. This can also enhance the impregnation effect because running the reinforcing fiber sheet 1a at a higher speed increases the liquid pressure further. In this regard, the matrix resin 2 is impregnated through gas-liquid replacement with bubbles remaining in the reinforcing fiber sheet 1a, and the bubbles are discharged from the split in the reinforcing fiber sheet 1a by the liquid pressure and ascending force in the orientation direction (in the vertically upward direction) of the fibers. Here, the bubbles are discharged without pushing away the in-coming matrix resin 2 for impregnation, and accordingly, also has the effect of not inhibiting impregnation. In addition, part of the bubbles are discharged in the out-of-plane direction (in the normal direction) from the surface of the reinforcing fiber sheet 1a, and the bubbles are eliminated rapidly by the liquid pressure and ascending force in the vertically upward direction, and accordingly, are not retained in that lower portion of the liquid pool 22 which affords a high impregnation effect, whereby the effect of promoting the discharge of the bubbles efficiently is also achieved. These effects enable the reinforcing fiber sheet 1a to be efficiently impregnated with the matrix resin 2, and, as a result, make it possible to obtain a high quality prepreg 1b impregnated uniformly with the matrix resin 2.

Further, the increased liquid pressure allows the reinforcing fiber sheet 1a to be automatically aligned with the center of the gap D, and the reinforcing fiber sheet 1a is not directly abraded against the wall surfaces of the liquid pool 22 and the narrowed section 23, whereby the effect of suppressing the generation of fuzz here is also achieved. This is because, when any external disturbance or the like causes the reinforcing fiber sheet 1a to approach either side in the gap D, the matrix resin 2 is pushed and compressed in the resulting narrower gap on the approached side, and accordingly, the liquid pressure further increases on the approached side, pushing the reinforcing fiber sheet 1a back to the center of the gap D.

The narrowed section 23 is designed to have a smaller cross-sectional area than the top side of the liquid pool 22. As understood from FIG. 2 and FIG. 4, the smaller cross-sectional area is simply due to the fact that the length in the direction perpendicular to the pseudo-plane of the reinforcing fiber sheet is smaller, that is, the distance between the members is narrower. This is intended to achieve the impregnation and the automatic alignment effect through increasing the liquid pressure in the narrowed section as above-mentioned. In addition, the cross-sectional shape of the uppermost face of the narrowed section 23 is preferably made to conform to the cross-sectional shape of the lowermost face of the liquid pool 22, from the viewpoint of the running properties of the reinforcing fiber sheet 1a and the flow control of the matrix resin 2, but, if necessary, the cross-sectional shape of the uppermost face of the narrowed section 23 may be made slightly larger.

In this respect, the reinforcing fiber sheet 1a in the coating section 20 in FIG. 2 runs in the completely vertically downward direction Z (at 90 degrees to the horizontal face), but, without limitation to this, may run in the substantially vertically downward direction to the extent that the fuzz collection effect and the bubbles discharge effect can be obtained, and that the reinforcing fiber sheet 1a can run stably and continuously.

In addition, the total amount of the matrix resin 2 applied to the reinforcing fiber sheet 1a can be controlled in the gap D in the narrowed section 23. For example, in cases where the total amount of the matrix resin 2 applied to the reinforcing fiber sheet 1a is desired to be larger (the areal weight is desired to be larger), the wall constituent members 21a and 21b may be disposed in such a manner that the gap D is wider.

Figure 3:
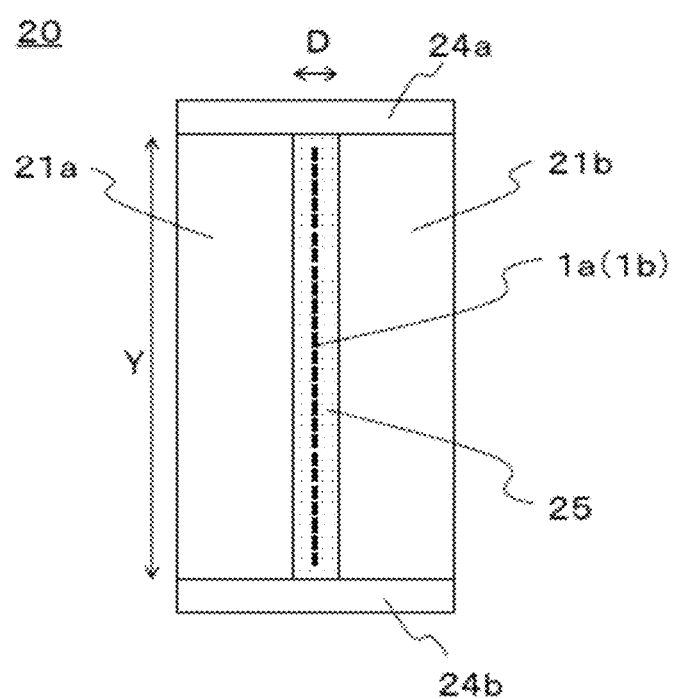
FIG. 3 is a bottom side view of the coating section 20 in FIG. 2, as viewed in the direction A in FIG. 2.

FIG. 3 is a bottom side view of the coating section 20, as viewed in the direction A in FIG. 2. In the coating section 20, side wall members 24a and 24b are provided to prevent the matrix resin 2 from leaking by both ends of the reinforcing fiber sheet 1a in the arrangement direction, and the outlet 25 of the narrowed section 23 is formed in the space surrounded by the wall constituent members 21a and 21b and the side wall members 24a and 24b. Here, the outlet 25 is slit-like, and the cross-sectional aspect ratio (Y/D in FIG. 3) may be set in accordance with the shape of the reinforcing fiber sheet 1a which is desired to be provided with the matrix resin 2.

Figure 4A:
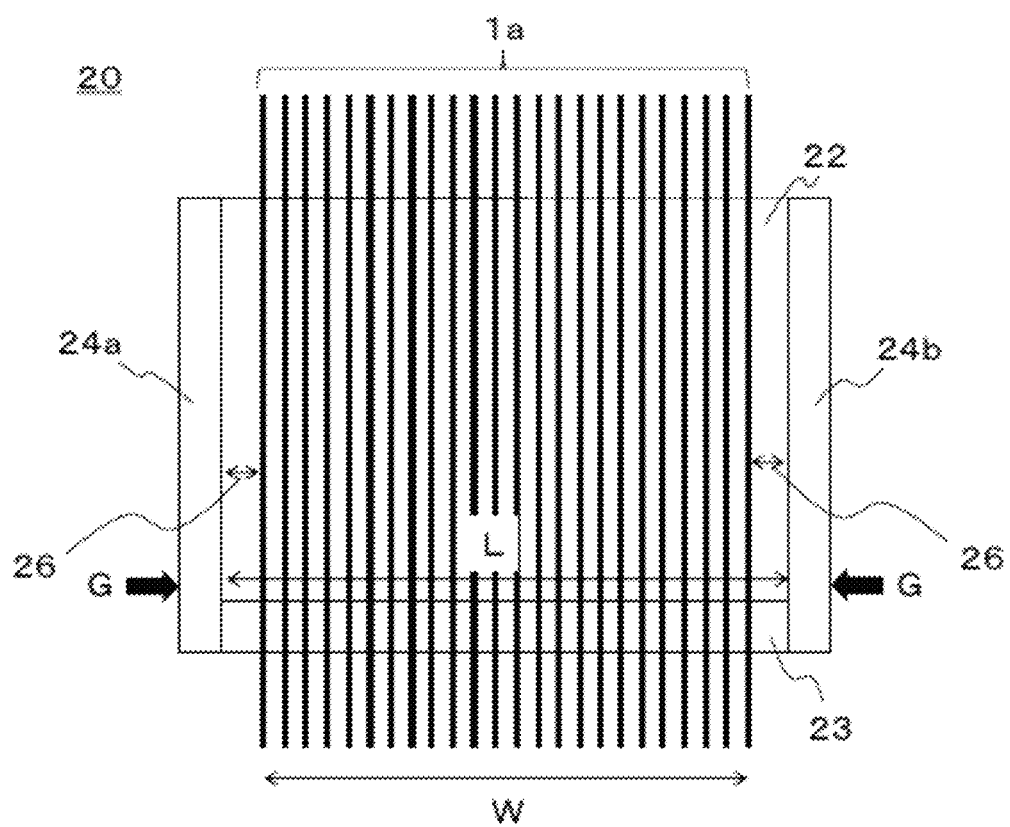
FIG. 4a is a cross-sectional view depicting the structure of the inside of the coating section 20 in FIG. 2, as viewed in the direction B in FIG. 2.

FIG. 4a is a cross-sectional view depicting the structure of the inside of the coating section 20, as viewed in the direction B. Here, to make the view easier to see, the wall constituent member 21b is omitted, and in addition, the reinforcing fiber sheet 1a is depicted as if the reinforcing fibers 1 are arranged with a clearance between the fibers, but, in reality, it is preferable to arrange the reinforcing fibers 1 with no clearance between the fibers, from the viewpoint of the grade of the sheet-like prepreg and the mechanical property of FRP.

Figure 4B:
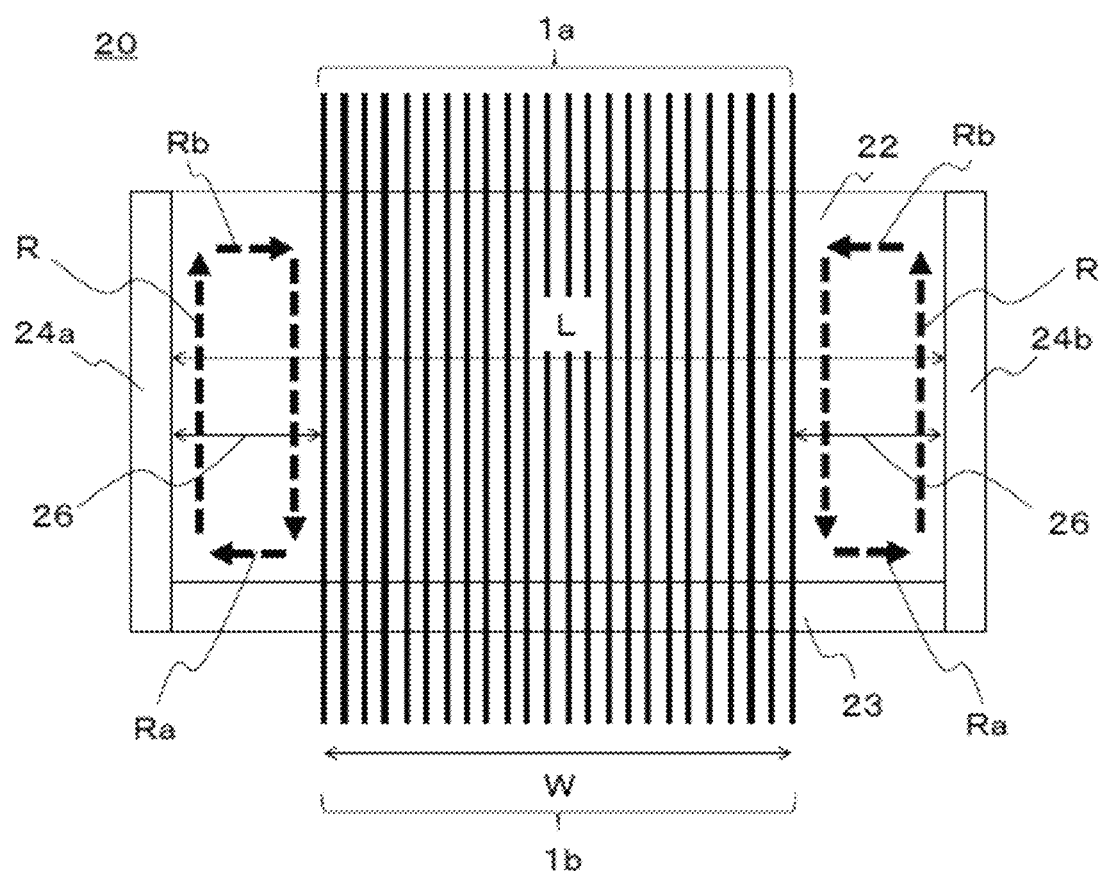

FIG. 4b depicts the circular stream of the matrix resin 2 in the clearance gap 26. When the clearance gap 26 is large, a circular stream in the edge is generated in the direction of R in the matrix resin 2. This circular stream R in the edge becomes an outward flow (Ra) in the lower portion of the liquid pool 22, and accordingly, results in tearing apart the reinforcing fiber sheet (causing split of the sheet-like fiber bundle) or expanding the distance between the reinforcing fibers, and because of this, there is a possibility that arrangement nonuniformity is caused in the reinforcing fibers in the resulting prepreg. That is, the circular stream R becomes an inward flow (Rb) in the upper portion of the liquid pool 22, and accordingly, the reinforcing fiber sheet 1a is compressed in the width direction, resulting in edge folding of the reinforcing fiber sheet in some cases. In a device, such as typified by Patent Literature 2 (JP3252278B), for coating both faces of an integrated sheet-like base material (particularly, a film) with a matrix resin, such a circular stream as caused in the edge in the clearance gap 26 affects the quality insignificantly, and accordingly, has attracted no attention.

In view of this, width regulation for making the clearance gap 26 smaller is carried out in the present invention, whereby the generation of the circular stream in the edge is preferably suppressed. Specifically, the width L of the liquid pool 22, that is, the distance L between the side plate members 24a and 24b is preferably adapted to satisfy the relationship of the following Formula (1) with the width W of the reinforcing fiber sheet measured immediately under the narrowed section 23.

$$L \le W + 10 \text{ (mm)} \tag{1}$$

This suppresses the generation of a circular stream in the edge and makes it possible to suppress split and edge folding of the reinforcing fiber sheet 1a and to obtain the prepreg 1b in which the reinforcing fibers 1 are uniformly arranged over the full width (W) of the prepreg 1b and which is of high grade and has high stability. Furthermore, this technology applied to a prepreg can not only enhance the grade and quality of the prepreg but also enhance the mechanical property and quality of FRP obtained using the prepreg. The relationship between L and W is more preferably $L \le W+2$ (mm), and thus, the split and edge folding of the reinforcing fiber sheet can further be suppressed.

In addition, it is preferable to make adjustments so that the lower limit of L is equal to or greater than W−5 (mm), from the viewpoint of enhancing the uniformity of the dimension in the width direction of the prepreg 1b.

In this regard, this width regulation is preferably carried out at least in the lower portion of the liquid pool 22 (the G position in FIG. 4a), from the viewpoint of suppressing the generation of the circular stream R in the edge due to a high liquid pressure in the lower portion of the liquid pool 22. Furthermore, this width regulation is more preferably carried out in the whole region of the liquid pool 22, whereby the generation of the circular stream R in the edge can be suppressed substantially completely, and, as a result, the split and edge folding of the reinforcing fiber sheet can be suppressed substantially completely.

In addition, the width regulation may be carried out only to the liquid pool 22 if it is carried out only from the viewpoint of suppressing the circular stream in the edge in the clearance gap 26, but it is preferable to carry out the width regulation also to the narrowed section 23 in the same way, from the viewpoint of suppressing excessive application of the matrix resin 2 to the sides of the primary impregnate prepreg 1b.

<Width Regulation Mechanism>

Figure 5:
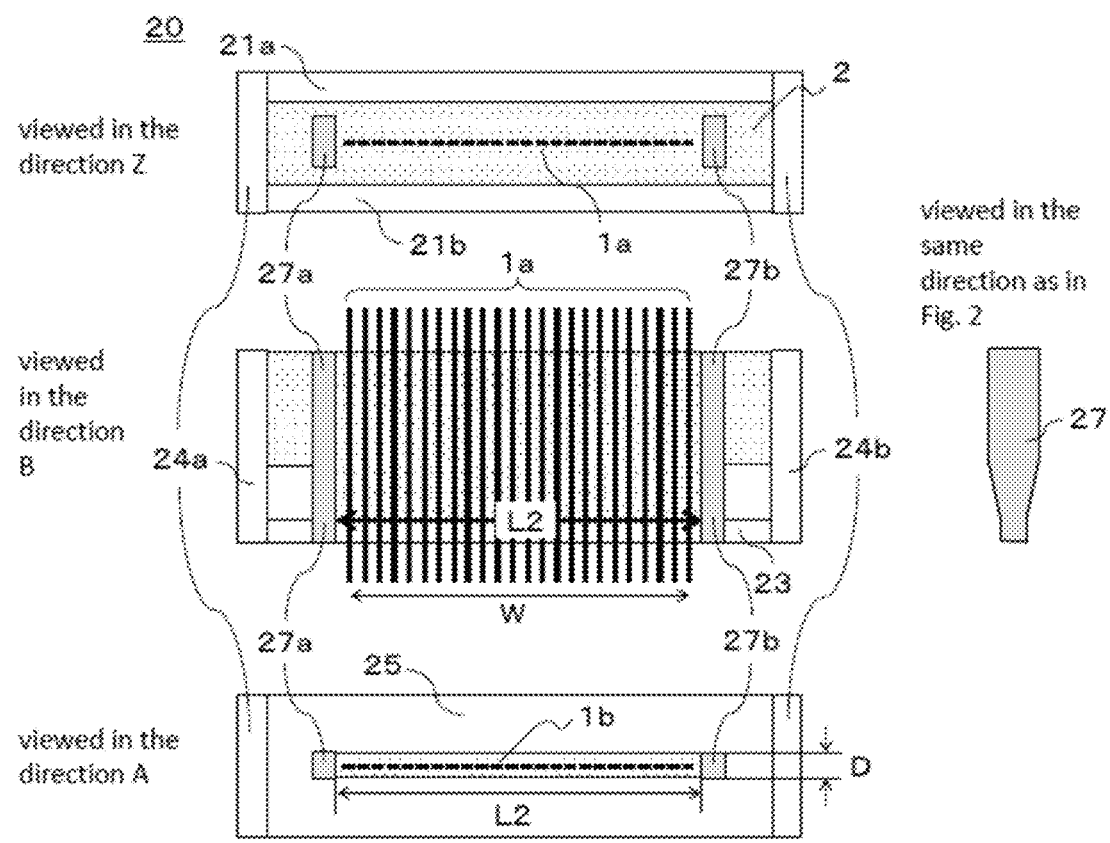
FIG. 5 is a view depicting an installation example of a width regulation mechanism.

The above-mentioned has described a case where the side wall members 24a and 24b serve for the purpose of width regulation, but, as shown in FIG. 5, it is also possible to provide width regulation mechanisms 27a and 27b between the side wall members 24a and 24b and to carry out width regulation using such mechanisms. This is preferable because the capability to freely change the width regulated by the width regulation mechanisms makes it possible to use one coating section to produce different prepregs having various widths. Here, the relationship between the width (W) of the reinforcing fiber sheet immediately under the narrowed section and the width (L2) regulated by the width regulation mechanisms at the bottom ends of the width regulation mechanisms preferably satisfies the following Formula (2).

$$L2 \le W+10 \text{ (mm)} \tag{2}$$

The relationship more preferably satisfies $L2 \le W+2$ (mm). In addition, it is preferable to make adjustments so that the lower limit of L2 is equal to or greater than W−5 (mm), from the viewpoint of enhancing the uniformity of the dimension in the width direction of the prepreg 1b. The shape and material of the width regulation mechanism are each not limited to a particular one, and a plate-like bush type is easy and convenient, and accordingly, preferable. In addition, allowing the width regulation mechanism to have a width smaller than the distance between the wall constituent members 21a and 21b in the upper portion, that is, near the liquid surface (as seen in FIG. 5, the width refers to the vertical length of the width regulation mechanism in the "View seen in the Z direction") is preferable because such a width makes it possible not to impede the horizontal flow of the matrix resin. On the other hand, the shape from the middle portion to the lower portion of the width regulation mechanism is preferably in conformity to the internal shape of the coating section because such conformity can make it possible to suppress the retention of the matrix resin in the liquid pool and suppress the degradation of the matrix resin. In this sense, the width regulation mechanism is preferably inserted into the narrowed section 23. FIG. 5 shows an example of a plate-like bush as the width regulation mechanism, and shows an example in which the portion from the middle portion to the lower portion of the bush is in conformity to the tapered shape of the liquid pool 22 and in which the portion is inserted into the narrowed section 23. FIG. 5 shows an example in which L2 is constant from the liquid surface to the outlet, but the width to be regulated may vary depending on the site to the extent that the purpose of the width regulation mechanism is fulfilled. The width regulation mechanism can be fixed in the coating section 20 by an arbitrary method, and fixing the mechanism of a plate-like bush type at a plurality of sites in the vertical direction can make it possible to suppress variation of the regulation width due to the deformation of the plate-like bush caused by a high liquid pressure. For example, using a stay for the upper portion and inserting the lower portion into the coating section makes it easy to regulate the width by the width regulation mechanism, and accordingly, is preferable.

<Shape of Liquid Pool>

As described above in detail, it is important in the present invention that allowing the cross-sectional area to decrease continuously in the running direction of the reinforcing fiber sheet in the liquid pool 22 increases the liquid pressure in the running direction of reinforcing fiber sheet, and here, the shape of the cross-sectional area decreasing continuously in the running direction of the reinforcing fiber sheet is not limited to a particular one as long as the shape allows the liquid pressure to increase continuously in the running direction. The shape may be a tapered (linear) one or show a curved form such as a trumpet shape in the cross-sectional view of the liquid pool. In addition, the cross-sectional area decreasing portion may be continuous over the full length of the liquid pool, or the liquid pool may contain a part in which the cross-sectional area does not decrease or contrarily increases, to the extent that the object and effect of the present invention can be achieved. These will be described in detail below with reference to FIGS. 6 to 9.

Figure 6:
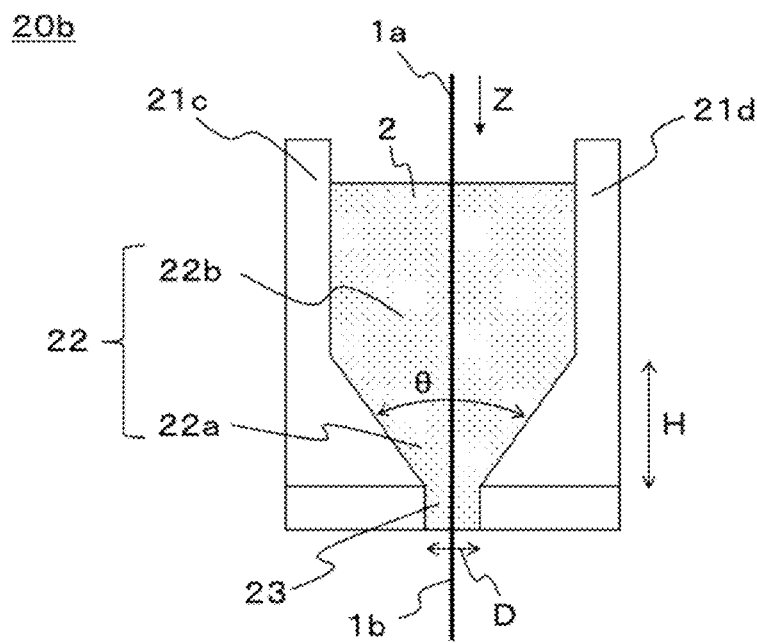
FIG. 6 is a detail cross-sectional view of the coating section 20b according to an embodiment other than in FIG. 2.

FIG. 6 is a detail cross-sectional view of the coating section 20b according to an embodiment other than in FIG. 2. The coating section 20b is the same as the coating section 20 in FIG. 2 except that wall constituent members 21c and 21d constituting the liquid pool 22 are different in shape. As in the coating section 20b in FIG. 6, the liquid pool 22 may be sectioned into the region 22a in which the cross-sectional area decreases continuously in the vertically downward direction Z and the region 22b in which the cross-sectional area does not decrease. In this respect, the vertical height H along which the cross-sectional area decreases continuously is preferably 10 mm or more. The vertical height H along which the cross-sectional area decreases continuously is more preferably 50 mm or more. This assuredly affords a distance along which the matrix resin 2 accompanying the reinforcing fiber sheet 1a is compressed in the region 22a in which the cross-sectional area of the liquid pool 22 decreases continuously, whereby the liquid pressure generated in the lower portion of the liquid pool 22 can be increased sufficiently. This consequently makes it possible to obtain the effect of allowing the liquid pressure to prevent fuzz from clogging the narrowed section 23 and the effect of allowing the liquid pressure to induce the impregnation of the reinforcing fiber sheet 1a with the matrix resin 2.

In cases where, as in the coating section 20 in FIG. 2 and the coating section 20b in FIG. 6, the region 22a in which the cross-sectional area of the liquid pool 22 decreases continuously is tapered, the smaller the opening angle θ of the taper, the more preferable, and specifically, the angle is preferably an acute angle (90° or less). This makes it possible that the effect of compressing the matrix resin 2 in the region 22a (tapered portion) in which the cross-sectional area of the liquid pool 22 decreases continuously is enhanced, and that a high liquid pressure is made easier to obtain.

Figure 7:
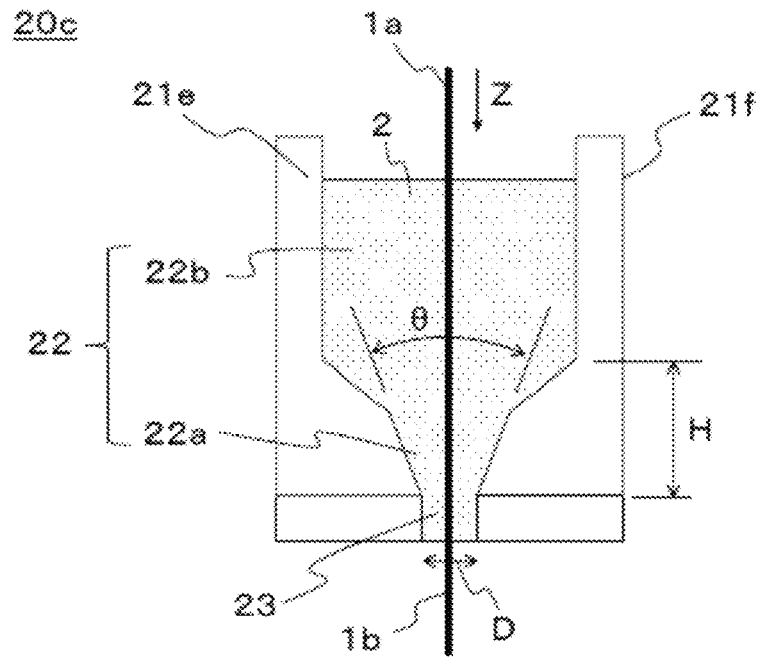
FIG. 7 is a detail cross-sectional view of the coating section 20c according to an embodiment other than in FIG. 6.

FIG. 7 is a detail cross-sectional view of the coating section 20c cording to an embodiment other than in FIG. 6. The coating section 20c is the same as the coating section 20b in FIG. 6 except that wall constituent members 21e and 21f constituting the liquid pool 22 form a two-tier taper. In this manner, the region 22a in which the cross-sectional area of the liquid pool 22 decreases continuously may be constituted by a multi-tapered portion composed of two or more tiers. In this respect, the opening angle θ of the tapered portion nearest the narrowed section 23 is preferably an acute angle, from the viewpoint of enhancing the above-mentioned compression effect. Also in this case, the height H of the region 22a along which the cross-sectional area of the liquid pool 22 decreases continuously is preferably 10 mm or more. The vertical height H along which the cross-sectional area decreases continuously is more preferably 50 mm or more. Having a multi-tier tapered portion as the region 22a in which the cross-sectional area of the liquid pool 22 decreases continuously, as in FIG. 7, makes it possible to maintain the volume of the matrix resin 2 that can be stored in the liquid pool 22, and at the same time, to decrease the angle θ of the tapered portion nearest the narrowed section 23. This increases the liquid pressure caused in the lower portion of the liquid pool 22, and can further enhance the fuzz elimination effect and the impregnation effect of the matrix resin 2.

Figure 8:
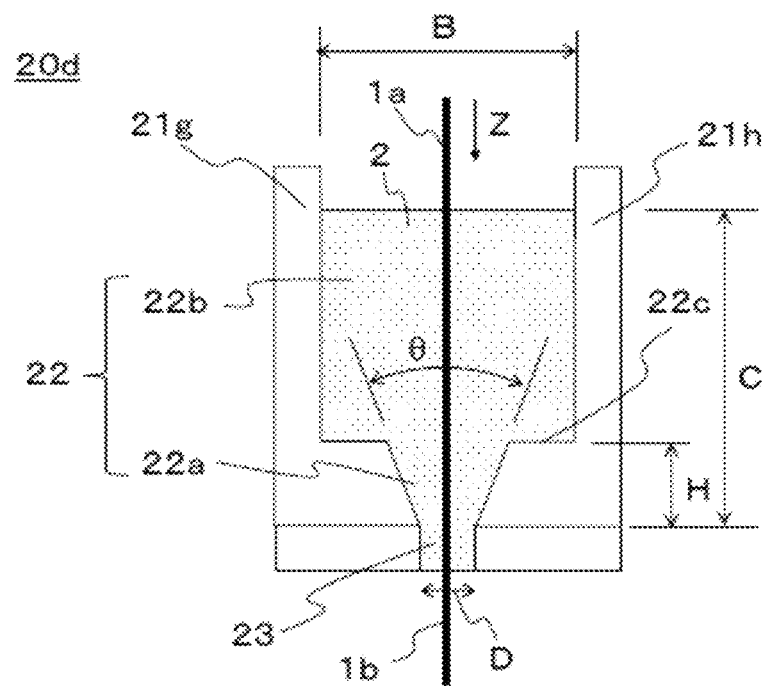
FIG. 8 is a detail cross-sectional view of the coating section 20d according to an embodiment other than in FIG. 6.

FIG. 8 is a detail cross-sectional view of the coating section 20d according to an embodiment other than in FIG. 6. The coating section 20d is the same as the coating section 20b in FIG. 6 except that wall constituent members 21g and 21h constituting the liquid pool 22 form a tier. In this manner, allowing the lowermost portion of the liquid pool 22 to have the region 22a in which the cross-sectional area decreases continuously makes it possible to obtain the effect of increasing the liquid pressure, wherein the effect is an object of the present invention, and accordingly, the other part of the liquid pool 22 may include a region 22c in which the cross-sectional area decreases intermittently. Allowing the liquid pool 22 to have such a shape as in FIG. 8 makes it possible that the shape of the region 22a in which the cross-sectional area decreases continuously is maintained, and at the same time, that the depth B of the liquid pool 22 is enlarged to increase the volume of the matrix resin 2 that can be stored. As a result, even in cases where the matrix resin 2 cannot be supplied into the coating section 20d continuously, the matrix resin 2 can continue to be provided to the reinforcing fiber sheet 1a for a long time, whereby the productivity of the prepreg 1b can be enhanced.

Figure 9:
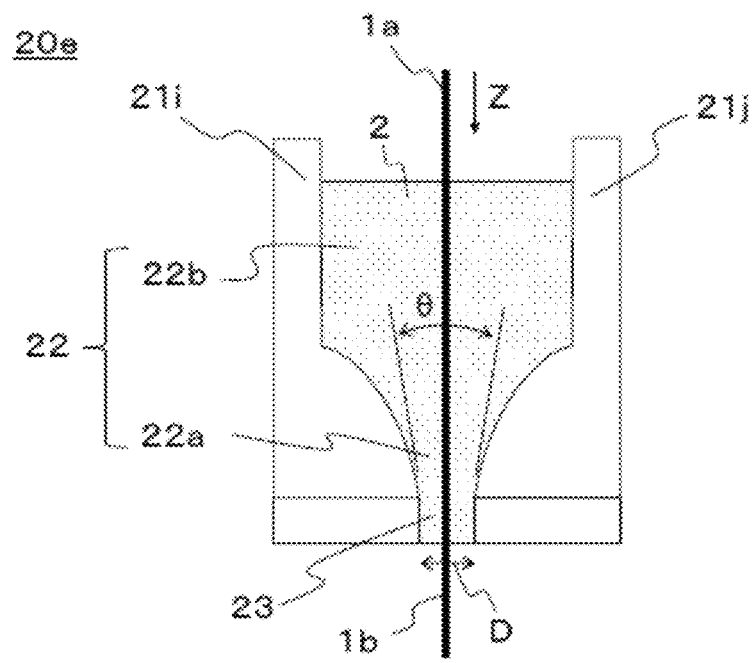
FIG. 9 is a detail cross-sectional view of the coating section 20e according to an embodiment other than in FIG. 6.

FIG. 9 is a detail cross-sectional view of the coating section 20e according to an embodiment other than in FIG. 6. The coating section 20e is the same as the coating section 20b in FIG. 6 except that wall constituent members 21i and 21j constituting the liquid pool 22 form a trumpet shape (curved shape). In the coating section 20b in FIG. 6, the region 22a in which the cross-sectional area of the liquid pool 22 decreases continuously is tapered (linear), but, without limitation to this, may be, for example, in trumpet shape (curved shape) as in FIG. 9. However, the lower portion of the liquid pool 22 and the upper portion of the narrowed section 23 are preferably connected smoothly. This is because any step at the boundary between the lower portion of the liquid pool 22 and the upper portion of the narrowed section 23 causes the reinforcing fiber sheet 1a to be caught by the step, where fuzz will undesirably be generated. In cases where, in this manner, the region in which the cross-sectional area of the liquid pool 22 decreases continuously is in trumpet shape, the opening angle θ between the virtual tangent lines of the lowermost region 22a in which the cross-sectional area of the liquid pool 22 decreases continuously is preferably an acute angle.

In this regard, the above description illustrates an example in which the cross-sectional area decreases smoothly, but the cross-sectional area of the liquid pool in the present invention does not necessarily need to decrease smoothly, to the extent that the object of the present invention is not impaired.

Figure 10:
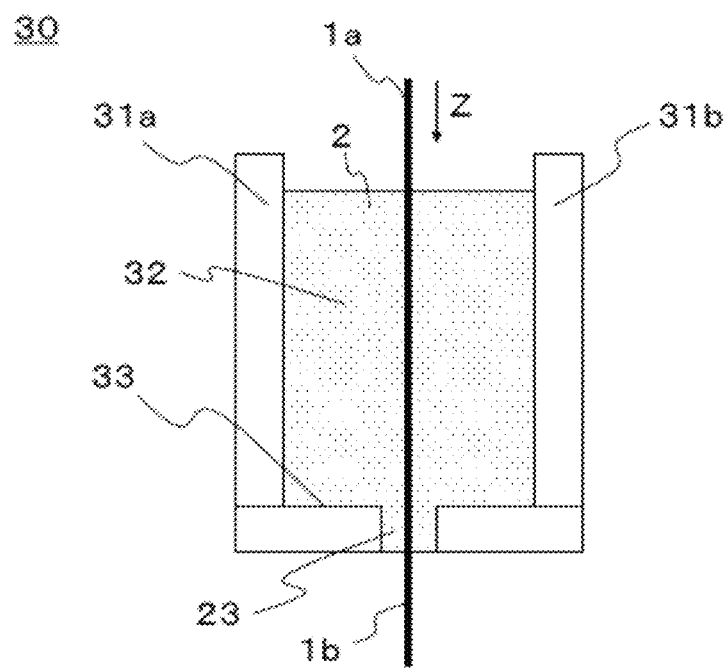
FIG. 10 is a detail cross-sectional view of the coating section 30 according to an embodiment other than of the present invention.

FIG. 10 is a detail cross-sectional view of the coating section 30 according to an embodiment other than of the present invention. Differently from an embodiment of the present invention, the liquid pool 32 in FIG. 10 does not contain a region in which the cross-sectional area decreases continuously in the vertical downward direction Z, but the liquid pool 32 is configured such that the cross-sectional area decreases discontinuously and suddenly at the boundary 33 with the narrowed section 23. This makes it more likely that the reinforcing fiber sheet 1a causes clogging.

Figure 11:
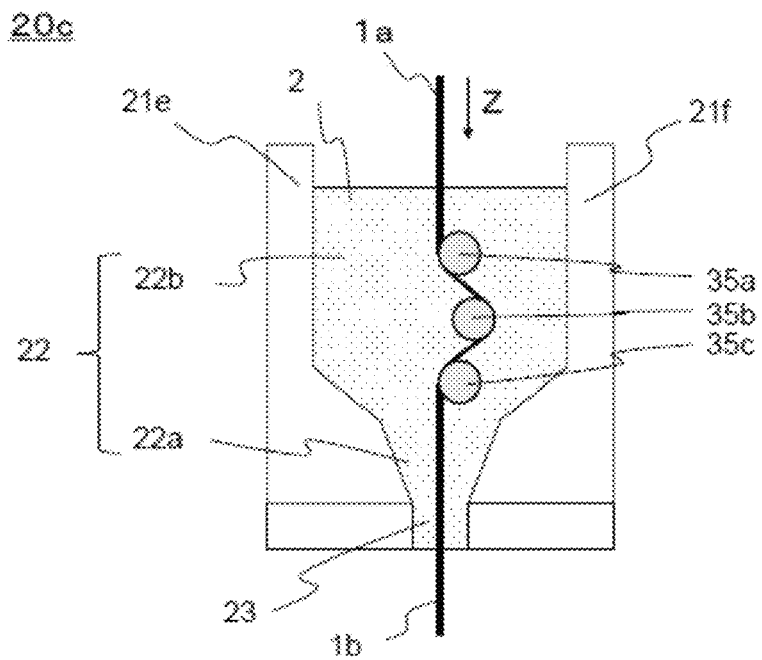
FIG. 11 is a view depicting an aspect in which the liquid pool includes bars, wherein the aspect is an example of an embodiment of the present invention.

In addition, it is also possible to enhance the impregnation effect by allowing the reinforcing fiber sheet to be in contact with a plurality of bars in the coating section. FIG. 11 shows an example in which three bars (35a, 35b, and 35c) are used, and here, the larger the number of bars is, and the longer the contact length between the reinforcing fiber sheet and the bars is, and the larger the contact angle is, the more the impregnation ratio can be enhanced. In the example of FIG. 11, the impregnation ratio can be 90% or more. In this regard, such means for enhancing the impregnation effect may be used in combination of two or more kinds thereof.

<Primary Impregnate Prepreg>

In the present invention, the impregnation ratio of the matrix resin in the primary impregnate prepreg withdrawn from the coating section is desirably 10% or more. As to the impregnation ratio of the matrix resin, a primary impregnate prepreg provided with no particles can be wound up, sampled, and torn off so that the prepreg can be visually checked to see whether the prepreg has been impregnated. More quantitatively, the impregnation ratio can be evaluated, for example, by a peeling method. Measuring the impregnation ratio of the matrix resin by a peeling method can be carried out in the following manner. That is, a sampled primary impregnate prepreg is sandwiched between adhesive tapes, these are peeled off, and the reinforcing fiber to which the matrix resin has stuck and the reinforcing fiber to which the matrix resin has not stick are separated. Then, the ratio of the mass of the reinforcing fiber to which the matrix resin has stuck with respect to the mass of the whole reinforcing fiber sheet that has been used can be regarded as an impregnation ratio of the matrix resin based on a peeling method. In cases where the impregnation ratio is high, a method described in Japanese Translation of PCT International Application Publication No. JP-T-2016-510077 can be used, wherein one side of a prepreg cut to 10 cm×10 cm is immersed by 5 mm in water for five minute, causing a change in the mass, from which change the impregnation ratio can be determined by calculation.

<Resin Film Applying Step>

In the present invention, a resin film can further be applied to a primary impregnate prepreg 1b withdrawn from the coating step. With reference to FIG. 1a, resin films 3a and 3b are supplied from supply devices 16a and 16b, and can be laminated onto the primary impregnate prepreg 1b on a conveyance roll 14. FIG. 1a shows a process in which the primary impregnate prepreg 1b is sandwiched between two resin films, but it is also possible to use one of the resin films 3a and 3b. In cases where one of the resin films is used, the other supply device 16 can be used to supply a release sheet. In addition, in cases where two resin films are used, they may be the same kind of resin film or different kinds of resin films. In another aspect, a release sheet may further be laminated on the resin film.

In the present invention, a resin used for the resin film is not limited to any particular one, and can suitably be selected in accordance with the purpose of functionalization. A resin to be used for the resin film may be a single resin, or can be a blend of different kinds of polymers or a resin composition which is a blend of different components. As above-mentioned, the resin film can contain particles. In the above-mentioned coating step, use of a matrix resin containing particles is more likely to increase the viscosity, and in some cases, decreases the coating uniformity while the reinforcing fiber sheet is running at a high speed. Because of this, providing particles in the resin film applying step enhances the high-speed running stability of the reinforcing fiber sheet in the coating step, and thus, is preferable. In this case, the resin film containing particles is preferably a resin film obtained by causing particles to be dispersed in the same kind of resin as the matrix resin. This is efficient because it makes it possible to provide particles independent of the coating step and, at the same time, provide a matrix resin. The components of a matrix resin used in the coating step and a matrix resin to be formed into a resin film can be adjusted taking into consideration the high-speed running stability in the coating step and the pot life of storage in the coating section.

Alternatively, a resin component can be taken out of a matrix resin, and formed into a resin film. For example, in the case of FRP, a thermoplastic resin is blended with a matrix resin composed mainly of a thermosetting resin so that the resin toughness can be enhanced, but in some cases, the thermoplastic resin increases the viscosity of the matrix resin. In such a case, this thermoplastic resin can be removed from the matrix resin to be provided in the above-mentioned coating step and can be applied as a resin film to a primary impregnate prepreg so that the coating stability can be enhanced. Such a thermoplastic resin to be used is often PES, PEI, PI, or the like. In some cases, such a thermoplastic resin film can also be a self-supporting film that needs no support, and is useful from the viewpoint of the possibility of omitting such a support.

A resin film can be produced using a known method, and such a film can be formed, for example, using any of various known coaters such as roll coaters, comma coaters, knife coaters, die coaters, and spray coaters. If necessary, a support such as a release sheet can be coated with a resin to form a film.

<Particle-Providing Step>

In the present invention, the primary impregnate prepreg 1b withdrawn from the coating step can be directly provided with particles. This particle-providing step will be described in detail with reference to FIG. 1b. In the present invention, the matrix resin 2 is applied to the reinforcing fiber sheet 1a in the coating section 20, and the obtained primary impregnate prepreg 1b is provided with particles using a particle-providing device 28 to obtain a prepreg 1c.

(Method and Device for Providing Particles)

Providing a primary impregnate prepreg with particles is not limited to any particular method, and can generally be carried out using a method and device for supplying powder.

Examples of mechanisms to be used to provide particles include: [1] a providing mechanism which causes the particles to fall onto a running base material by their own weight; [2] a providing mechanism which causes a base material to pass through a space in which the particles are diffused; [3] a device using electrostatic coating; [4] a providing mechanism which uses a gas stream mixed with the particles; and the like.

([1] Providing Mechanism which Causes Particles to Fall by their Own Weight)

A providing mechanism which causes the particles to fall by their own weight is a providing mechanism by which the particles to be supplied are caused to fall onto a base material by their own weight. A general powder supply device can be used as a providing mechanism which causes the particles to fall by their own weight, and a general powder supply device is illustrated in the graphically illustrated "Funtai-kiki/sochi no Kiso-chishiki", issued by Kogyo Chosakai Publishing Co., Ltd. on 11 Sep. 2001, pp. 68-69. This illustrated device can be used to provide particles. Below, a providing device which causes particles to fall by their own weight will be described more specifically. Examples of usable providing devices which cause particles to fall by their own weight include devices such as of a sieve vibration type, a screw feeder type, a rotation fall type, a belt feeder type, and the like.

A device of a sieve vibration type is, for example, a device in which particles are poured into a sieve or the like having meshes, and the sieve is vibrated so that the particles can pass through the meshes and fall by their own weight to be provided. A device of a sieve vibration type is convenient and easy to install, and the width direction range in which particles are provided is also easy to adjust.

A device of a screw feeder type is a device in which a screw connected to a motor or the like is rotated, and particles discharged through the supply outlet at the tip of the screw are caused to fall onto a base material by their own weight so that the base material can be provided with the particles. With a device of a screw feeder type, the supply amount can be easily adjusted by selecting the rotational speed of the screw and the shape of the screw. Examples of commercially available devices of a screw feeder type include FCµ-030F and FCµ-200F (which are manufactured by Nisshin Engineering Inc.) and the like.

A device of a rotation fall type is a device in which a roller with a brush or a blade is rotated, scraping off or knocking off particles in the supply inlet or the narrowed section through which particles are supplied, so that the particles can fall by their own weight to be provided. Examples of commercially available devices of a rotation fall type include Nikka K-VII Spray (manufactured by Nikka Ltd.) and the like.

A device of a belt feeder type is a device in which particles are mounted on a belt rotating in a loop manner, and the particles are caused to fall from the end portion of the belt by their own weight so as to be provided onto a base material. Examples of commercially available devices of a belt feeder type include BW-150-1B (manufactured by Kubota Corporation) and the like.

In cases where a primary impregnate prepreg is provided with particles using a providing device which causes the particles to fall by their own weight, the primary impregnate prepreg is preferably conveyed in the horizontal direction. Even in cases where particles are not easily adhered to a primary impregnate prepreg, providing the primary impregnate prepreg with particles in a horizontal conveyance section makes it possible to mount the particles onto the primary impregnate prepreg and to inhibit contamination around the particle-providing device. In addition, in cases where the conveyance direction of the prepreg is diverted by a diverting roll, it is preferable that the direction is diverted after a release sheet is applied to the face provided with the particles. Applying a release sheet makes it possible that the particles not adhered to the primary impregnate prepreg fall off, preventing the process from being contaminated.

Specific examples in which particles are caused to fall by their own weight to be provided are described in JP5815501B, JP5878017B, WO2013/107829A1, and the like.

([2] Providing Mechanism which Causes Base Material to Pass Through Space in which Particles are Diffused)

A providing mechanism which causes a primary impregnate prepreg to pass through a space in which particles are diffused is a device which causes particles to be dispersed in a space by using a gas stream or by electrically charging the particles and causes the primary impregnate prepreg to pass through the space so that the prepreg can be provided with the particles. Specific examples thereof are described in JP H06-71646A, U.S. Pat. No. 5,198,281B, and the like.

([3] Mechanism Using Electrostatic Coating)

A mechanism using electrostatic coating is a particle-providing device utilizing the principle of electrostatic coating. Electrostatic coating is often used to apply coating particles, and can also be applied to provide other functional particles. Specifically, the mechanism is a method or a device in which a high voltage is applied to electrically charge particles, and the attractive force of the static electricity attracts and adheres the particles to the base material. The static electricity attracts the particles to the base material, and thus, the particles can be efficiently adhered to the primary impregnate prepreg. In addition, the direction in which particles are provided depends on the line of electric force, and thus, the particles can be provided not only in the downward direction but also in the horizontal or upward direction. It is easy to adhere the particles even in cases where the conveyance direction of the primary impregnate prepreg is vertically downward, and thus, this mechanism is preferably used.

Specific examples thereof are described in WO2013/107829A1, WO2015/007862A1, and the like.

A device that can be used for electrostatic coating is not limited to any particular one, and examples of such devices include a device generally used for electrostatic coating and such a device improved to be used for prepregs. Examples of commercially available electrostatic coating devices include; EA-MS40-15, E-M15C, E-M25, E-A10, EBG, EP-MG10, EP-MG10L, and EP-AG10H (which are all manufactured by Anest Iwata Corporation); GX355 (manufactured by Parker Ionics Inc.); TRIBO MATIC II (manufactured by Nordson Corporation); and the like.

([4] Providing Mechanism Using Gas Stream Mixed with Particles)

A providing mechanism using a gas stream mixed with particles is a device in which a primary impregnate prepreg is sprayed with air mixed with particles, or a high voltage is applied to a gas stream mixed with particles to generate a repulsive force between the particles, thus enhancing the adhesion uniformity so that the particles can be provided. Specific examples thereof are described in JP H06-71646A, JP5814964B, and the like.

(Provided Amount of Particles)

In the present invention, the provided amount of particles with which a primary impregnate prepreg is provided is not limited to any particular value, and is preferably a provided amount in a range which does not significantly impair the mechanical property of the resulting CFRP. In general, the provided amount of particles is preferably 0.01 mass % or more and 40 mass % or less with respect to the total mass of the matrix resin applied in the coating section. This range makes it possible to obtain the effect of providing particles and to afford a good mechanical property to the CFRP.

(Particles Provided in Particle-Providing Step)

The type of particles to be provided in this step can be arbitrarily selected in accordance with the purpose without any particular limitation, and any of various types of particles can be used. In addition, the particles to be provided may be of a single type, a multiple type, or a mixture of multiple types.

The particles to be provided in this step have an average particle size of 0.1 µm or more and 500 µm or less. The particles having an average particle size in this range make it possible to enhance the functionality and properties of the resulting prepreg or CFRP. As used herein, an average particle size refers to a particle diameter (median diameter) at 50% in an accumulation curve of a particle size distribution measured and obtained by laser diffraction/scattering. The average particle size can be measured with a measuring device using laser diffraction/scattering. For example, the average particle size can be measured with the below-mentioned device and conditions. In this regard, the measurement can be carried out using a dispersion prepared by adding 1 g of particles to 100 ml of the below-mentioned dispersion medium followed by stirring.

Measurement device: LA-950V2 (manufactured by Horiba, Ltd.)

Dispersion medium: aqueous solution of 0.5 wt % "Triton-X®" 100

Measurement cell: flow cell

Ultrasonic irradiation (second): 10

Specific examples of preferable particles that can be listed include toughness-enhancing particles, flame retardance-enhancing particles, hardener particles, damping performance-enhancing particles, tackiness-adjusting particles, silica particles, titanium oxide particles, and the like, as described below.

(Toughness-Enhancing Particles)

Toughness-enhancing particles are polymer particles that are provided so that they can enhance the toughness and impact resistance of the resulting CFRP. In cases where such toughness-enhancing particles are used, the average particle size of the particles is preferably in the range from 5 to 50 µm, more preferably in the range from 7 to 40 µm, still more preferably in the range from 10 to 30 µm. Having an average particle size of m or more makes it possible that the particles do not intrude into the reinforcing fiber bundle, but are retained in the interlayer resin layer of the obtained fiber reinforced composite material. Having an average particle size of 50 µm or less makes it possible that the thickness of the matrix resin layer on the surface of the primary impregnate prepreg is made suitable, and eventually that the fiber mass content in the obtained CFRP is made suitable.

The toughness-enhancing particles are preferably insoluble in a matrix resin, and as such particles, suitable ones described in, for example, WO2009/142231A1 as a reference can be used. More specifically, polyamides and polyimides can be preferably used, and polyamides that have excellent toughness and accordingly can significantly enhance the impact resistance are most preferable. Examples of polyamides that can be suitably used include polyamide 12, polyamide 11, polyamide 6, polyamide 66, polyamide 6/12 copolymers, and a polyamide modified to have a semi IPN (macromolecular interpenetrating network structure) with an epoxy compound (semi IPN polyamide) described in Example 1 of JPH01-104624A. As to the shape of this toughness-enhancing particle, the particle may be a spherical particle, a nonspherical particle, or a porous particle, and the spherical shape is particularly preferable in the production method according to the present invention in order not to decrease the resin flow property. In addition, the spherical shape is a preferable aspect in that the spherical shape has no starting point for stress concentration and affords high impact resistance. Examples of commercially available polyamide particles that can be used include SP-500, SP-10, TR-1, TR-2, 842P-48, 842P-80 (which are all manufactured by Toray Industries, Inc.), "Orgasol®" 1002D, 2001UD, 2001EXD, 2002D, 3202D, 3501D, 3502D (which are all manufactured by Arkema K.K.), "Grilamid®" TR90 (manufactured by Emser Werke, Inc.), "TROGAMID®" CX7323, CX9701, CX9704 (manufactured by Degussa AG), and the like.

(Flame Retardance-Enhancing Particles)

Flame retardance-enhancing particles are particles that enhance the flame retardance of CFRP. Flame retardance is a property needed by: structural members of aircraft machines, vehicles, and the like; construction materials; and the like. Generally known flame retardants can be used as flame retardance-enhancing particles used in the present invention. Examples thereof include: metal hydroxides and metal oxides; phosphorus atom-containing compounds such as red phosphorus, phosphate esters, and phosphate salts; nitrogen-containing compounds; antimony trioxide; and the like.

(Hardener Particles)

Hardener particles are provided as particles which contain a hardener that cures a thermosetting matrix resin applied to a reinforcing fiber sheet in the coating section 20, or which contain a hardening accelerator that accelerates hardening of the matrix resin. Examples of hardener particles include particles formed from a hardener or a hardening accelerator. It is also possible that a matrix resin applied in the coating section contains a hardener or a hardening accelerator. Providing part or all of the hardener in a step other than the coating step and mentioned as a particle-providing step makes it possible that the temperature of the matrix resin is raised to a range in which such temperature-raising is difficult from the viewpoint of the reactivity of the thermosetting resin, that the handleability and the like of the resin is improved, and that the possibility of reaction runaway is decreased. Examples of hardener particles that can be used in the present invention include various hardeners and hardening accelerators which are solid at 23° C. For example, a hardener can be used for an epoxy resin if the hardener is a compound having an active group capable of reacting with an epoxy group. Preferably, compounds having an amino group, an acid anhydride group, or an azido group are suitable. Specifically, various isomers of dicyandiamide and diaminodiphenyl sulfone are, and amino benzoic acid ester types are, suitable. According to specific description, dicyandiamide provides excellent storage stability of prepreg, and accordingly, is used by preference. In addition, various isomers of diaminodiphenyl sulfone afford cured objects having good heat resistance, and accordingly, are most suitable for the present invention. As amino benzoic acid ester types, trimethyleneglycol di-p-aminobenzoate and neopentylglycol di-p-aminobenzoate are used by preference and have lower heat resistance but have excellent tensile strength, compared with diaminodiphenyl sulfone, and accordingly, are used selectively in accordance with the application. Examples of hardening accelerators include tertiary amines, tertiary amine salts, Lewis acid complexes, onium salts, imidazole compounds, urea compounds, hydrazide compounds, and the like.

(Damping Performance-Enhancing Particles)

Damping performance-enhancing particles are particles which are provided so as to enhance the damping performance of the resulting CFRP. Examples of damping performance-enhancing particles that can be used include urethane particles. Among others, urethane particles having a three-dimensional cross-linked structure are preferable, and can enhance the damping performance and solvent resistance of CFRP. Examples of commercially available and usable urethane particles having a three-dimensional cross-linked structure include: "DAIMICBEAZ®" UCN-5070 and 5150 (which are manufactured by Dainichiseika Color & Chemicals Mfg. Co., Ltd.); "ARTPEARL®" C-400, P-400T, JB-400T, and CE-400T (which are manufactured by Negami Chemical Industrial Co., Ltd); and the like.

(Tackiness-adjusting Particles) Tackiness-adjusting particles are particles which are provided so that they can adjust the sticking property of the primary impregnate prepreg. Examples of tackiness-adjusting particles that can be used include epoxy resin particles, thermoplastic polymer particles, and the like which are solid at 23° C. In cases where epoxy resin particles are used as tackiness-adjusting particles, particles formed from, for example, an epoxy resin which is solid at 23° C. and pulverized, if necessary, can be used. A commercially available epoxy resin can be used without any particular limitation, and is preferably the same as a component contained in the matrix resin applied in the coating section. Such an epoxy resin has a small influence on the properties of CFRP. Examples of commercially available epoxy resins include bisphenol A epoxy resins such as: "jER®" 1001, "jER®" 1002, "jER®" 1003, "jER®" 1055, "jER®" 1004, "jER®" 1004AF, "jER®" 1007, "jER®" 1009, "jER®" 1003F, "jER®" 1004F, "jER®" 1009F, "jER®" 1004FS, "jER®" 1006FS, "jER®" 1007FS, "jER®" 4004P, "jER®" 4005P, "jER®" 4007P, "jER®" 4010P, "jER®" 1256P, "jER®" 154P, "jER®" 157S70, "jER®" 1031S, "jER®" 1032H60, "jER®" YL6810, "jER®" YX7700, "jER®" YX8800, "jER®" YX4000, "jER®" YX4000H, "jER®" YK6121HA, and "jER®" YX4000 (which are all manufactured by Mitsubishi Chemical Corporation); "EPICLON®" 1050, "EPICLON®" 1055, "EPICLON®" 2050, "EPICLON®" 3050, "EPICLON®" 4050, "EPICLON®" 7050, "EPICLON®" HM-091, "EPICLON®" HM-101, "EPICLON®" 152, "EPICLON®" 153, "EPICLON®" N-660, "EPICLON®" N-665, "EPICLON®" N-670, "EPICLON®" N-673, "EPICLON®" N-680, "EPICLON®" N-690, "EPICLON®" N-695, "EPICLON®" N-655-EXP, "EPICLON®" N-655-EXP-S, "EPICLON®" N-662-EXP-S, "EPICLON®" N-665-EXP-S, "EPICLON®" N-670-EXP-S, "EPICLON®" N-685-EXP-S, "EPICLON®" N-770, "EPICLON®" N-775, "EPICLON®" N-865, "EPICLON®" HP-7200L, "EPICLON®" HP-7200, "EPICLON®" HP-7200H, "EPICLON®" HP-7200HH, "EPICLON®" HP-4700, "EPICLON®" HP-5000 EPICLON®" HP-6000, and "EPICLON®" HP-4710 (which are all manufactured by DIC Corporation); and the like.

Thermoplastic polymer particles can be used without any particular limitation. Thermoplastic polymer particles are preferably the same thermoplastic polymer as a component contained in the matrix resin applied in the coating section. Such particles have a small influence on the properties of a CFRP. Such thermoplastic polymer particles preferably have a Tg of 180° C. or more and have an aromatic ring in the molecule. This makes it possible to impart heat resistance. Specifically, polyethersulfone, polyetherethersulfone, polyetherimide, polyphenylene oxide, polysulfone, or the like is preferably used. Examples of commercially available sulfone-based and imide-based thermoplastic polymers include: polyethersulfones, for example, "Sumika Excel®" PES5003P, which has a hydroxyl group at the terminal, (manufactured by Sumitomo Chemical Co., Ltd.), "Virantage®" VW10700 (manufactured by Solvay Advanced Polymers LLC), and "Sumika Excel®" PES7600P, which has a chlorinated terminal, (manufactured by Sumitomo Chemical Co., Ltd.); polyetherimides, for example, "Ultem®" 1010, which has an acid anhydride or an amino group at the terminal (manufactured by Sabic Innovative Plastics); polysulfones, for example, "Virantage®" VW30500 (manufactured by Solvay Advanced Polymers LLC); and the like. In addition, terpene resin particles can be used as thermoplastic polymer particles. Examples of commercially available terpene resins include: YS RESIN PX1250, YS RESIN PX1150, and YS RESIN PX1000 (which are all manufactured by Yasuhara Chemical Co., Ltd.); and the like.

(Silica Particles)

Silica particles are particles composed of silicon dioxide. Providing silica particles makes it possible to impart heat resistance, corrosion resistance, and solvent resistance to CFRP. Silica particles that can be used in the present invention are known silica particles without any particular limitation. Silica particles to be used in the present invention may be surface-treated. Examples of commercially available silica particles include: QSG-100 and QCB-100 (which are manufactured by Shin-Etsu Chemical Co., Ltd.); SO-C1, SO-C2, SO-C4, SO-C5, SO-C6, SO-E1, SO-E2, SO-E4, SO-E5, and SO-E6 (which are manufactured by Admatechs Co., Ltd.); and the like.

(Titanium Oxide Particles)

Titanium oxide particles are particles of titanium oxide. Providing titanium oxide makes it possible to enhance the chemical resistance and heat resistance of CFRP and to cause the photocatalyst effect to be expressed to inhibit contamination of the surface if the CFRP is placed in an environment which exposes the CFRP to outdoors sunlight and/or rainwater. Titanium oxide particles that can be used are known titanium oxide particles without any particular limitation. Titanium oxide has a crystal type such as a rutile type or an anatase type, and is not limited to any particular type. Titanium oxide particles to be used in the present invention may be surface-treated. Examples of commercially available titanium oxide particles include: CR-EL and PT-301 (which are manufactured by Ishihara Sangyo Kaisha Ltd.); SA-1, SA-1•L, TCR-52, R-39, R-38L, R-62N, R-24, FTR-700, and D-962 (which are all from Sakai Chemical Industry Co., Ltd.); and the like.

(Face to be Provided with Particles)

In the present invention, one face or both faces of a primary impregnate prepreg may be provided with particles.

<Running Mechanism>

Known rollers or the like can suitably be used as a running mechanism for conveying a reinforcing fiber sheet and the prepreg according to the present invention. In the present invention, the reinforcing fiber sheet is conveyed vertically downward, and accordingly, the rollers are preferably disposed above and below the coating section, which is between the rollers.

In addition, it is preferable in the present invention that the running pathway of the reinforcing fiber sheet is as linear as possible in order to suppress arrangement disturbance and fuzzing of the reinforcing fibers. In addition, the prepreg is often a sheet-like integrated object that is a laminate containing a release sheet, and it is preferable that the running pathway of the sheet-like integrated object is also as linear as possible, because a bend existing in a conveying step of the object generates wrinkles due to a perimeter difference between the inner layer and the outer layer in some cases. From this viewpoint, nip rolls are more preferably used in the running pathway of the sheet-like integrated object.

Which of S-shaped arranged rolls and nip rolls should be used can suitably be determined in accordance with the production conditions and the product characteristics.

<High Tension Take-Up Device>

In the present invention, it is preferable that a high tension take-up device for withdrawing the prepreg from the coating section is disposed downstream of the coating section in the process. This is because high friction force and shearing stress are generated between the reinforcing fiber sheet and the matrix resin in the coating section, and accordingly, it is preferable that high take-up tension is generated downstream in the process, in order to overcome the high friction force and the shearing stress and withdraw the prepreg. As a high tension take-up device, nip rolls, S-shaped arranged rolls, and the like can be used, and in any case thereof, enhancing friction force between the rolls and the prepreg can prevent slip and achieve stable running. To achieve this, it is preferable to arrange a high friction coefficient material on the surface of the roll, increase the nip pressure, or increase the pressing pressure of the prepreg against the S-shaped arranged rolls. The S-shaped arranged rolls make it possible to more easily control friction force on the basis of the roll diameter and the contact length, and accordingly, are more preferable, from the viewpoint of preventing slip.

<Release Sheet Supply Device and Winder>

A release sheet supply device and a winder can suitably be used in producing prepreg or FRP using the present invention. As such a device, any known one can be used, and in any case, it is preferable from the viewpoint of running the sheet stably that such a device includes a mechanism for making it possible to feed an unwinding or wind-up tension back to the unwinding or wind-up speed.

<Additional-Impregnation>

In order to make adjustments to a desired degree of impregnation, it is possible to further combine, with the present invention, a means for further enhancing the degree of impregnation using an impregnation device separately after coating. Here, to distinguish this means from the impregnation in the coating section, such an impregnation process additionally carried out after coating is referred to as an additional-impregnation process, and a device for an additional-impregnation process is referred to as an additional-impregnation device. A device used as an additional-impregnation device is not limited to a particular one, and can suitably be selected from known ones in accordance with the purpose. For example, as described in JP2011-132389A and WO2015/060299, impregnation can be promoted by preheating a laminate of a sheet-like carbon fiber bundle and a resin on a hot plate and sufficiently softening the resin on the sheet-like carbon fiber bundle, followed by using a device for pressing with nip rolls which are also heated. The hot plate temperature and nip roll surface temperature for preheating, the linear pressure of the nip rolls, and the diameter and number of the nip rolls can suitably be selected so as to achieve a desired degree of impregnation. Alternatively, it is also possible to use such "S-wrap rolls" as described in WO2010/150022, wherein a prepreg sheet runs in S-shape through the S-wrap rolls. In the present invention, "S-wrap rolls" are simply referred to as "S-shaped arranged rolls". FIG. 1 in WO2010/150022 describes an example in which a prepreg sheet runs in S-shape, but the contact length between the sheet and the roll may be adjusted in U-shape, V-shape, or A-shape as long as impregnation can be carried out. In addition, opposing contact rolls can be added in cases where the impregnation pressure is increased to enhance the degree of impregnation. Furthermore, as described in FIG. 4 in WO2015/076981, it is also possible to attempt to increase the production speed of prepreg by arranging a conveyor belt opposite to "S-wrap rolls" and thereby enhancing impregnation efficiency. In addition, as described in WO2017/068159, JP2016-203397A, and the like, it is also possible to enhance impregnation efficiency by subjecting prepreg to ultrasonication to heat the prepreg rapidly before impregnation. Alternatively, as described in JP2017-154330A, it is also possible to use an impregnation device in which a plurality of "squeeze blades" are vibrated by an ultrasonic generator. Alternatively, as described in JP2013-22868A, it is also possible to fold a prepreg up and carry out impregnation.

<Simplified Additional-Impregnation>

The above description shows an example in which a conventional additional-impregnation device is applied, but, in some cases, the temperature of the primary impregnate prepreg is still high immediately under the coating section, and in such cases, it is also possible to simplify and make smaller an impregnation device significantly by adding an additional-impregnation operation at a stage where time has not yet elapsed very much after the prepreg exits from the coating section, thereby omitting or simplifying a heating device such as a hot plate for heating the primary impregnate prepreg again. An impregnation device positioned immediately under the coating section is referred to as a simplified additional-impregnation device. In this regard, the simplified additional-impregnation process can be understood as one aspect of an additional-impregnation process. As a simplified additional-impregnation device, heated nip rolls and heated S-shaped arranged rolls can be used. Compared with a usual impregnation device, they make it possible not only to decrease the roll diameter, the set pressure, and the contact length between the primary impregnate prepreg and the rolls, thereby enabling the device to be smaller, but also to decrease the power consumption, and accordingly, are preferable.

In addition, applying a release sheet to the primary impregnate prepreg before the primary impregnate prepreg enters the simplified additional-impregnation device enhances the running properties of the primary impregnate prepreg, and accordingly, is preferable.

Figure 15:
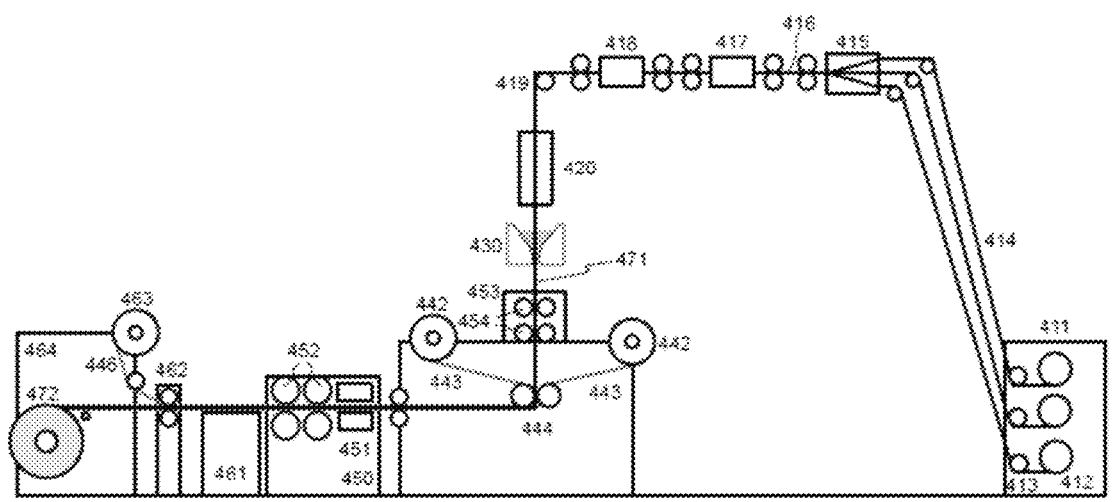
FIG. 15 is a schematic diagram of an example of another process/device of producing a prepreg using the present invention.

FIG. 15 shows an example of a prepreg production process including an additional-impregnation device. A simplified additional-impregnation device 453 is arranged immediately under a coating section 430. Here, nip rolls are shown as an example of the simplified additional-impregnation device 453, and the nip roller preferably includes a heating mechanism. In addition, the number of stages of the nip rolls can be suitably selected depending on the purpose, and is preferably three or less from the viewpoint of process simplification (FIG. 15 shows an example of two stages). In addition, the nip roller preferably includes a driving device from the viewpoint of easy tension control for conveyance of a prepreg. The nip pressure can be suitably adjusted in accordance with a desired degree of impregnation.

In order that the primary impregnate prepreg cannot stick to the surface of the nip roll, it is preferable that the surface preliminarily undergoes a suitable release treatment, or that a release sheet is inserted between the primary impregnate prepreg and the nip roll (for simplicity, such a sheet is not depicted in FIG. 15). In cases where a release sheet is inserted between the primary impregnate prepreg and the nip roll, it is preferable that the sheet is inserted from the coating section 430 side, and that the release sheet is detached from the primary impregnate prepreg at the rolls on the high tension take-up device 444 side. The detached release sheet may be directly wound up, or may circuit so as to be inserted from the coating section 430 side again.

In addition, examples of additional-impregnation devices that can be used include not only nip rolls but also the above-mentioned "S-wrap roll", a fixing bar, and the like.

In this regard, FIG. 15 describes an example in which the prepreg is directly introduced into the additional-impregnation device 450 after the simplified additional-impregnation and the resin film application.

<Resin Film Application Plus Additional-Impregnation>

In order to further enhance the efficiency in the present invention, the resin film application and the additional-impregnation process can be simultaneously carried out. This step is conveniently carried out at a stage when the time has not passed very much after the primary impregnate prepreg goes out of the coating section, but in another preferable aspect, a heat-treatment device is arranged between the coating section and the simplified additional-impregnation device because carrying out the step at an increased surface temperature of the prepreg decreases the viscosity of the matrix resin in the surface of the primary impregnate prepreg, thus making the additional-impregnation process easier. In addition, using a noncontact type of heat-treatment device as the above-mentioned device enables the primary impregnate prepreg to avoid sticking to the heat-treatment device, and thus, is preferable.

Figure 22:
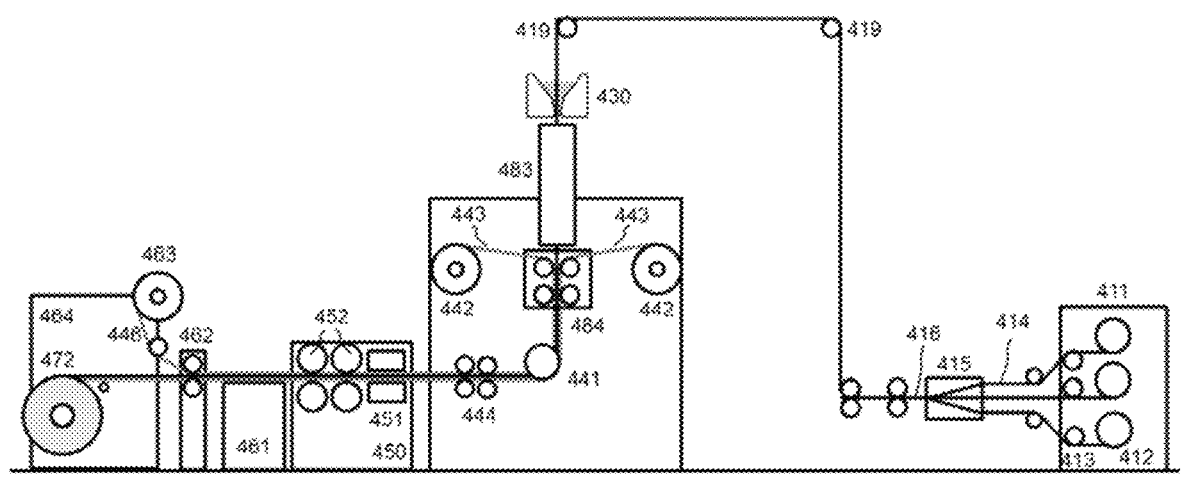
FIG. 22 is a schematic diagram of an example of another process/device of producing a prepreg using the present invention.

FIG. 22 shows an example of a method and device for carrying out resin film application and simplified additional-impregnation simultaneously, and arranging a noncontact heating device 483 immediately under a coating section makes it possible that the surface temperature of a primary impregnate prepreg withdrawn from the coating section is easily made higher than the temperature of a matrix resin in the liquid pool. Further arranging a simplified additional-impregnation device immediately under the heat-treatment device makes it possible that the surface temperature of the primary impregnate prepreg is kept in a temperature range suitable for an additional-impregnation process.

If the surface temperature of a resin film to be applied and the temperature of the additional-impregnation device are equal to or near room temperature (approximately 10 to 30° C.), a sufficiently high surface temperature of the primary impregnate prepreg is preferable from the viewpoint of omitting a heating mechanism and simplifying the device. From the viewpoint of controlling the process temperature, however, a low temperature (approximately 50° C. or less) is preferable. Thus, it is preferable to make the temperature variation smaller, and it is also possible to incorporate a heating mechanism having a small capacity. On the other hand, to further enhance the impregnation effect of the additional-impregnation process, it is preferable to achieve, by heating, a temperature in a suitable range (a temperature which makes the viscosity of the matrix resin sufficiently low).

In cases where the resin film contains particles, allowing the viscosity of the resin film to be too low during the simplified additional-impregnation process causes the particles to flow into the reinforcing fiber sheet in some cases, and thus, if this is desired to be inhibited, the temperature can be set low.

<Prepreg>

A prepreg obtained by a production method according to the present invention is a primary impregnate prepreg provided with a resin film or particles, and the impregnation ratio of the matrix resin is preferably 10% or more, still more preferably 50% or more. The higher the impregnation ratio, the more desirable. Ideally, it is 100%, but practically, the upper limit is approximately 95%. The impregnation ratio of the matrix resin can be verified in the same manner as that of the primary impregnate prepreg. In cases where the prepreg has a high degree of impregnation, the degree of impregnation can also be evaluated using a water absorption rate based on the capillarity phenomena of the prepreg. Specifically, a method described in Japanese Translation of PCT International Application Publication No. JP-T-2016-510077 can be used, wherein one side of a prepreg cut to 10 cm×10 cm is immersed by 5 mm in water for five minute, causing a change in the mass, from which change the impregnation ratio can be calculated.

<Prepreg Width>

A prepreg that is a kind of precursor of FRP is one form of the prepreg obtained in the present invention, and accordingly, a case where the present invention is applied to FRP applications will be described below.

The width of a prepreg is not limited to a particular one, and the width may be broad, tens of centimeters to approximately two meters, or may be tape-like, several millimeters to tens of millimeters. The width can be selected in accordance with the application. In recent years, a device called ATL (Automated Tape Laying) or AFP (Automated Fiber Placement) in which narrow prepregs or prepreg tapes are automatically laminated has widely been used to make a prepreg laminating step more efficient, and the width is also preferably adapted to such a device. ATL often involves use of narrow prepregs having a width of approximately 7.5 cm, approximately 15 cm, and approximately 30 cm, and AFP often involves use of prepreg tapes having a width of approximately 3 mm to approximately 25 mm.

Figure 17:
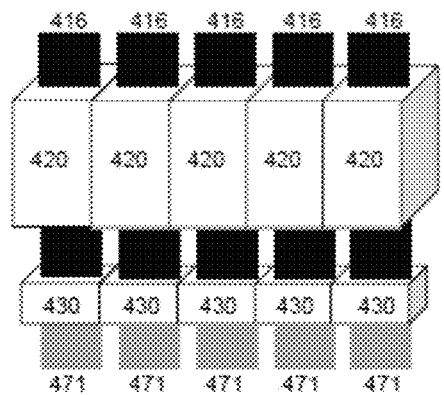
FIG. 17 is a diagram depicting an example of an aspect in which a plurality of coating sections are included, wherein the aspect is according to one embodiment of the present invention.

A method of obtaining a prepreg having a desired width is not limited to a particular one, and a method in which a broad prepreg having a width of approximately 1 m to approximately 2 m is slit into narrow prepregs can be used. Alternatively, in order to simplify or omit the slitting step, the width of the coating section used in the present invention can be adjusted so as to be a desired width from the beginning. For example, in cases where a narrow prepreg having a width of 30 cm is produced for ATL, the width of the outlet of the coating section can be adjusted in accordance with the former width. Further in order to produce this prepreg efficiently, it is preferable to produce a product having a width of 30 cm, and juxtaposing a plurality of such production devices enables prepregs to be produced in a plurality of lines using the same running devices, conveyance devices, various rolls, and winders. FIG. 17 shows an example in which five coating sections are linked in parallel. Here, five reinforcing fiber sheets 416 may pass through the respective independent five reinforcing fiber preheating devices 420 and coating sections 430 to yield five primary impregnate prepregs 471, or the reinforcing fiber preheating devices 420 may be integrated in parallel, and the coating sections 430 may also be so. In this case, the coating sections 430 have only to include five independent width regulation mechanisms and five independent coating section outlet widths.

In addition, prepreg tapes can be obtained by forming a reinforcing fiber sheet from approximately one yarn to three yarns of tape-like reinforcing fiber bundles and allowing the resulting reinforcing fiber sheet to pass through the coating section the width of which is adjusted to afford a desired tape width. For prepreg tapes, particularly the accuracy of the tape width is often required, from the viewpoint of controlling cross-directional overlapping between the tapes. Because of this, it is preferable to control the coating section outlet width more strictly, and in this case, it is preferable that the above-mentioned L, L2, and W satisfy the relationship(s) of L≤W+1 mm or L2≤W+1 mm.

<Slit>

The method of slitting prepreg is not limited to a particular one, and a known slitting device can be used. A prepreg may be slit after the prepreg is once wound up and separately mounted in a slitting device, or, to obtain efficiency, a slitting step may be disposed continuously after a prepreg production step without once winding up the prepreg. In addition, the slitting step may be a step in which a 1 m or more broad prepreg is directly slit into prepregs having a desired width, or once cut and split into approximately 30 cm narrow prepregs and then slit again into prepregs having a desired width.

Here, in cases where the above-mentioned plurality of coating sections for narrow prepregs or prepreg tapes are juxtaposed, the respective independent release sheets may be supplied, or a plurality of prepreg sheets may be laminated on one broad release sheet that has been supplied. The width direction edges of the prepreg thus obtained can be cut off and supplied into an ATL or AFP device. In this case, the major part of the edges to be cut off is from the release sheet, and accordingly, the amount of the matrix resin component (the resin component in the case of FRP) sticking to the slit cutter blade can be decreased, resulting in being also advantageous in that the cleaning cycle for the slit cutter blade can be extended.

VARIATION AND APPLICATION OF THE PRESENT INVENTION

In the present invention, a plurality of coating sections can be used to attempt to make the production process more efficient and more highly capable.

Figure 16:
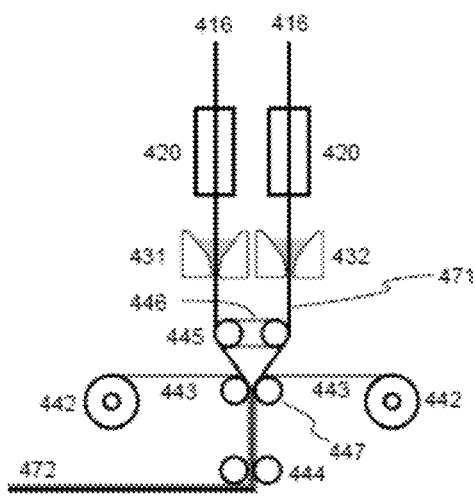
FIG. 16 is a diagram depicting an example of an aspect in which a plurality of prepregs are laminated, wherein the aspect is according to one embodiment of the present invention.

For example, a plurality of coating sections can be arranged so that a plurality of prepregs can be laminated. FIG. 16 shows an example of an aspect in which prepregs are laminated using two coating sections. Two primary impregnate prepregs 471 withdrawn from a first coating section 431 and a second coating section 432 pass by diverting rolls 445, and laminated with resin films 443 at lamination rolls 447 below. Positioning the release sheet between the prepreg and the diverting roll can suppress the adhesion of the prepreg to the nip roll and stabilize the running, and accordingly, is preferable. FIG. 16 depicts an example of a device in which the release sheets 446 circuits two diverting rolls 445. In this regard, the diverting roll can be replaced with a diverting guide provided with release treatment, or replaced with the like. In FIG. 16, the high tension take-up device 444 is disposed after the lamination position of the primary impregnate prepreg 471, and obviously, can also be disposed before the lamination position.

Such a lamination type of prepreg makes it possible to attempt to make the prepreg lamination step efficient, and is effective, for example, in production of a thick type of FRP. In addition, laying up prepregs of a thin type into a multi-layer laminate makes it possible to expect that the FRP toughness and the impact resistance are enhanced, and applying the present production method enables a thin type of multilayer laminated prepreg to be obtained efficiently. Furthermore, laminating different kinds of prepregs easily enables a hetero-bound prepreg having functionality imparted thereto to be obtained easily. In this case, it is possible to change the kind and fineness of the reinforcing fiber, the number of filaments, the mechanical property, the fiber surface property, and the like. In addition, the matrix resin (a resin in the case of prepreg) used can also be a different one. For example, a hetero-bound prepreg in which different prepregs having different thicknesses or different prepregs having different mechanical properties are laminated can be obtained. In addition, a prepreg that can achieve both mechanical properties and tackiness properties can be obtained easily by applying a resin having an excellent mechanical property in the first coating section, applying a resin having excellent tackiness properties in the second coating section, and laminating these. Conversely, a resin having no tackiness properties can also be disposed on the surface. It is also possible to apply a particle-free resin in the first coating section and apply a particle-containing resin in the second coating section.

In another aspect, a plurality of coating sections can be juxtaposed with respect to the running direction of the reinforcing fiber sheet, that is, a plurality of coating sections can be juxtaposed in the width direction of the reinforcing fiber sheet, as illustrated in FIG. 17 and described above. This enables narrow or tape-like types of prepregs to be produced efficiently. In addition, using different reinforcing fibers and different matrix resins for different coating sections makes it possible to obtain a prepreg having properties varying in the width direction.

Figure 18:
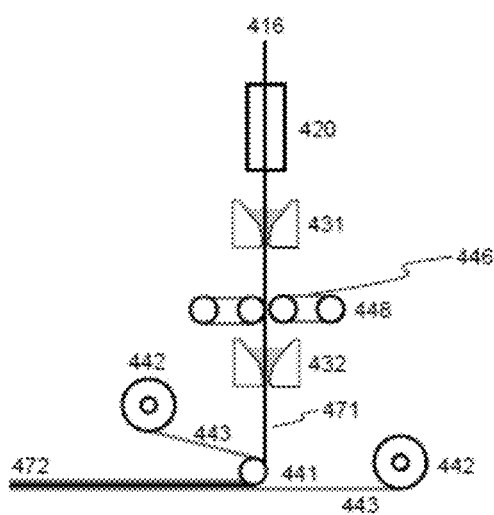
FIG. 18 is a diagram depicting an example of another aspect in which a plurality of coating sections are included, wherein the aspect is according to one embodiment of the present invention.

In another aspect, a plurality of coating sections can also be disposed in series in the running direction of the reinforcing fiber sheet. FIG. 18 shows an example in which two coating sections are disposed in series. Disposing a high tension take-up device 448 between the first coating section 431 and the second coating section 432 is preferable from the viewpoint of stabilizing the running of the reinforcing fiber sheet 416, and can be omitted depending on the coating conditions and the take-up conditions downstream in the process. In addition, positioning a release sheet between the primary impregnate prepreg withdrawn from the first coating section and the high tension take-up device 448 can suppress the adhesion of the primary impregnate prepreg to the nip roll and stabilize the running, and accordingly, is preferable. FIG. 18 depicts an example of a device in which the high tension take-up device 448 is nip rolls, and the release sheets 446 circuits two rolls.

Such a serial type of disposition enables the kinds of matrix resins to be varied in the thickness direction of the primary impregnate prepreg. In addition, even using the same kind of matrix resin enables the running stability and the high-speed running properties to be enhanced by allowing the coating conditions to vary depending on the coating section. For example, a prepreg that can achieve both mechanical properties and tackiness properties can be obtained easily by applying a resin having excellent mechanical properties in the first coating section, applying a resin having excellent tackiness properties in the second coating section, and laminating these. Conversely, a resin having no tackiness properties can also be disposed on the surface. It is also possible to apply a particle-free resin in the first coating section and apply a particle-containing resin in the second coating section.

As above-mentioned, some aspects in which a plurality of coating sections are disposed have been shown, the number of coating sections is not limited to a particular one, and the aspects can be applied in various manners in accordance with the purpose. Needless to say, these types of dispositions can also be combined. Furthermore, the various sizes, shapes, and coating conditions (temperature and the like) of the coating section can be used in mixture.

As described above, the production method according to the present invention not only enables the production to be efficient and stable but also enables the product to be made high-performance and capable, and has excellent extendability.

<Matrix Resin Supply Mechanism>

In the present invention, the matrix resin is stored in the coating section, but it is preferable to replenish the matrix resin suitably because the coating progresses. The mechanism for supplying the coating section with a matrix resin is not limited to a particular one, and a known device can be used. Supplying the coating section with a matrix resin continuously makes it possible not to disturb the liquid surface at the top of the coating section and to stabilize the running of the reinforcing fiber sheet, and accordingly, is preferable. For example, the matrix resin can be supplied by its own weight as a driving force from a vessel storing the matrix resin, or supplied continuously using a pump or the like. As a pump, a gear-pump, tube pump, pressure pump, and the like can suitably be used in accordance with the properties of the matrix resin. In addition, in cases where the matrix resin is solid at room temperature, a melter is preferably provided at the upper portion of the storage vessel. In addition, a continuous extruder and the like can be used. As to the supply amount of the matrix resin, a mechanism for enabling the matrix resin to be supplied continuously in accordance with the coating amount is preferably provided so that the liquid level of the matrix resin in the upper portion in the coating section can be as constant as possible. For this, for example, a mechanism in which the liquid level and the coating section weight are monitored and fed back to a supply device is conceivable.

<On-Line Monitoring>

In addition, a mechanism for allowing the coating amount to be monitored on-line is preferably provided in order to monitor the coating amount. The on-line monitoring method is not limited to a particular one, and a known one can be used. For example, as a device for thickness measurement, for example, a β-ray gauge can be used. In this case, the coating amount can be estimated by measuring the thickness of a reinforcing fiber sheet and the thickness of a prepreg and analyzing the difference between the thicknesses. The coating amount monitored on-line can immediately be fed back to the coating section, and utilized to adjust the temperature of the coating section and the gap D in the narrowed section 23 (see FIG. 2). Needless to say, the coating amount monitoring can be used as defect monitoring. As to the thickness measurement position, for example, in FIG. 12, the thickness of the reinforcing fiber sheet 416 can be measured in the vicinity of the diverting roll 419, and the thickness of the prepreg can be measured between the coating section 430 and the diverting roll 441. In addition, on-line defect monitoring is preferably carried out using infrared, near-infrared, camera (image analysis), and the like.

The coating device according to the present invention has a running mechanism and a coating mechanism, wherein the running mechanism allows a reinforcing fiber sheet, which is unidirectionally arranged reinforcing fibers, to run substantially vertically downward, and wherein the coating mechanism is capable of storing the matrix resin in the inside thereof, and further includes a liquid pool and a narrowed section which are in communication with each other, wherein the liquid pool has a portion whose cross-sectional area decreases continuously along the running direction of the reinforcing fiber sheet, and wherein the narrowed section has a slit-like cross-section and has a smaller cross-sectional area than the top side of the liquid pool.

Below, a prepreg production example regarding the first production method (including providing a resin film) according to the present invention will be described in more detail with reference to a specific example. In this regard, the following description is an example, and the present invention is not construed to be limited to the aspect described below.

Figure 12:
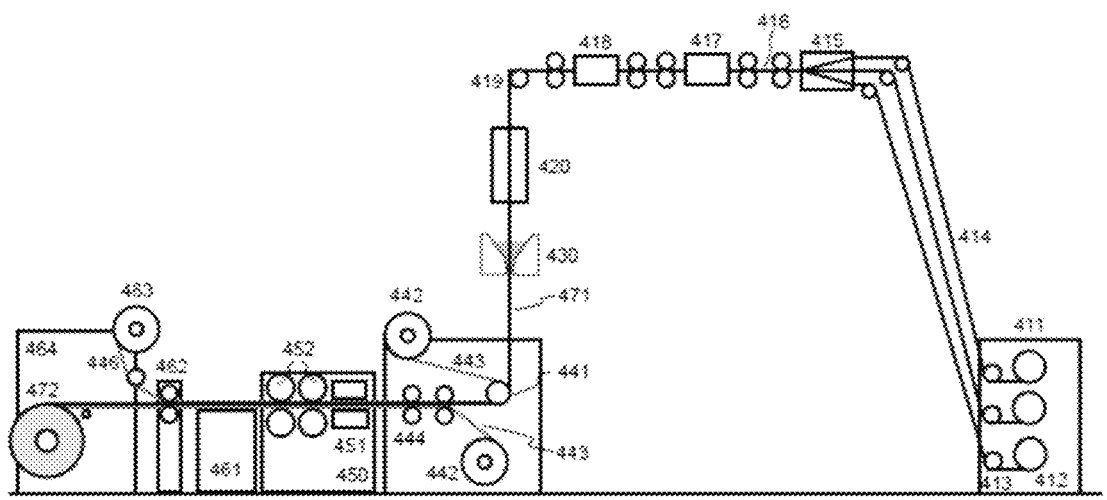
FIG. 12 is a schematic diagram depicting an example of a process/device of producing a prepreg using the present invention.

FIG. 12 is a schematic diagram of an example of a process/device of producing a prepreg using the present invention. A plurality of reinforcing fiber bobbins 412 are fit onto creels 411, and the reinforcing fibers pass by the diverting guides 413 and withdrawn upward. Here, a braking mechanism provided in the creel enables the reinforcing fiber bundle 414 to be withdrawn at a constant tension. A plurality of the reinforcing fiber bundles 414 that have been withdrawn are orderly arranged by a reinforcing fiber arrangement device 415 to form a reinforcing fiber sheet 416. Here, FIG. 12 depicts only three yarns of reinforcing fiber bundles, but in reality, two yarns to hundreds of yarns are possible, and adjustments can be made to afford a desired prepreg width and fiber areal weight. Then, the reinforcing fiber sheet passes through a fiber bundle widening device 417 and a smoothing device 418, passes by a diverting roll 419, and is conveyed vertically downward. In FIG. 12, the reinforcing fiber sheet 416 is linearly conveyed between the devices from the reinforcing fiber arrangement device 415 to the diverting roll 419. In this regard, the fiber bundle widening device 417 and the smoothing device 418 can be skipped suitably, or omitted depending on the purpose. In addition, the arrangement order of the reinforcing fiber arrangement device 415, the fiber bundle widening device 417, and smoothing device 418 can suitably be changed in accordance with the purpose. The reinforcing fiber sheet 416 runs vertically downward from the diverting roll 419, passes through the reinforcing fiber preheating device 420 and the coating section 430, and reaches the diverting roll 441. For the coating section 430, an arbitrary shape can be adopted to the extent that the object of the present invention can be achieved. Examples include such shapes as in FIGS. 2 and 6 to 9. In addition, a bush can be provided as in FIG. 5, if necessary. In addition, bars can be provided in the coating section as in FIG. 11. In FIG. 12, a resin film 443 unwound from a resin film supply device 442 is laminated on one face of a primary impregnate prepreg 471 on a diverting roll 441, and subsequently, a resin film can further be laminated on the other face of the primary impregnate prepreg 471. Here, the resin film is a laminate including a release sheet, and the resin face is preferably adhered tightly to the surface of the prepreg. A release paper sheet, a release film, or the like can be used as a release sheet. The resulting object can be withdrawn into a high tension take-up device 444. FIG. 12 depicts nip rolls as the high tension take-up device 444. Then, the sheet-like integrated object passes through an additional-impregnation device 450 including hot plates 451 and heated nip rolls 452, is cooled in a cooling device 461, is taken up by a take-up device 462, followed by peeling off the release sheet 446, and then, is wound up in a winder 464, whereby a sheet-like integrated object 472 composed of prepreg and a release sheet can be obtained as a product. The sheet-like integrated object is conveyed basically linearly from the diverting roll 441 to the winder 464, and accordingly, generation of wrinkles can be suppressed. Here, the depiction of a matrix resin supply device and an on-line monitoring device is omitted in FIG. 12.

Figure 13:
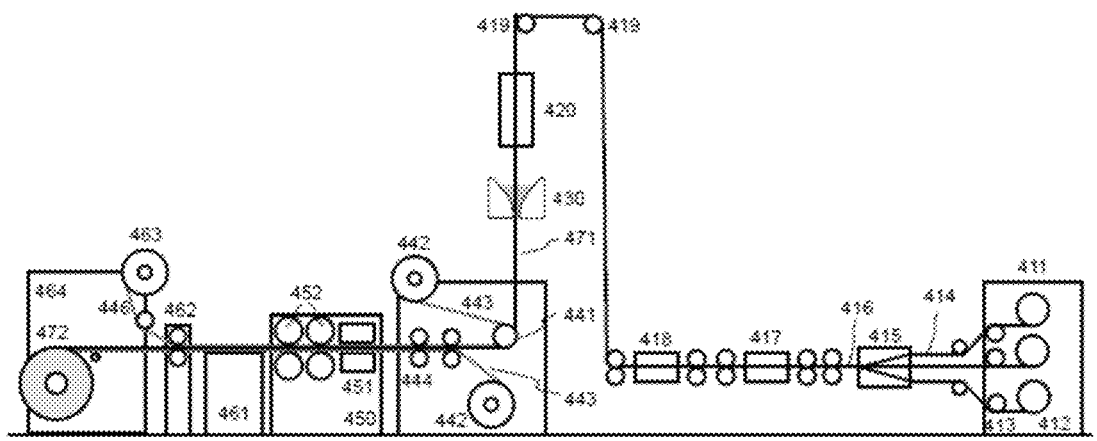
FIG. 13 is a schematic diagram of an example of another process/device of producing a prepreg using the present invention.

FIG. 13 is a schematic diagram of another example of a process/device of producing a prepreg using the present invention. FIG. 13 is different from FIG. 12 in that the reinforcing fiber bundle 414 withdrawn from the creels 411 is directly formed into the reinforcing fiber sheet 416 in the reinforcing fiber arrangement device 415, and conveyed linearly through the fiber bundle widening device 417 and the smoothing device 418, followed by introducing the reinforcing fiber sheet 416 upward. Such a configuration eliminates the necessity to install the devices in the upper places and can simplify the installation of platforms and the like significantly.

Figure 14:
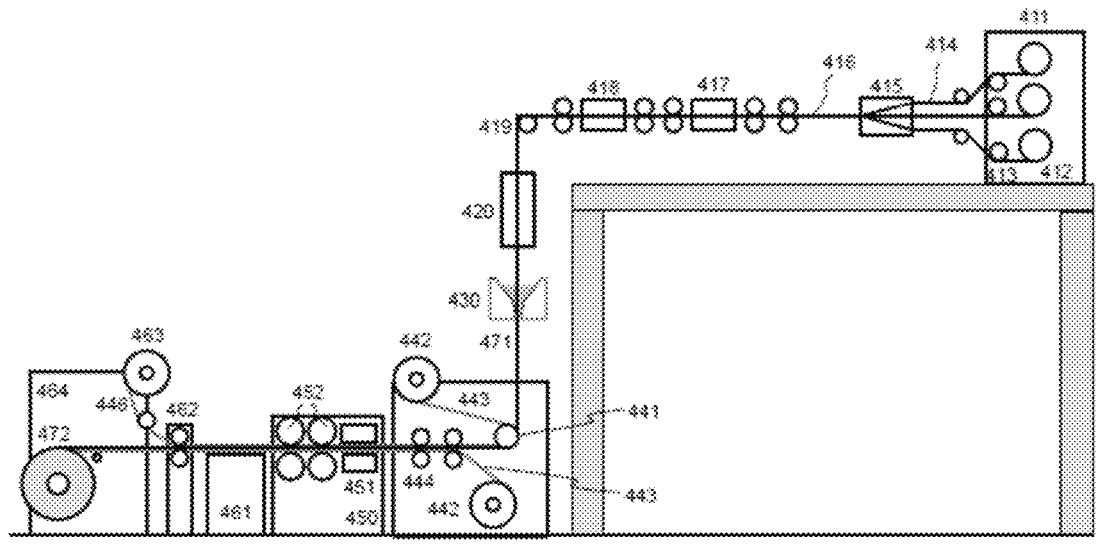
FIG. 14 is a schematic diagram of an example of another process/device of producing a prepreg using the present invention.

FIG. 14 is a schematic diagram of another example of a process/device of producing a prepreg using the present invention. In FIG. 14, the creels 411 are installed upstairs, and the running pathway of the reinforcing fiber sheet 416 is further linearized.

FIG. 15 is a schematic diagram of another example of a process/device of producing a prepreg using the present invention. Shown here is an example in which a simplified additional-impregnation device is used. In FIG. 15, a simplified additional-impregnation device 453 is installed immediately under the coating section 430, and accordingly, the prepreg 471 in a high-temperature state is introduced into the simplified additional-impregnation device 453, so that the impregnation device can be simplified and made smaller. In FIG. 15, heated nip rolls 454 are depicted as an example, but needless to say, smaller heated S-shaped arranged rolls may be used depending on the purpose. Use of a simplified additional-impregnation device also has an advantage in that the whole prepreg production device can be made very compact. In particular, in cases where the resin film 443 is a particle-containing resin film, increasing the degree of impregnation of the primary impregnate prepreg makes it possible to allow the particles in the resin film to be arranged in the surface layer of the prepreg in the subsequent step, and thus, is preferable.

Figure 19:
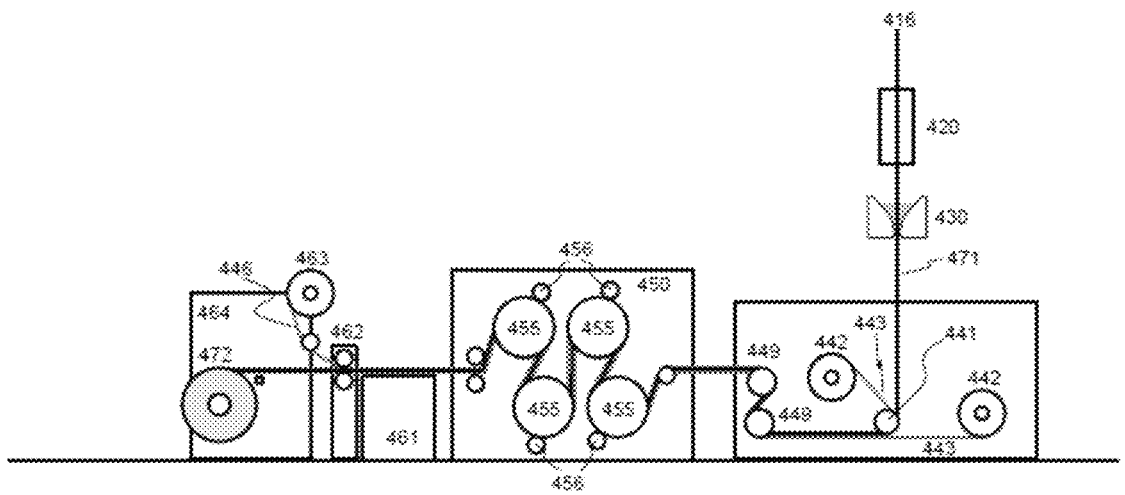
FIG. 19 is a schematic diagram of an example of another process/device of producing a prepreg using the present invention.

FIG. 19 is a schematic diagram of another example of a process/device of producing a prepreg using the present invention. FIG. 19 depicts an example in which high tension take-up S-shaped arranged rolls 449 as a high tension take-up device and two sets of two heated S-shaped arranged rolls 455 (four rolls in total) of an "S-wrap roll" type as an additional-impregnation device are used, but the number of rolls may be larger or smaller in accordance with the purpose. In addition, FIG. 19 depicts contact rolls 456 for enhancing the impregnation effect, but the contact rolls can be omitted depending on the purpose.

Figure 20:
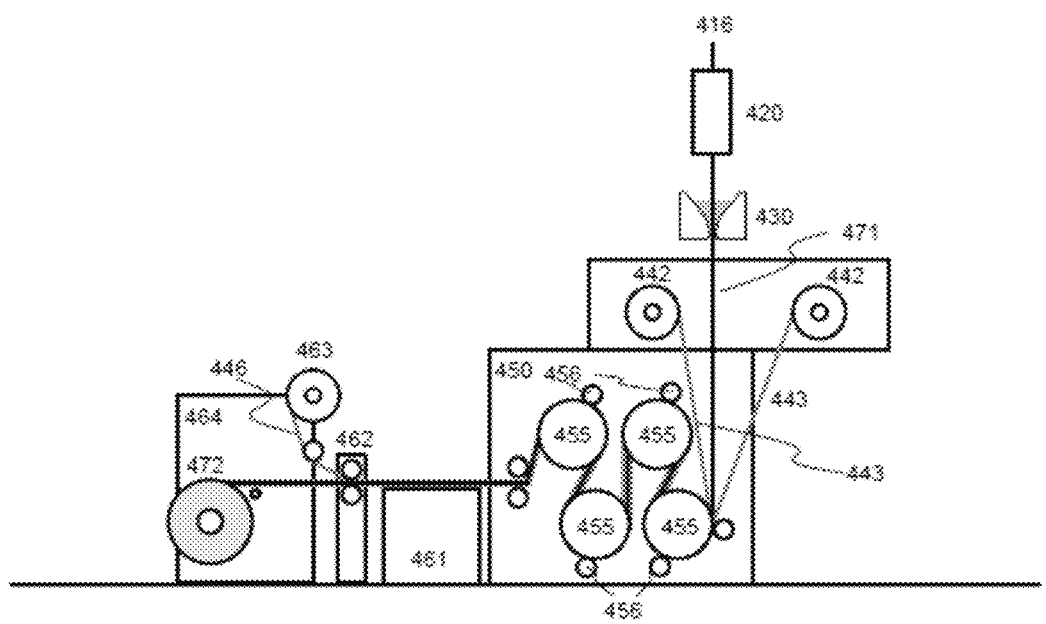
FIG. 20 is a schematic diagram of an example of another process/device of producing a prepreg using the present invention.

FIG. 20 is a schematic diagram of another example of a process/device of producing a prepreg using the present invention. This illustrates an example in which heated S-shaped arranged rolls of an "S-wrap roll" type are used also as a high tension take-up device. This also has an advantage in that the whole prepreg production device can be made very compact.

Next, a prepreg production example regarding the second production method (including providing particles) according to the present invention will be described in detail with reference to a specific example. In this regard, the following description is an example, and the present invention is not construed to be limited to the aspect described below.

Figure 21A:
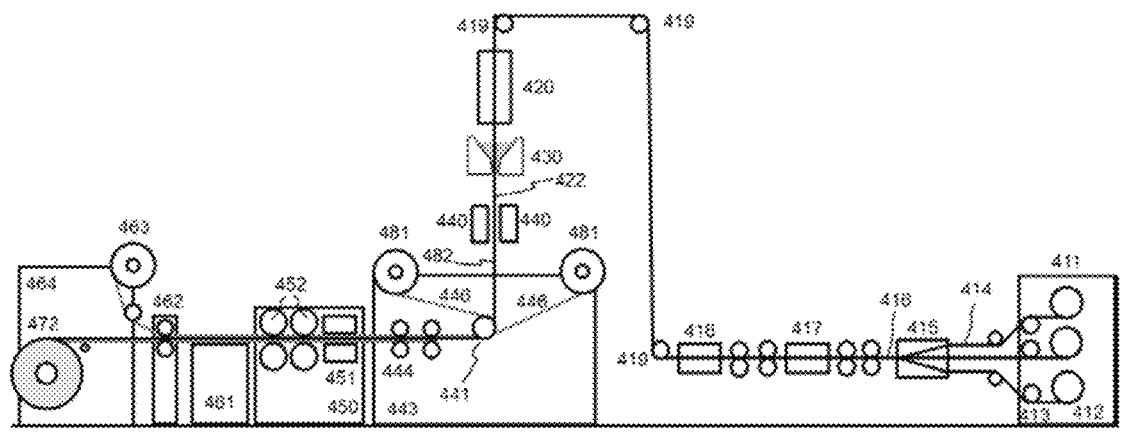
FIG. 21a is a schematic diagram of an example of another process/device of producing a prepreg using the present invention.

FIG. 21a is a schematic diagram depicting an example of a production process of a prepreg, wherein the present invention is used with a UD base material used as a reinforcing fiber sheet. A plurality of reinforcing fiber bobbins 412 are fit onto creels 411, and the reinforcing fibers pass by the diverting guides 413 and withdrawn. Here, a braking mechanism provided in the creel enables the reinforcing fiber bundle 414 to be withdrawn at a constant tension. A plurality of the reinforcing fiber bundles 414 that have been withdrawn are orderly arranged by a reinforcing fiber arrangement device 415 to form a reinforcing fiber sheet 416. Here, FIG. 21a depicts only three yarns of reinforcing fiber bundles, but in reality, one yarn to hundreds of yarns are possible, and adjustments can be made to afford a desired prepreg width and fiber areal weight. Then, the sheet is conveyed linearly to a fiber bundle widening device 417 and a smoothing device 418, passes by a diverting roll 419, and is guided upward. Then, the reinforcing fiber sheet passes by two diverting rolls, changes its conveyance direction to the vertically downward direction, and passes through a reinforcing fiber preheating device 420 and a coating section 430 to afford a primary impregnate prepreg 422. Then, the sheet passes through a particle-providing device 440 to afford a prepreg 482. The obtained prepreg is provided with release sheets 446 from release sheet supply devices 481 when passing by a diverting roll 441, then changes its conveyance direction from the vertical downward direction to the horizontal direction, passes through a high tension take-up device 444 and an additional-impregnation device 450, and is wound up at a winder 464.

FIG. 21a shows an example in which the reinforcing fiber sheet 416 is linearly conveyed from device to device between the reinforcing fiber arrangement device 415 and the smoothing device 418. In this regard, the fiber bundle widening device 417 and the smoothing device 418 can be known devices or optionally skipped depending on the purpose, or omitted. In addition, the arrangement order of the reinforcing fiber arrangement device 415, the fiber bundle widening device 417, and smoothing device 418 can suitably be changed in accordance with the purpose. The reinforcing fiber preheating device 420 can be optionally skipped depending on the purpose, or omitted. For the coating section 430, an arbitrary shape of the coating section can be adopted to the extent that the object of the present invention can be achieved. Examples include such shapes as in FIGS. 2 and 6 to 9. In addition, a bush can be provided as in FIG. 5, if necessary. In addition, bars can be provided in the coating section as in FIG. 11. Any of various particle-providing mechanisms can be used as a particle-providing device 440, and among others, a mechanism using electrostatic coating and a providing mechanism using a gas stream mixed with powder can be preferably used. Using such a mechanism makes it easy to adhere particles to a primary impregnate prepreg running vertically downward, and further makes it possible to inhibit contamination of a floor, the rolls, and the like around the particle-providing device.

In FIG. 21a, a particle-providing device 440 is opposed to each of both faces of the primary impregnate prepreg 422, but may be opposed to only one face. In addition, in FIG. 21a, a release sheet is applied to each of both faces of the prepreg, but may be applied to only one face. To prevent the particles from falling off and prevent rolls and the like from being contaminated, a release sheet is preferably applied to the face provided with the particles. In FIG. 21a, a release sheet 446 unwound from a release sheet supply device 481 can be laminated onto the prepreg 482 on the diverting roll 441 to yield a sheet-like integrated object. A release paper sheet, a release film, or the like can be used as a release sheet. The resulting object can be withdrawn into a high tension take-up device 444. FIG. 21a depicts nip rolls as the high tension take-up device 444. Then, the sheet-like integrated object passes through an additional-impregnation device 450 including hot plates 451 and heated nip rolls 452, is cooled in a cooling device 461, is taken up by a take-up device 462, followed by peeling off the release sheet 446, and then, is wound up in a winder 464, whereby a sheet-like integrated object 472 composed of prepreg and a release sheet can be obtained as a product. The sheet-like integrated object is conveyed basically linearly from the diverting roll 441 to the winder 464, and accordingly, generation of wrinkles can be suppressed.

Figure 21B:
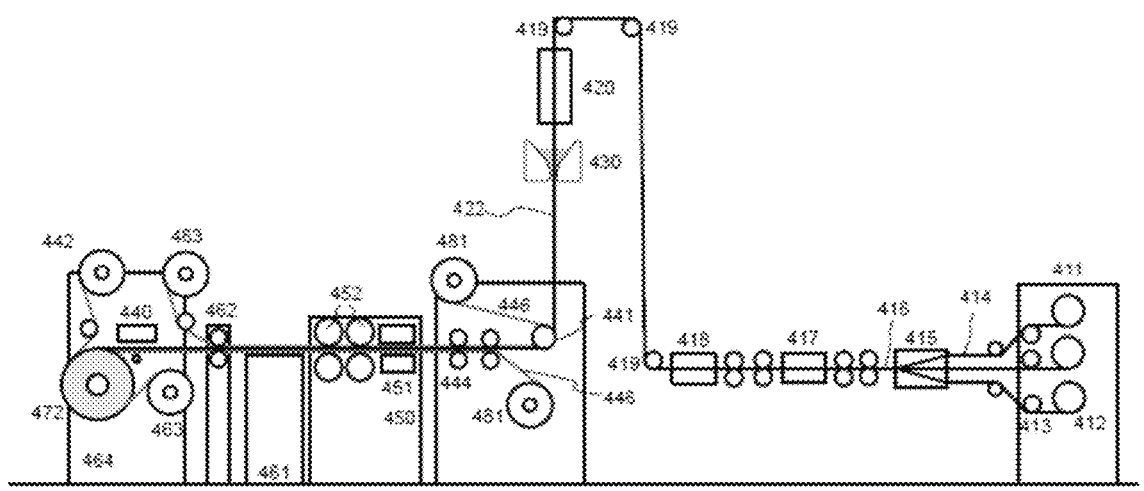
FIG. 21b is a schematic diagram of an example of another process/device of producing a prepreg using the present invention.

As with FIG. 21a, FIG. 21b shows an example of a production process of a prepreg, wherein the present invention is used with a UD base material used as a reinforcing fiber sheet, but the position of the particle-providing device 440 is immediately before the wind-up position in a winder 464 which is downstream of an additional-impregnation device 450, and this example is different in that particles are provided in a section along which the conveyance direction of the primary impregnate prepreg is horizontal. In cases where particles are provided in the section along which the conveyance direction is horizontal, one of the particle-providing devices that can be used is a providing mechanism which causes particles to fall by their own weight. In cases where only one face is provided with particles, a wider range of options are available for a particle-providing device. In addition, the primary impregnate prepreg is provided with particles after passing through an impregnation device, thus making it more likely that the particles remain in the surface layer of the prepreg.

Figure 21C:
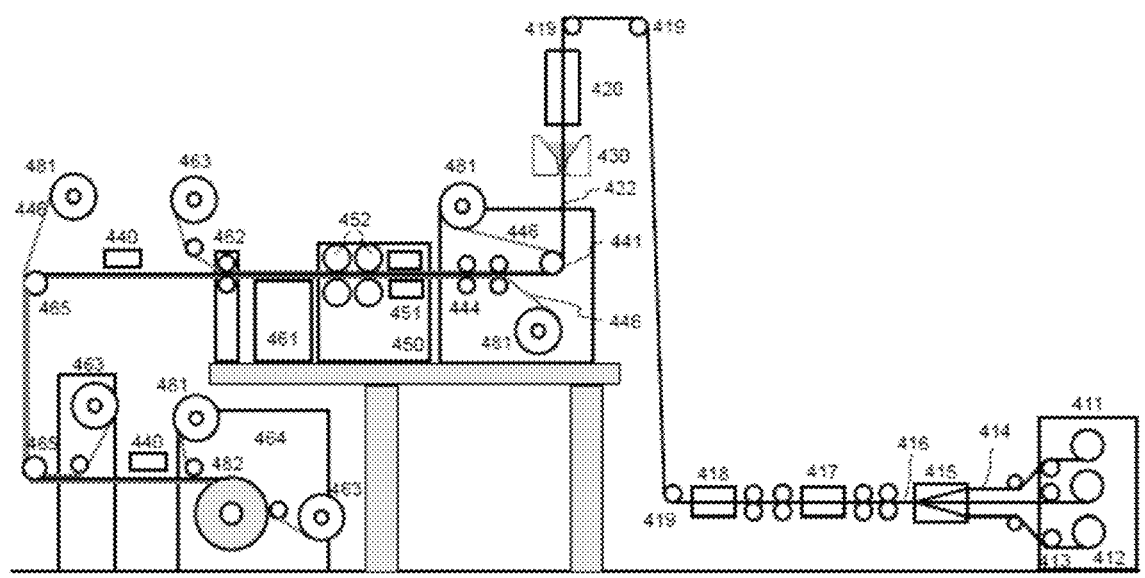
FIG. 21c is a schematic diagram of an example of another process/device of producing a prepreg using the present invention.

As with FIG. 21b, FIG. 21c shows an example of a production process of a prepreg, wherein the present invention is used with a UD base material used as a reinforcing fiber sheet, but to provide both faces of the primary impregnate prepreg with particles, one face of the prepreg is provided with particles, followed by causing the prepreg to take a route in which the running direction is turned back around diverting rolls 465. Adopting the process in FIG. 21c makes it possible to provide both faces of the prepreg with particles horizontally from above.

Figure 21D:
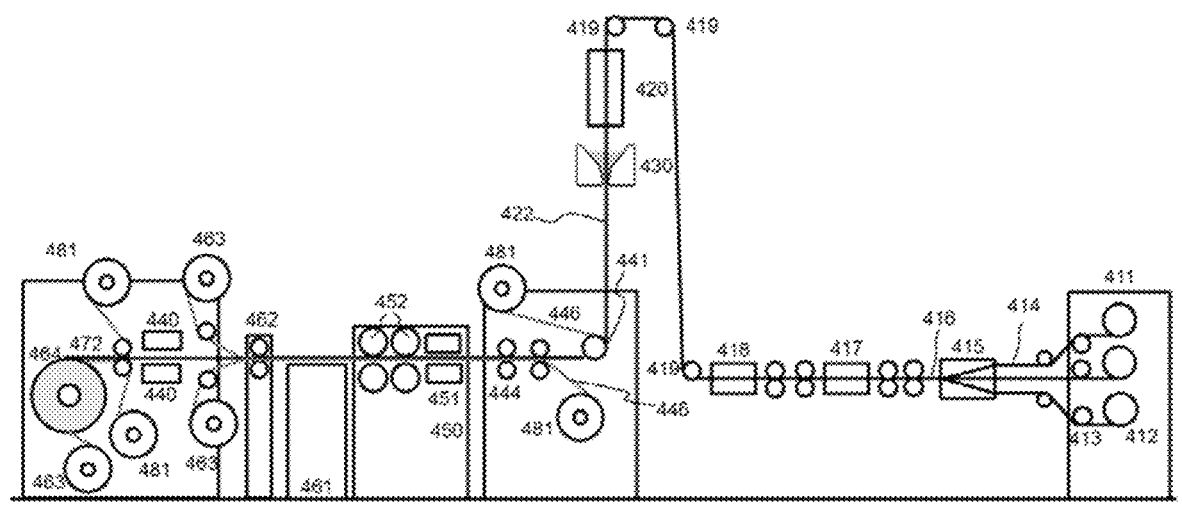
FIG. 21d is a schematic diagram of an example of another process/device of producing a prepreg using the present invention.

As with FIG. 21b, FIG. 21d shows an example of a production process of a prepreg, wherein the present invention is used with a UD base material used as a reinforcing fiber sheet, but to provide both faces of the primary impregnate prepreg with particles after the prepreg has passed through an additional-impregnation device, a release sheet is once unwound and peeled off after passing through an additional-impregnation device, and then, a release sheet is applied again and wound up. In FIG. 21d, a particle-providing device 440 is installed above and below the primary impregnate prepreg conveyed in the horizontal direction, and thus, a providing device other than of a type which causes particles to fall by their own weight should be used.

Figure 21E:
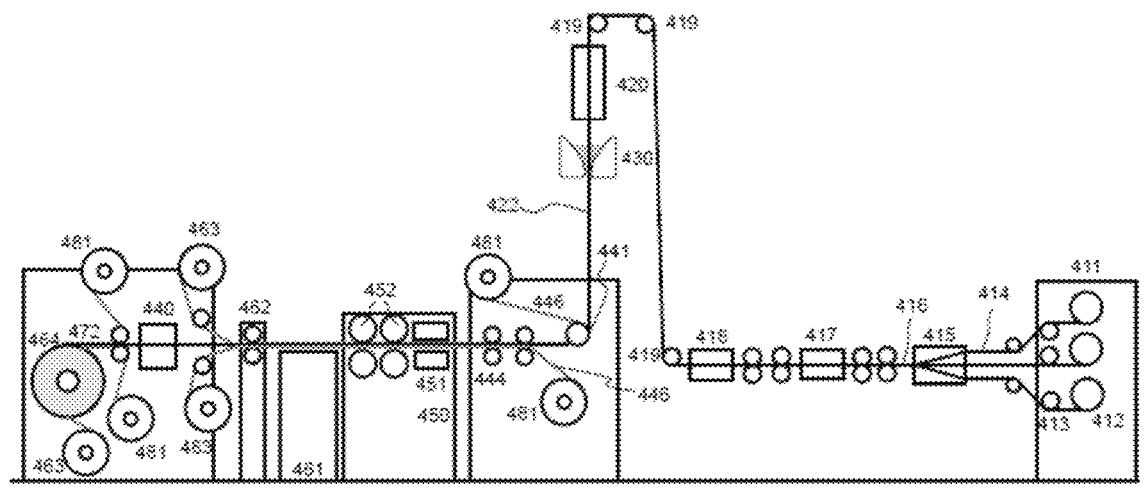
FIG. 21e is a schematic diagram of an example of another process/device of producing a prepreg using the present invention.

As with FIG. 21d, FIG. 21e shows an example of a production process of a prepreg, wherein the present invention is used with a UD base material used as a reinforcing fiber sheet, but a particle-providing device 440 is installed so as to surround a running primary impregnate prepreg. This is a device configuration effective for providing the primary impregnate prepreg with particles by passing the prepreg through a space in which particles are diffused.

Here, the depiction of ancillary devices such as a matrix resin supply device and an on-line monitoring device is omitted in FIG. 21a, FIG. 21b, FIG. 21c, FIG. 21d, and FIG. 21e.

Below, an example in which a prepreg is obtained by a production method according to the present invention will be described more specifically. In this regard, the average particle size of the particles is determined using the above-mentioned method.

In this regard, the impregnation ratio of the prepreg obtained in each of the illustration 1 to the illustration 5 can be 50% or more on the basis of a peeling method.

In addition, the areal weight of a 100 mm square in the width direction of a prepreg can be brought within the range of 3 mass % for both a carbon fiber and a resin, making it possible to obtain an excellent areal weight uniformity in the width direction. In this regard, the uniformity of the areal weight of the prepreg in the width direction can be evaluated as below-mentioned. A 300 mm wide prepreg is cut into a right edge, a center portion, and a left edge in the width direction, 100 mm square each, and the mass of the prepreg and the mass of the carbon fiber are each measured with n=3. The mass of the carbon fiber is measured as a residue obtained by eluting the resin from the prepreg with a solvent. From these, the average values for the sampling positions are calculated, and the average values for the sampling position are compared.

Such prepregs are laminated in six layers, and cured using an autoclave at 180° C. at 6 kgf/cm$^2$ (0.588 MPa) for two hours so that a CFRP can be obtained. The tensile strength is approximately 2.9 GPa. The tensile strength of another CFRP is similarly 2.9 GPa, wherein the CFRP is obtained by laminating and curing, in the same manner as above-mentioned, a prepreg obtained with no yarn split preventive agent added thereto and a prepreg produced by a conventional hot-melt process using carbon fiber and a matrix resin A. In this regard, the tensile strength of a CFRP is measured in the same manner as in WO2011/118106, and the value resulting from normalizing the volume % of the reinforcing fibers in the prepreg to 56.5% is used.

A prepreg that can be finally obtained is a prepreg which has good quality and does not cause a significant decrease in the tensile strength of a CFRP formed by laminating and curing such prepregs.

<Illustration 1: Method of Producing Prepreg Provided with Toughness-enhancing Particles>

Examples of usable devices for producing a prepreg provided with toughness-enhancing particles include a device configured by removing a fiber bundle widening device 417 and a smoothing device 418 from a device having a structure described in FIG. 21b or FIG. 21c (here, the depiction of a matrix resin supply device for the coating section is omitted).

(Application of Matrix Resin)

A plurality of reinforcing fiber bobbins 412 can be fit onto creels 411, and the reinforcing fiber bundles 414 pass by the diverting guides 413 and are withdrawn. The reinforcing fiber bundles 414 can be orderly arranged by a reinforcing fiber arrangement device 415 to form a reinforcing fiber sheet 416. The formed reinforcing fiber sheet 416 can be diverted by diverting rolls 419 so that the conveyance direction can be changed from the horizontal direction to the vertically upward direction to the horizontal direction, and further, from the horizontal direction to the vertically downward direction. Causing the reinforcing fiber sheet running in the vertically downward direction to pass a reinforcing fiber preheat device 420 and a coating section 430 makes it possible to obtain a primary impregnate prepreg 422 both faces of which have been coated with a matrix resin.

Examples of coating sections that can be used include a coating section of the type of the coating section 20c having a form in FIG. 7. The coating section can be made of stainless steel. Furthermore, to heat the matrix resin, a plate-heater can be attached to the periphery of the coating section, and the temperature and viscosity of the matrix resin can be adjusted while the temperature is measured with a thermocouple. In addition, the running direction of the reinforcing fiber sheet in the liquid pool is the vertically downward direction, the liquid pool is tapered in two tiers. The opening angle of the first-tier taper can be 15 to 20°, and the taper can have a length (i.e., H) of 10 to 70 mm, and the opening angle of the second-tier taper can be 5 to 10°. In addition, a plate-like bush conformed to the internal shape of the coating section is provided as a width regulation mechanism, as described in FIG. 5, and furthermore, the installation position of the plate-like bush can be made freely variable so that L2 can suitably be adjusted. Adjustments can be made in accordance with a desired areal weight, and causing L2 to be 300 mm and further causing the gap D in the narrowed section to be approximately 0.2 mm makes it possible to obtain a prepreg having a common areal weight. In addition, the space external to each bush can be closed off at the outlet side of the narrowed section so that the matrix resin cannot leak through the outlet of the narrowed section.

(Matrix Resin)

A matrix resin A that is a thermosetting epoxy resin composition can be used as a matrix resin to be applied in the coating section 430. This is a mixture of an epoxy resin (a mixture of an aromatic amine type of epoxy resin and a bisphenol type of epoxy resin), a hardener (diaminodiphenyl sulfone), and polyethersulfone, and contains no polymer particles. The viscosity of this matrix resin A can be measured using the ARES-G2 manufactured by TA Instruments, Inc., and is 3675 Pa·s at 40° C., 50 Pa·s at 75° C., 15 Pa·s at 90° C., and 4 Pa·s at 105° C., at a measurement frequency of 0.5 Hz at a temperature ramp rate of 1.5° C./minute. Using this matrix resin A, a prepreg can be produced with the matrix resin temperature set to 75 to 105° C. in the coating section and with the running speed of the reinforcing fiber sheet and the primary impregnate prepreg set to 5 to 25 m/minute.

(Provision of Particles)

A primary impregnate prepreg 422 is obtained after passing a coating section 430, and a release sheet 446 unwound from a release sheet supply device 422 is applied to the primary impregnate prepreg 422, which in turn can be conveyed. The primary impregnate prepreg having a release sheet applied thereto is withdrawn into a high tension take-up device 444 and passes through an additional-impregnation device 450, a release sheet 446 on the face to be provided with particles is wound up at a release sheet wind up device 463, and the primary impregnate prepreg can be provided with particles using a particle-providing device 440.

(Method of Providing Particles)

Providing a primary impregnate prepreg with particles is not limited to any particular method, and can generally be carried out using a method and device for supplying powder. It is possible to use a providing device which causes particles to fall onto a running base material by their own weight. A providing device which causes the particles to fall by their own weight is a providing device by which the particles to be supplied are caused to fall onto a base material by their own weight. A general powder supply device can be used as a providing device which causes the particles to fall by their own weight, and a general powder supply device is illustrated in the graphically illustrated "Funtai-kiki/sochi no Kiso-chishiki", issued by Kogyo Chosakai Publishing Co., Ltd. on 11 Sep. 2001, pp. 68-69. A device described in this document can be used to provide particles. More specific examples of usable providing devices which cause particles to fall by their own weight include devices such as of a sieve vibration type, a screw feeder type, a rotation fall type, a belt feeder type, and the like.

Examples of usable devices of a sieve vibration type include a device in which particles are poured into a sieve or the like having meshes, and the sieve is vibrated so that the particles can pass through the meshes and fall by their own weight to be provided. Examples of usable devices of a screw feeder type include a device in which a screw connected to a motor or the like is rotated, and particles discharged through the supply outlet at the tip of the screw are caused to fall onto a base material by their own weight so that the base material can be provided with the particles. The supply amount can be easily adjusted by selecting the rotational speed of the screw and the shape of the screw. Examples of commercially available and usable devices of a screw feeder type include FCμ-030F and FCμ-200F (which are manufactured by Nisshin Engineering Inc.) and the like. Examples of usable devices of a rotation fall type include a device in which a roller with a brush or a blade is rotated, scraping off or knocking off particles in the supply inlet or the narrowed section through which particles are supplied, so that the particles can fall by their own weight to be provided. Examples of commercially available and usable devices of a rotation fall type include Nikka K-VII Spray (manufactured by Nikka Ltd.) and the like. Examples of usable devices of a belt feeder type include a device in which particles are mounted on a belt rotating in a loop manner, and the particles are caused to fall from the end portion of the belt by their own weight so as to be provided onto a base material. Examples of commercially available and usable devices of a belt feeder type include BW-150-1B (manufactured by Kubota Corporation) and the like. In addition, examples of usable methods and devices which cause particles to fall by their own weight to be provided are described in JP5815501B, JP5878017B, WO2013/107829A1, and the like.

(Provided Amount of Particles)

In the present invention, the provided amount of particles with which a primary impregnate prepreg is provided is not limited to any particular value, and needs only to be in a range which does not significantly impair the mechanical property of the resulting CFRP. The provided amount of particles is preferably 0.01 mass % or more and 40 mass % or less with respect to the total mass of the matrix resin applied in the coating section. This range makes it possible to obtain the effect of providing particles and to afford a good mechanical property to the CFRP.

(Particles to be Provided)

Toughness-enhancing particles to be provided can be any of various kinds of particles without any particular limitation. In addition, the particles to be provided may be of a single type, a multiple type, or a mixture of multiple types. The particles have an average particle size of 0.1 µm or more and 500 µm or less. The average particle size in this range makes it possible to enhance the functionality and properties of the resulting prepreg or CFRP.

Toughness-enhancing particles are polymer particles that can enhance the toughness and impact resistance of the resulting CFRP. As such toughness-enhancing particles, suitable ones described in, for example, WO2009/142231 as a reference can be used. More specifically, polyamides and polyimides can preferably be used, and examples of polyamides that can be suitably used include polyamide 12, polyamide 11, polyamide 6, polyamide 66, polyamide 6/12 copolymers, and a polyamide modified to have a semi IPN (macromolecular interpenetrating network structure) with an epoxy compound (semi IPN polyamide) described in Example 1 of JP H01-104624A. Examples of commercially available polyamide particles that can be used include SP-500, SP-10, TR-1, TR-2, 842P-48, 842P-80 (which are all manufactured by Toray Industries, Inc.), "Orgasol®" 1002D, 2001UD, 2001EXD, 2002D, 3202D, 3501D, 3502D (which are all manufactured by Arkema K.K.), "Grilamid®" TR90 (manufactured by Emser Werke, Inc.), "TROGAMID®" CX7323, CX9701, CX9704 (manufactured by Degussa AG), and the like.

In particular, in order to enhance the impact resistance of CFRP, it is important to enhance the toughness of the interlayer resin layer of the CFRP, and polymer particles are preferably retained in the interlayer resin layer. In the example of a production method shown in FIG. 21b, the surface of a primary impregnate prepreg is provided with particles after the primary impregnate prepreg undergoes an additional-impregnation process, and thus, the particles are more likely to remain in the surface layer of the prepreg, eventually making it possible that the particles are more easily retained in the interlayer resin layer of the CFRP.

(Wind-Up)

From the release sheet supply devices 481, release paper sheets are applied to those faces of the prepreg which have been provided with particles. Then, the release sheet on one of the faces is wound up by the release sheet wind up device 463, and at the winder 464, the sheet-like integrated object 472 can be wound up.

<Illustration 2: Method of Producing Prepreg Provided with Hardener Particles>

Examples of usable devices for producing a prepreg provided with hardener particles include a device configured by removing a fiber bundle widening device 417 and a smoothing device 418 from a device having a structure described in FIG. 21a (here, the depiction of a resin supply section is omitted).

The matrix resin and the application of the matrix resin are the same as in the illustration 1. In FIG. 21b, particles are provided before the wind-up section, but in FIG. 21a, particles are provided immediately under the coating section 430.

(Provision of Particles)

A primary impregnate prepreg 422 is obtained after passing a coating section 430, and immediately under the coating section 430, the prepreg can be provided with particles from particle-providing devices 440 arranged by both faces of the primary impregnate prepreg.

(Method of Providing Particles)

Providing a primary impregnate prepreg with particles is not limited to any particular method, and can generally be carried out using a method and device for supplying powder. It is possible to use a device using electrostatic coating. A device using electrostatic coating is a device used in electrostatic coating which is generally used as a method in which a base material is provided with electrically charged coating particles that are electrically charged by static electricity, and this device is used as a particle-providing device. More specifically, that which can be used is a method or a device in which a spray gun or the like having a high voltage applied thereto is used to electrically charge particles, and the attractive force of the static electricity attracts and adheres the particles to the base material. The static electricity attracts the powder to the base material, and thus, the particles can be efficiently adhered to the base material. Because of this, it is easy to adhere the particles even in cases where the conveyance direction of the primary impregnate prepreg is vertically downward. Specifically, methods and devices described in WO2013/107829, WO2015/007862, and the like can be used. Examples of commercially available and usable devices using electrostatic coating include; EA-MS40-15, E-M15C, E-M25, E-A10, EBG, EP-MG10, EP-MG10L, and EP-AG10H (which are all manufactured by Anest Iwata Corporation); and the like.

(Provided Amount of Particles)

In the present invention, the provided amount of particles with which a primary impregnate prepreg is provided is not limited to any particular value, and needs only to be in a range which does not significantly impair the mechanical property of the resulting CFRP. The provided amount of particles is preferably 0.01 mass % or more and 40 mass % or less with respect to the total mass of the matrix resin applied in the coating section. This range makes it possible to obtain the effect of providing particles and to afford a good mechanical property to the CFRP.

(Particles to be Provided)

Hardener particles to be provided can be any of various kinds of particles without any particular limitation. In addition, the particles to be provided may be of a single type, a multiple type, or a mixture of multiple types.

The particles to be provided in the present invention have an average particle size of 0.1 µm or more and 500 µm or less. The average particle size in this range makes it possible to enhance the functionality and properties of the resulting prepreg or CFRP.

(Hardener Particles)

Hardener particles are provided as particles which are composed of a hardener that cures a thermosetting matrix resin applied to a reinforcing fiber sheet in the coating section 20, or which contain a hardening accelerator that accelerates hardening of the matrix resin. A matrix resin to be applied in the coating section is also enabled to contain a hardener or a hardening accelerator. Examples of hardener particles that can be used include various hardeners and hardening accelerators which are solid at 23° C. For example, as a hardener for an epoxy resin, a hardener can be used if the hardener is a compound having an active group capable of reacting with an epoxy group. Preferably, compounds having an amino group, an acid anhydride group, or an azido group are suitable. Specifically, it is possible to use various isomers of dicyandiamide and diaminodiphenyl sulfone and amino benzoic acid ester types. Examples of hardening accelerators that can be used include tertiary amines, tertiary amine salts, Lewis acid complexes, onium salts, imidazole compounds, urea compounds, hydrazide compounds, and the like.

(Wind-Up)

From the release sheet supply devices 481, release paper sheets are applied to those faces of the prepreg which have been provided with particles. Then, the release sheet on one of the faces is wound up by the release sheet wind up device 463, and at the winder 464, the sheet-like integrated object 472 can be wound up.

<Illustration 3: Method of Producing Prepreg Provided with Damping Performance-Enhancing Particles>

Examples of usable devices for producing a prepreg provided with damping performance-enhancing particles include a device configured by removing a fiber bundle widening device 417 and a smoothing device 418 from a device having a structure described in FIG. 21e (here, the depiction of a resin supply section is omitted).

The matrix resin and the application of the matrix resin are the same as in the illustration 1. In FIG. 21b, particles are provided from above the upper face of the horizontally conveyed primary impregnate prepreg, but in FIG. 21e, the device is configured such that the primary impregnate prepreg is passed through an enclosure in which particles are dispersed.

(Provision of Particles)

A primary impregnate prepreg 422 obtained after passing the coating section 430 passes through the additional-impregnation 450, and then, the release sheets are peeled off so that both faces of the primary impregnate prepreg can be provided with particles.

(Method of Providing Particles)

Providing a primary impregnate prepreg with particles is not limited to any particular method, and can generally be carried out using a method and device for supplying powder. It is possible to use a providing device which causes a base material to pass through a space in which powder is diffused. A providing device which causes a base material to pass through a space in which powder is diffused is a device which causes powder to be dispersed in a space by using a gas stream or by electrically charging the powder and causes the base material to pass through the space so that the particles can be provided. Specifically, methods and devices described in JP H06-71646A, U.S. Pat. No. 5,198,281B, and the like can be used.

(Provided Amount of Particles)

In the present invention, the provided amount of particles with which a primary impregnate prepreg is provided is not limited to any particular value, and needs only to be in a range which does not significantly impair the mechanical property of the resulting CFRP. The provided amount of particles is preferably 0.01 mass % or more and 40 mass % or less with respect to the total mass of the matrix resin applied in the coating section. This range makes it possible to obtain the effect of providing particles and to afford a good mechanical property to the CFRP.

(Particles to be Provided)

Particles to be provided can be any of various kinds of particles without any particular limitation. In addition, the particles to be provided may be of a single type, a multiple type, or a mixture of multiple types.

The particles to be provided in the present invention have an average particle size of 0.1 μm or more and 500 μm or less. The average particle size in this range makes it possible to enhance the functionality and properties of the resulting prepreg or CFRP.

(Damping Performance-Enhancing Particles)

Damping performance-enhancing particles are provided as particles which enhance the damping performance of the resulting CFRP. Examples of damping performance-enhancing particles that can be used include urethane particles. Among others, urethane particles having a three-dimensional cross-linked structure can be used, and can enhance the damping performance and solvent resistance of a CFRP. Examples of usable and commercially available urethane particles having a three-dimensional cross-linked structure include: "DAIMICBEAZ®" UCN-5070 and 5150 (which are manufactured by Dainichiseika Color & Chemicals Mfg. Co., Ltd.); "ARTPEARL®" C-400, P-400T, JB-400T, and CE-400T (which are manufactured by Negami Chemical Industrial Co., Ltd); and the like.

(Wind-Up)

From release sheet supply devices 481, release paper sheets are applied to those faces of the prepreg which have been provided with particles. Then, the release sheet on one of the faces is wound up by a release sheet wind up device 463, and at a winder 464, a sheet-like integrated object 472 can be wound up.

<Illustration 4: Method of Producing Prepreg Provided with Tackiness-Adjusting Particles>

Examples of usable devices for producing a prepreg provided with tackiness-adjusting particles include a device configured by removing a fiber bundle widening device 417 and a smoothing device 418 from a device having a structure described in FIG. 21d (here, the depiction of a resin supply section is omitted).

The matrix resin and the application of the matrix resin are the same as in the illustration 1. In FIG. 21b, one face of the primary impregnate prepreg is provided with particles, but in FIG. 21d, both faces are provided with particles.

(Provision of Particles)

A primary impregnate prepreg 422 obtained after passing the coating section 430 passes through the additional-impregnation 450, and then, the release sheets are peeled off so that both faces of the primary impregnate prepreg can be provided with particles.

(Method of Providing Particles)

Providing a primary impregnate prepreg with particles is not limited to any particular method, and can generally be carried out using a method and device for supplying powder. It is possible to use a providing device which uses a gas stream mixed with powder. A providing device using a gas stream mixed with powder is a providing device which sprays a base material with air mixed with powder. Specifically, methods and devices described in JP H06-71646A, JP5814964B, and the like can be used.

(Provided Amount of Particles)

In the present invention, the provided amount of particles with which a primary impregnate prepreg is provided is not limited to any particular value, and needs only to be in a range which does not significantly impair the mechanical property of the resulting CFRP. The provided amount of particles is preferably 0.01 mass % or more and 40 mass % or less with respect to the total mass of the matrix resin applied in the coating section. This range makes it possible to obtain the effect of providing particles and to afford a good mechanical property to the CFRP.

(Particles to be Provided)

Particles to be provided can be any of various kinds of particles without any particular limitation. In addition, the particles to be provided may be of a single type, a multiple type, or a mixture of multiple types.

The particles to be provided in the present invention have an average particle size of 0.1 μm or more and 500 μm or less. The average particle size in this range makes it possible to enhance the functionality and properties of the resulting prepreg or CFRP.

(Tackiness-Adjusting Particles)

Tackiness-adjusting particles are particles which are provided so that they can adjust the sticking property of the primary impregnate prepreg. Examples of tackiness-adjusting particles that can be used include epoxy resin particles, thermoplastic polymer particles, and the like which are solid at 23° C. In cases where epoxy resin particles are used as tackiness-adjusting particles, particles formed from, for example, an epoxy resin which is solid at 23° C. and pulverized, if necessary, can be used. A commercially available epoxy resin can be used without any particular limitation. The same resin as a matrix resin applied in the coating section has a small influence on the properties of a CFRP, and is preferable. Examples of commercially available epoxy resins that can be used include bisphenol A epoxy resins such as: "jER®" 1001, "jER®" 1002, "jER®" 1003, "jER®" 1055, "jER®" 1004, "jER®" 1004AF, "jER®" 1007, "jER®" 1009, "jER®" 1003F, "jER®" 1004F, "jER®" 1009F, "jER®" 1004FS, "jER®" 1006FS, "jER®" 1007FS, "jER®" 4004P, "jER®" 4005P, "jER®" 4007P, "jER®" 4010P, "jER®" 1256P, "jER®" 154P, "jER®" 157S70, "jER®" 1031S, "jER®" 1032H60, "jER®" YL6810, "jER®" YX7700, "jER®" YX8800, "jER®" YX4000, "jER®" YX4000H, "jER®" YK6121HA, and "jER®" YX4000 (which are all manufactured by Mitsubishi Chemical Corporation); "EPICLON®" 1050, "EPICLON®" 1055, "EPICLON®" 2050, "EPICLON®" 3050, "EPICLON®" 4050, "EPICLON®" 7050, "EPICLON®" HM-091, "EPICLON®" HM-101, "EPICLON®" 152, "EPICLON®" 153, "EPICLON®" N-660, "EPICLON®" N-665, "EPICLON®" N-670, "EPICLON®" N-673, "EPICLON®" N-680, "EPICLON®" N-690, "EPICLON®" N-695, "EPICLON®" N-655-EXP, "EPICLON®" N-655-EXP-S, "EPICLON®" N-662-EXP-S, "EPICLON®" N-665-EXP-S, "EPICLON®" N-670-EXP-S, "EPICLON®" N-685-EXP-S, "EPICLON®" N-770, "EPICLON®" N-775, "EPICLON®" N-865, "EPICLON®" HP-7200L, "EPICLON®" HP-7200, "EPICLON®" HP-7200H, "EPICLON®" HP-7200HH, "EPICLON®" HP-4700, "EPICLON®" HP-5000 EPICLON®" HP-6000, and "EPICLON®" HP-4710 (which are all manufactured by DIC Corporation); and the like.

Thermoplastic polymer particles can be used without any particular limitation. It is possible to use a thermoplastic polymer which is formed into particles by pulverization or the like, if necessary. Such a thermoplastic polymer is preferably the same as a component in the matrix resin applied in the coating section. Such a polymer has a small influence on the mechanical properties of a CFRP. Such thermoplastic polymer particles preferably have a Tg of 180° C. or more and have an aromatic ring in the molecule. This makes it possible to impart heat resistance. Specifically, polyethersulfone, polyetherethersulfone, polyetherimide, polyphenylene oxide, polysulfone, or the like is preferably used. Examples of commercially available sulfone-based and imide-based thermoplastic polymers include: polyethersulfones, for example, "Sumika Excel®" PES5003P, which has a hydroxyl group at the terminal, (manufactured by Sumitomo Chemical Co., Ltd.), "Virantage®" VW10700 (manufactured by Solvay Advanced Polymers LLC), and "Sumika Excel®" PES7600P, which has a chlorinated terminal, (manufactured by Sumitomo Chemical Co., Ltd.); polyetherimides, for example, "Ultem®" 1010, which has an acid anhydride or an amino group at the terminal (manufactured by Sabic Innovative Plastics); polysulfones, for example, "Virantage®" VW30500 (manufactured by Solvay Advanced Polymers LLC); and the like. Terpene resin particles can also be used. A terpene resin can be, for example, pulverized, if necessary, so as to be used. Examples of commercially available terpene resins that can be used include: YS RESIN PX1250, YS RESIN PX1150, and YS RESIN PX1000 (which are all manufactured by Yasuhara Chemical Co., Ltd.); and the like.

A device for providing tackiness-adjusting particles can be used without any particular limitation, and among others, a providing device using a gas stream mixed with powder is preferable. This makes it possible to decrease contamination of the device and the surroundings of the device by the particles.

(Wind-Up)

From the release sheet supply devices 481, release paper sheets are applied to those faces of the prepreg which have been provided with particles. Then, the release sheet on one of the faces is wound up by the release sheet wind up device 463, and at the winder 464, the sheet-like integrated object 472 can be wound up.

EXAMPLES

<Prepreg Production Device>

Unless otherwise specified, a coating section of the type 20c in the form depicted in FIG. 7 was used as a coating section in each of Examples and Comparative Examples, and a device configured by removing a fiber bundle widening device and a smoothing device from a device configured as described in FIG. 15 (here, the depiction of a matrix resin supply device for the coating section is omitted) was used as a prepreg production device. Reinforcing fibers withdrawn from the creels were formed into a reinforcing fiber sheet at the arrangement device 415 disposed above, and the sheet was introduced into the reinforcing fiber preheating device 420.

<Coating Section>

In the coating section, stainless steel blocks were used as the wall constituent members and forming the liquid pool and the narrowed section, and stainless steel plates were used as the side plate members. Furthermore, to heat the matrix resin, a plate-heater was attached to the periphery of the wall constituent members and the side plate members, and the temperature and viscosity of the matrix resin were adjusted with a temperature measurement being made using a thermocouple. In addition, the running direction of the reinforcing fiber sheet was the vertically downward direction, the liquid pool was tapered in two tiers, the opening angle of the upper taper was 17°, and the taper had a height (i.e., H) of 100 mm, and the opening angle of the lower taper was 7°. In addition, a plate-like bush conformed to the internal shape of the coating section was provided as a width regulation mechanism, as described in FIG. 5, and furthermore, the installation position of the plate-like bush was made freely variable so that L2 could suitably be adjusted. L2 was 300 mm unless otherwise specified. The gap D in the narrowed section was 0.18 mm. In this case, the aspect ratio of the outlet slit was approximately 1667. In addition, the space external to each bush was closed off at the bottom outlet of the narrowed section so that the matrix resin could not leak through the outlet of the narrowed section.

\<Reinforcing Fiber Sheet\>

A sheet-like prepreg for FRP was produced with the above-mentioned device, using carbon fiber (TORAYCA T800S (24K), manufactured by Toray Industries, Inc.) as a reinforcing fiber and the below-mentioned thermosetting epoxy resin composition as a matrix resin. In addition, the number of reinforcing fiber bobbins was changed in accordance with the prepreg to be produced, and was 56 unless otherwise specified.

\<Prepreg Production Process\>

The reinforcing fiber bundles withdrawn from a plurality of reinforcing fiber bobbins fit onto the creels were formed into the reinforcing fiber sheet in the reinforcing fiber arrangement device, and the resulting reinforcing fiber sheet was once introduced upward by the diverting rolls. Then, the reinforcing fiber sheet was passed by the diverting roll, conveyed vertically downward, heated in the reinforcing fiber preheating device to the temperature equal to or greater than the temperature of the coating section, introduced into the coating section, and coated with the matrix resin. Then, a prepreg was withdrawn from the coating section, and underwent an additional-impregnation process in a simplified additional-impregnation device including heated nip rolls. When this was done, a release paper sheet was inserted between heated rolls and the prepreg. Then, the release paper sheet was peeled off at the lower section of the simplified additional-impregnation device, and a resin film having a release paper sheet was laminated on each of both faces of the prepreg on a high tension take-up device. Furthermore, this was introduced into the additional-impregnation device including the hot plates and the heated nip rolls, and was optionally subjected to an additional-impregnation process. Then, the resulting object was passed through the cooling device, the upper release paper sheet was peeled off, and the sheet-like integrated object was wound up.

\<Matrix Resin\>

Matrix Resin (Thermosetting Epoxy Resin Composition)

Thermosetting Epoxy Resin Composition 1 (Matrix Resin A):

a mixture of an epoxy resin (a mixture of an aromatic amine type of epoxy resin and a bisphenol type of epoxy resin), a hardener (diaminodiphenyl sulfone), and polyethersulfone; containing no polymer particles. The viscosity of this thermosetting epoxy resin 1 was measured using the ARES-G2 manufactured by TA Instruments, Inc. at a measurement frequency of 0.5 Hz at a temperature ramp rate of 1.5° C./minute and was found to be 50 Pa·s at 75° C., 15 Pa·s at 90° C., and 4 Pa·s at 105° C.

Thermosetting Epoxy Resin Composition 2 (Matrix Resin B):

To a mixture of an epoxy resin (a mixture of an aromatic amine type of epoxy resin and a bisphenol type of epoxy resin), a hardener (diaminodiphenyl sulfone), and polyethersulfone, "particle 3" (having a Tg of 150° C.) described in EXAMPLES in JP2011-162619A was added as polymer particles so as to account for 13 mass % of the whole mass of the resin composition as 100 mass %, and the resulting mixture was used.

The viscosity of this thermosetting epoxy resin 2 was measured using the ARES-G2 manufactured by TA Instruments, Inc. at a measurement frequency of 0.5 Hz at a temperature ramp rate of 1.5° C./minute and was found to be 118 Pa·s at 75° C., 32 Pa·s at 90° C., and 10 Pa·s at 105° C.

\<Resin Film\>

A known roll coater was used to apply a resin to a release paper sheet, and the resin was molded in film form to produce a resin film. Here, the release paper sheet having the film thereon was wound up.

\<Evaluation of Continuous Running Properties\>

To evaluate the continuous running properties of a reinforcing fiber sheet in the coating section, the reinforcing fiber sheet was run continuously for 30 minutes. One which caused no fuzz clogging nor yarn breaking was rated as "Good", and one which caused fuzz clogging and yarn breaking was rated as "Bad".

In addition, to evaluate a sign of fuzz clogging, the coating section was dismantled after each of the 60-minute and the 120-minute continuous running, the liquid contact surface of each of the wall constituent members was checked by visual observation for fuzz. The fuzz prevention properties were evaluated as follows: the fuzz prevention properties by virtue of which fuzz stuck to or to the vicinity of the narrowed section after the continuous running was rated as "Poor"; the fuzz prevention properties by virtue of which fuzz stuck to the portion far from the narrowed section 23 (to and to the vicinity of the upper portion of the liquid pool 22) after the continuous running was rated as "Fair"; the fuzz prevention properties by virtue of which no fuzz stuck to the liquid contact surface of any of the wall constituent members 21 and after the continuous running was rated "Good".

In addition, the reinforcing fiber sheet was run continuously at a running speed of 20 m/minute for 60 minutes, and a measurement was made of the time during which the reinforcing fiber sheet was run uniformly without having any split of the fiber bundle (parts at which the sheet-like carbon fiber bundle was torn in streaks) or any edge folding of the fiber bundle (parts at which the carbon fiber bundle was folded over) immediately above the liquid pool. The reinforcing fiber sheet that was run uniformly without any split of the fiber bundle or any edge folding of the fiber bundle during the time the ratio of which was 90% or more of the whole running time was rated as "Excellent", 50% or more and less than 90% "Good", 10% or more and less than 50% "Fair", less than 10% "Poor".

\<Evaluation of Degree of Impregnation\>

Peeling Method (in Cases where the Degree of Impregnation is Low)

A sampled prepreg was sandwiched between adhesive tapes, these were peeled off, and the reinforcing fiber to which the matrix resin stuck and the reinforcing fiber to which the matrix resin did not stick were separated. Then, the ratio of the mass of the reinforcing fiber to which the matrix resin stuck with respect to the mass of the whole reinforcing fiber sheet that was used was regarded as an impregnation ratio of the matrix resin based on a peeling method.

Water Absorption Rate (in Cases where the Degree of Impregnation is High)

A method described in Japanese Translation of PCT International Application Publication No. JP-T-2016-510077 was used, wherein one side of a prepreg cut to 10 cm×10 cm was immersed by 5 mm in water for five minute, causing a change in the mass, from which change the impregnation ratio was calculated.

Examples 1 to 4

A prepreg was produced using a resin film obtained using a thermosetting epoxy resin composition 1 (matrix resin A)

in the coating section and using a separately prepared thermosetting epoxy resin composition 2 (matrix resin B) as a resin film. In this Example, however, an additional-impregnation process was not carried out after the application of a resin film. In this regard, the temperature of the matrix resin A in the liquid pool was 90° C. (corresponding to 15 Pa·s). In addition, the running speeds of the reinforcing fiber sheet and the prepreg were 20 m/minute.

The evaluation results of the running stability of the primary impregnate prepreg in the coating section are shown in Table 1, wherein the relationship L2–W between the width L2 in the lower end portion of the width regulation mechanism and the width W of the primary impregnate prepreg and the height H along which the cross-sectional area of the coating section decreases continuously are changed variously. This reveals that a smaller L2–W value and a higher H value enhance the stable running properties of the primary impregnate prepreg. In addition, in cases where a simplified additional-impregnation process was not carried out and where the primary impregnate prepreg was collected at the lower section of the simplified additional-impregnation device, the impregnation ratio checked by a peeling method was found to be 50 to 60%, verifying that the impregnation progressed in the coating section. In addition, the uniformity of the areal weight in the width direction of the primary impregnate prepreg collected as above-mentioned was evaluated as below-mentioned. The 300 mm wide prepreg was cut into a right edge, a center portion, and a left edge in the width direction, 100 mm square each, and the mass of the prepreg and the mass of the carbon fiber were each measured with 3 as the number of measurements (n=3). The mass of the carbon fiber was measured as a residue obtained by eluting the resin from the prepreg with a solvent. From these, the average values for each sampling position were calculated, the average values for each sampling position were compared, and both the carbon fiber and the resin were found to fall within the range of 2 mass % and exhibit excellent areal weight uniformity.

Example 5

Application of a matrix resin, simplified additional-impregnation, and application of a resin film were carried out under the same conditions as in Example 1, and then, the prepreg was further introduced into the additional-impregnation device to undergo an additional-impregnation process. The water absorption rate of the prepreg was checked, and found to be 5%, which is a sufficient degree of impregnation.

Next, the obtained prepregs were laminated in six layers, and cured using an autoclave at 180° C. at 6 kgf/cm$^2$ (0.588 MPa) for two hours to obtain CFRPs. All the obtained CFRPs had a tensile strength of 3.0 GPa, and had suitable mechanical properties as a structural material for the aerospace. In this regard, the tensile strength of the CFRP was measured in the same manner as in WO2011/118106, and the value resulting from normalizing the volume % of the reinforcing fibers in the prepreg to 56.5% was used.

In addition, observing the cross-section of the obtained CFRP with an electron microscope verified that the carbon fiber layers were orderly laminated in the horizontal direction and that a matrix resin layer was formed between a carbon fiber layer and a carbon fiber layer. Furthermore, the observation verified that most of the polymer particles were arranged between these carbon fiber layers.

Comparative Example 2

A prepreg was produced in the same manner as in Example 1 except that, in place of the thermosetting epoxy resin composition 1, the thermosetting epoxy resin composition 2 (matrix resin B) was used as a matrix resin to be used in the coating section, that the gap D in the narrowed section was 0.2 mm, and in addition, that a resin film was not applied. In this regard, an additional-impregnation process using a simplified additional-impregnation device was not carried out. The matrix resin B had a high viscosity, and

TABE 1

| | | Example 1 | Example 2 | Example 3 | Example 4 | Comparative Example 1 |
|---|---|---|---|---|---|---|
| Performing Conditions | L2-W (mm) | 0 | 0 | 0 | 12 | 0 |
| | Height H along which Cross-section decreases continuously (mm) | 100 | 40 | 8 | 100 | 0 |
| Evaluation Items | Continuous Running Properties | Good | Good | Good | Good | Bad |
| | Fuzz Prevention Properties (60 minutes) | Good | Good | Fair | Good | — |
| | Fuzz Prevention Properties (120 minutes) | Good | Fair | Fair | Fair | — |
| | Split of Fiber Bundle | Excellent | Excellent | Excellent | Fair | — |
| | Edge Folding of Fiber Bundle | Excellent | Excellent | Excellent | Fair | — |

Comparative Example 1

Using a coating section having no portion along which the cross-sectional area decreased continuously (H=0), as shown in FIG. 10, an attempt was made to produce a prepreg under the conditions listed in Table 1 and in the same manner as in Example 1, but the reinforcing fiber sheet stuck immediately after starting to run at 20 m/minute, showing poor continuous running properties.

thus, differently from Examples 1 and 5, fluctuations and splits were found in places in the carbon fiber bundle (such a split of the fiber bundle was rated as "Good") although not problematic for stable running.

The obtained prepreg was used to produce a CFRP by the same operation as in Example 5, and observing the cross-section of the CFRP with an electron microscope found disturbance in places in the carbon fiber layer although the frequency was low.

Reference Example 1

A prepreg was produced by a conventional hot-melt process using the carbon fiber and the thermosetting epoxy resin 1 (the matrix resin A), and the resulting prepreg was cured using an autoclave at 180° C. at 6 kgf/cm$^2$ (0.588 MPa) for two hours to yield a CFRP, which was found to have a tensile strength of 2.9 GPa.

Example 6

A prepreg production device described in FIG. 22 (the description of a matrix resin supply device for the coating section is omitted) was used, wherein a noncontact heating device was disposed immediately under a coating section, a simplified additional-impregnation device having nip rolls was further disposed immediately under the noncontact heating device, and a coating section of the type 20c described in FIG. 7 was used. The liquid pool in the coating section 20b was tapered in two tiers, the opening angle of the upper taper was 90°, and the taper had a height (i.e., H) of 40 mm. The opening angle of the lower taper was 60°, and the taper had a height of 15 mm. In addition, the material of the wall surface formed in the coating section was the same material as in Example 1, and the same plate-like bush, heater, and measuring device as in Example 1 were used. In addition, the coating section included, as a width regulation mechanism, plate-like bushes conformed to the internal shape of the coating section, as described in FIG. 5, and the width (L2) regulated by the width regulation mechanism was 300 mm. The gap D in the narrowed section was 0.18 mm. In this case, the aspect ratio of the outlet slit was approximately 1667. In addition, the space external to each bush was closed off at the bottom outlet of the narrowed section so that the matrix resin could not leak through the outlet of the narrowed section.

The same reinforcing fiber sheet as in Example 1 was used.

In addition, a noncontact heating device was arranged 15 cm immediately under the coating section, and a simplified additional-impregnation device was arranged 15 cm immediately under the noncontact heating device. The surface temperature of the primary impregnate prepreg before being introduced into the simplified additional-impregnation device was equal to or higher than the temperature of the matrix resin in the liquid pool.

A prepreg was produced at a running speed of 10 m/minute, wherein a matrix resin applied in the coating section and a resin film (with a release paper sheet) were the same as in Example 1, the temperature of the matrix resin in the liquid pool was 90° C., the temperature of the resin film supplied was room temperature (approximately 20° C.), and the temperatures of the nip rolls in the additional-impregnation device were all room temperature (approximately 20° C.). When this was done, L2−W=0. In addition, another additional-impregnation process using an additional-impregnation device 450 was not carried out.

The running properties were evaluated in the same manner as in Example 1, with the results that the continuous running properties were Good, the fuzz prevention (60 minutes) was Good, the fuzz prevention (120 minutes) was Good, the split of the fiber bundle was Excellent, and the edge folding of the fiber bundle was Excellent.

Furthermore, a prepreg was molded in the same manner as in Example 5, and observing the cross-section of the obtained CFRP found that a layer structure of a carbon fiber layer and a matrix resin layer was formed, that no polymer particles flowed into the carbon fiber layer, and that the polymer particles were arranged in the matrix resin layer. In addition, almost no disturbance was found in the carbon fiber layer.

INDUSTRIAL APPLICABILITY

The prepreg obtained by the production method according to the present invention can widely be applied as FRP typified by CFRP, in aerospace applications, applications for structural materials and interior materials such as for automobiles, trains, and ships, pressure vessels, industrial material applications, sports material applications, medical equipment applications, housing applications, civil engineering and construction applications, and the like.

REFERENCE SIGNS LIST

1 Reinforcing Fiber
1a Reinforcing Fiber Sheet
1b Primary Impregnate Prepreg
1c Prepreg
2 Matrix Resin
3a, 3b Resin Film
4 Release Sheet
11 Creel
12 Arrangement Device
13, 14 Conveyance Roll
15 Wind-up Device
16, 16a, 16b Supply Device
20 Coating Section
20b Coating Section in another embodiment
20c Coating Section in another embodiment
20d Coating Section in another embodiment
20e Coating Section in another embodiment
21a, 21b Wall constituent members
21c, 21d Wall constituent members having another shape
21e, 21f Wall constituent members having another shape
21g, 21h Wall constituent members having another shape
21i, 21j Wall constituent members having another shape
22 Liquid Pool
22a Region whose cross-sectional area decreases continuously in Liquid Pool
22b Region whose cross-sectional area does not decrease in Liquid Pool
22c Region whose cross-sectional area decreases intermittently in Liquid Pool
23 Narrowed Section
24a, 24b Side Plate Members
25 Outlet
26 Gap
28 Particle-providing Device
Coating Section in Comparative Example 1
31a, 31b Wall constituent members in Comparative Example 1
32 Liquid Pool in Comparative Example 1
33 Region whose cross-sectional area decreases intermittently in Liquid Pool in Comparative Example 1
35a, 35b, 35c Bars
100 Coating Device
B Depth of Liquid Pool 22
C Height up to the liquid surface at the top of Liquid Pool 22
D Gap of Narrowed Section
G Position at which width regulation is carried out
H Vertical Height along which the cross-sectional area of Liquid Pool 22 decreases continuously L Width of Liquid Pool 22
R, Ra, Rb Circular Stream in the Edge
T Circular Streams
W Width of Primary Impregnate Prepreg 1b, as measured immediately under Narrowed Section 23
Y Width of Narrowed Section 23
Z Running Direction (Vertically Downward Direction) of Reinforcing Fiber Sheet 1a
θ Opening Angle of Tapered Portion
411 Creel
412 Reinforcing Fiber Bobbin
413 Diverting Guide
414 Reinforcing Fiber Bundle
415 Reinforcing Fiber Arrangement Device
416 Reinforcing Fiber Sheet
417 Fiber Bundle Widening Device
418 Smoothing Device
419 Diverting Roll
420 Reinforcing Fiber Preheating Device
430 Coating Section
431 First Coating Section
432 Second Coating Section
441 Diverting Roll
442 Resin Film Supply Device
443 Resin Film
444 High Tension Take-up Device
445 Diverting Roll
446 Release Sheet
447 Lamination Roll
448 High Tension Take-up Device
449 High Tension Take-up S-shaped Arranged Roll
450 Additional-impregnation Device
451 Hot Plate
452 Heated Nip Roll
453 Simplified Additional-impregnation Device
454 Heated Nip Roll
455 Heated S-shaped Arranged Roll
456 Contact Roll
461 Cooling Device
462 Take-up Device
463 Release Sheet (Upper) Wind-up Device
464 Winder
471 Primary Impregnate Prepreg
472 Prepreg/Release Sheet (Sheet-like Integrated Object)
481 Release Sheet Supply Device
482 Prepreg
483 Noncontact Heating Device
484 Simplified Additional-impregnation Device (Nip Roll)

The invention claimed is:

1. A method of producing a prepreg, comprising:
allowing a reinforcing fiber sheet to pass substantially vertically downward through the inside of a coating section storing a matrix resin to apply said matrix resin to said reinforcing fiber sheet; and then
applying a resin film to a primary impregnate prepreg withdrawn from said coating section;
wherein said coating section comprises a liquid pool and a narrowed section which are in communication with each other;
wherein said liquid pool has a portion whose cross-sectional area decreases continuously along a running direction of said reinforcing fiber sheet, and
wherein said narrowed section has a slit-like cross-section and a gap, wherein increased liquid pressure allows the reinforcing fiber sheet to be automatically aligned with the center of the gap, so that the reinforcing fiber sheet is not directly abraded against the wall surfaces of the narrowed section, and said slit-like cross-section has a smaller cross-sectional area than the top side of said liquid pool.

2. The method according to claim 1, wherein said resin film comprises particles therein.

3. The method according to claim 1, comprising a step of carrying out an additional-impregnation process after the step of applying said resin film.

4. The method according to claim 1, comprising:
a step of carrying out an additional-impregnation process on said primary impregnate prepreg; and
a step of applying said resin film after said step of carrying out said additional-impregnation process.

5. The method according to claim 1, comprising carrying out the resin film application and said additional-impregnation process simultaneously on said primary impregnate prepreg.

6. A method of producing a prepreg, comprising:
allowing a reinforcing fiber sheet to pass substantially vertically downward through the inside of a coating section storing a matrix resin;
applying said matrix resin to said reinforcing fiber sheet to obtain a primary impregnate prepreg; and
providing a surface thereof with particles having an average particle size of 0.1 μm or more and 500 μm or less by at least one method selected from the group consisting of the following [1] to [4]:
[1] a method of causing said particles to fall onto a running base material by their own weight,
[2] a method of causing a base material to pass through a space in which said particles are diffused,
[3] a method using electrostatic coating, and
[4] a method using a gas stream mixed with particles;
wherein said coating section comprises a liquid pool and a narrowed section which are in communication with each other,
wherein said liquid pool has a portion whose cross-sectional area decreases continuously along a running direction of said reinforcing fiber sheet, and
wherein said narrowed section has a slit-like cross-section and a gap, wherein increased liquid pressure allows the reinforcing fiber sheet to be automatically aligned with the center of the gap, so that the reinforcing fiber sheet is not directly abraded against the wall surfaces of the narrowed section, and said slit-like cross-section has a smaller cross-sectional area than the top side of said liquid pool.

7. The method according to claim 1, wherein a vertical height of the portion whose cross-sectional area decreases continuously in said liquid pool is 10 mm or more.

8. The method according to claim 1, wherein a relationship between a width (L) of the lower portion of said liquid pool in the width direction of said reinforcing fiber sheet and the width (W) of said reinforcing fiber sheet immediately under said narrowed section satisfies the following Formula (1):

$$L \leq W+10 \text{ (mm)} \tag{1}$$

9. The method according to claim 1, wherein said coating section comprises, in said liquid pool, a width regulation mechanism for regulating a width of said reinforcing fiber sheet, and wherein the relationship between the width (W) of said reinforcing fiber sheet immediately under said narrowed section and a width (L2) regulated by said width regulation mechanism at a lower end of said width regulation mechanism satisfies the following Formula (2):

$$L2 \leq W+10 \text{ (mm)} \tag{2}$$

10. A method of producing a prepreg, comprising further carrying out an additional-impregnation process on said prepreg obtained by the method according to claim 4.

11. A method of producing a prepreg tape, comprising:
   obtaining a prepreg by the method according to claim 1; and then
   slitting said prepreg.

12. A method of producing a fiber reinforced composite material, comprising:
   obtaining a prepreg by the method according to claim 1; and
   then molding said prepreg.

13. A method of producing a fiber reinforced composite material, comprising: obtaining a prepreg tape by the method according to claim 11; and then
   molding said prepreg tape.

* * * * *